US008805376B2

(12) United States Patent
Boejer et al.

(10) Patent No.: US 8,805,376 B2
(45) Date of Patent: Aug. 12, 2014

(54) SATELLITE (GPS) ASSISTED CLOCK APPARATUS, CIRCUITS, SYSTEMS AND PROCESSES FOR CELLULAR TERMINALS ON ASYNCHRONOUS NETWORKS

(75) Inventors: Joergen Boejer, Vadum (DK); Alain Vallauri, Colomars (FR); Ilyas Berk Guvelioglu, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/569,335

(22) Filed: Aug. 8, 2012

(65) Prior Publication Data
US 2013/0035099 A1    Feb. 7, 2013

Related U.S. Application Data

(62) Division of application No. 11/844,006, filed on Aug. 23, 2007, now Pat. No. 8,249,616.

(51) Int. Cl.
*H04W 24/00* (2009.01)

(52) U.S. Cl.
USPC ....................... 455/436; 455/456.1

(58) Field of Classification Search
USPC ............. 342/387; 455/436, 456.1, 456.6, 457
See application file for complete search history.

(56) References Cited

U.S. PATENT DOCUMENTS

| 6,266,012 | B1 * | 7/2001 | Kangas et al. ................. 342/387 |
| 2002/0021718 | A1 * | 2/2002 | Kerhuel et al. ............... 370/509 |
| 2002/0077115 | A1 * | 6/2002 | Ruutu et al. .................. 455/456 |
| 2004/0209625 | A1 * | 10/2004 | Haddrell ..................... 455/456.1 |
| 2005/0020275 | A1 * | 1/2005 | Agrawala et al. .......... 455/456.1 |

* cited by examiner

*Primary Examiner* — Myron K Wyche
(74) *Attorney, Agent, or Firm* — Ronald O. Neerings; Frederick J. Telecky, Jr.

(57) ABSTRACT

An electronic circuit for use with time of arrival signals from a network, including a position determination unit, a first clock, a second clock, and processing circuitry coupled to said first clock, said second clock, and said position determination unit. The processing circuitry is operable to project a relatively-accurate subsequent global time based on said first and second clocks and to then return said relatively-accurate subsequent global time to said position determination unit to facilitate a subsequent position determination by said position determination unit.

20 Claims, 18 Drawing Sheets

SATELLITE (GPS) ASSISTED CLOCK APPARATUS, CIRCUITS, SYSTEMS AND PROCESSES FOR CELLULAR TERMINALS ON ASYNCHRONOUS NETWORKS

CLAIM OF PRIORITY

This application is a divisional of and incorporates by reference application Ser. No. 11/844,006, filed Aug. 23, 2007, entitled "Satellite (GPS) Assisted Clock Apparatus, Circuits, Systems and Processes for Cellular Terminals on Asynchronous Networks".

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of information and communications, and is more specifically directed to improved processes, circuits, devices, and systems for position sensing and other information and communication processing purposes, and processes of making them. Without limitation, the background is further described in connection with wireless communications processing.

Wireless communications, of many types, have gained increasing popularity in recent years. The mobile wireless (or "cellular") telephone has become ubiquitous around the world. Mobile telephony has begun to communicate video and digital data, in addition to voice. Wireless modems, for communicating computer data over a wide area network, using mobile wireless telephone channels and techniques are also available.

Wireless data communications in wireless local area networks (WLAN), such as that operating according to the well-known IEEE 802.11 standard, has become especially popular in a wide range of installations, ranging from home networks to commercial establishments. Short-range wireless data communication according to the "Bluetooth" technology permits computer peripherals to communicate with a personal computer or workstation within the same room. Personal area networks and piconetworks can provide decentralized networking from and between furniture, appliances, clothing and other locations.

GPS (Global Positioning System) is an earth-satellite-based electronic system for enabling GPS receivers in ships, aircraft, land vehicles and land stations to determine their geographic and spatial position such as in latitude, longitude, and altitude. Discussion of GPS herein is without limitation to other analogous satellite-based electronic systems.

A GPS receiving unit that has been powered down or has been without satellite signal coverage for a period, needs an accurate initial clocktime (referred to the GPS satellite atomic clock). Accurate initial clocktime is needed in order to use, make or achieve the shortest possible time to first position fix and to achieve the best possible positioning accuracy. In other words, a satellite positioning receiver would desirably have an accurate time estimate of the current time when commencing reception, in order to minimize the time consumed in obtaining a position fix.

Under such powered-down or no-satellite coverage conditions, the time could be gotten from the network by special assisted data, if available, for time-of-day based on network transmissions but for which link delay may create inaccuracy in the time-of-day information passed to the positioning unit. Also, the positioning unit could be connected at some inconvenience and expense to a network that is synchronized to the atomic clock of the satellite system. It would be desirable to accurately, reliably, conveniently and economically maintain an accurate time estimate when a satellite positioning receiver (SPR) and its clock source are deliberately powered down periodically to save power and powered down during other intervals for various reasons.

It is also desirable to obtain and maintain an accurate time estimate when a satellite positioning receiver and its clock source are associated with a cellular or other communications network distinct from the satellite positioning network, and the cellular transceiver clock is either inaccurate or alternated between a less than fully-accurate operational clock source and a less than fully accurate sleep mode clock source. Moreover, it would be desirable to provide ways of providing accurate time estimation from the cellular network wherein the cellular transceiver is subject to handover or handoff between cellular base stations as the cellular transceiver is moved from one cellular network cell to another cell.

It is desirable to find ways of swiftly providing accurate time to a satellite positioning receiver (SPR such as GPS) connected to a cellular transceiver such as a cell phone handset, or connected to any other asynchronous communications network with a less accurate time base than GPS, when the SPR only receives satellite signals at certain intervals, such as for power savings, and the cellular transceiver is camped on an asynchronous network.

Digital signal processing (DSP) chips and/or other integrated circuit devices are essential to these systems and applications. Reducing the cost of manufacture and device and system power dissipation and increasing speed of operation without compromising performance are important goals in DSPs, other processors, integrated circuits generally and system-on-a-chip (SOC) and other system design. These goals are especially important in hand held/mobile applications where small size is so important, to control the cost and the power consumed while enhancing performance.

It is desirable to solve any or all of the above problems, as well as other problems by improvements described hereinbelow.

SUMMARY OF THE INVENTION

Generally and in a form of the invention, a wireless circuit is for tracking an incoming signal and for use in a network having handover from one part of the network to another part. The wireless circuit includes a processor responsive to the incoming signal, the processor operable to generate pulse edges representing network-based receiver synchronization instances (RSIs), and a timekeeping circuitry including an oscillator circuitry, the timekeeping circuitry operable to maintain a set of counter circuitries including a counter circuitry operable to maintain at least one network time component based on the RSIs and another counter circuitry operable at least during handover and during loss of network coverage for maintaining at least one internal time component based on the oscillator circuitry, the set of counter circuitries operable to account for elapsing time substantially gaplessly and substantially without overlap between the time components during a composite of network coverage, loss of network coverage and handover, and the timekeeping circuitry further including a time generator for combining the time components from the set of counter circuitries to generate an approximate absolute time.

Generally and in another form of the invention, an electronic circuit is for mobile timekeeping during handover between base stations for cells in a macrocell asynchronous mobile system. The electronic circuit includes a satellite positioning engine, a cellular engine including a first circuit operable to maintain time by receiver synchronization instances (RSIs) prior to handover and by an internal clock, and including a second circuit providing a strobed time instance between the satellite positioning engine and the cellular engine, and the cellular engine upon handover is operable to continue to maintain time given a change of reception time of unsynchronized RSIs due to handover and a change of propagation delay to the cellular engine due to handover.

Generally and in a further form of the invention, an electronic circuit is for tracking an incoming signal from a network, and includes a processor responsive to the incoming signal, the processor operable to generate pulse edges representing network-based receiver synchronization instances (RSIs), oscillator circuitry, and an adjustment circuit operable to adjust the oscillator circuitry in frequency in response to the network-based RSIs from the processor, the adjustment circuit including a time counter circuitry fed from the oscillator circuitry and including a counter operable to maintain a running count between successive RSIs.

Generally and in another further form of the invention, an electronic circuit for an incoming signal having modulation, includes a processor responsive to the modulation, the processor operable to supply a received signal $S_R$ and the processor further operable to provide a channel impulse response h and an error-reducing decode output, a remodulator fed with the channel impulse response from the processor and with the error-reducing decode output, the remodulator operable to generate a remodulated signal $S_{RM}$ as output, arithmetic circuitry operable to supply an output related to a phase difference $\delta\phi$ between the received signal $S_R$ and the remodulated signal $S_{RM}$, a frequency lock loop responsive to the phase difference output, and time counter circuitry responsive to the phase difference output for time correction.

Generally and in yet another form of the invention, a wireless positioning system for use with a cellular network signal, includes a cellular engine having an on-clock and a sleep clock, a positioning engine coupled to the cellular engine by a strobe line, at least one of the positioning engine and the cellular engine operable to send a first strobe signal having a first strobe edge over the strobe line to the other engine, and the positioning engine further operable to send a message indicating what the positioning time was at the strobe edge, and then suspend operation in the positioning engine. The cellular engine is operable in a first mode to maintain the time based on the positioning time and based on the on-clock at least occasionally synchronized to the cellular network signal, and further operable to enter a sleep mode and maintain the time based on the sleep clock and then reenter the first mode, and the positioning engine operable to send a second strobe signal having a strobe edge over the strobe line to the cellular engine, the cellular engine operable to send a message indicating the maintained time at the second strobe edge based on the on-clock and the sleep clock, the positioning engine further operable to resume operation and establish an expedited first fix based on the maintained time from the cellular engine.

Generally and in a method form of the invention, the method is for providing estimated time in a system having a satellite receiving engine GE operable for satellite reception and a cellular engine CE operable for cellular reception. The method includes sending a first strobe between GE and CE, generating a satellite time value by GE, corresponding to the first strobe, generating a cellular time value by CE, corresponding to the first strobe, monitoring a cellular engine time interval after the first strobe in a manner corrected by the cellular reception, losing satellite reception in GE followed by regaining satellite reception in GE, sending a next strobe between GE and CE, correcting the internal time for use by GE, as a function of the satellite time value corresponding to the first strobe and a time interval between the first strobe and the next strobe, operating GE to obtain a current satellite time value from satellite reception by GE facilitated by the internal time thus corrected for use by GE, generating a satellite time value by GE, corresponding to the next strobe, and successively repeating the method between the generating steps inclusive so that the next strobe is treated as the first strobe for the succeeding repetition therebetween, whereby each repetition includes a single strobe.

Generally and in another method form of the invention, a method is for providing estimated time in a system having a satellite receiving engine GE operable for satellite reception and a cellular engine CE operable for reception from a cellular network. The method includes sending a first strobe from GE to CE, generating a satellite time value by GE corresponding to the first strobe, generating a cellular time value by CE corresponding to the first strobe, monitoring a cellular engine time interval after the first strobe in a manner corrected by the reception from the cellular network, losing satellite reception in GE followed by regaining satellite reception in GE, sending a next strobe between GE and CE, and correcting the internal time for use by GE as a function of the satellite time value corresponding to the first strobe and a time interval between the first strobe and the next strobe.

Generally and in still another circuit form of the invention, an electronic circuit is for use with time of arrival signals from a network. The electronic circuit includes a position determination unit operable to generate a global time value and to convey a first global time from the position determination unit as an output, a first clock greater than 1 MHz, the first clock operable to be powered on and off, a second clock less than 1 MHz having cycles, and processing circuitry coupled to the first clock and to the second clock and to the position determination unit. The processing circuitry is operable to measure a time interval between the time of arrival signals relative to first clock counts and measure a time interval between cycles of the second clock relative to first clock counts, generate a number $n_2$ of clock counts of the first clock when the first clock is powered on and generate a number of clock counts $n_3$ of the second clock while the first clock is powered off, and project a relatively-accurate subsequent global time based on said first global time and using said measure and generate operations, and then return the relatively-accurate subsequent global time to the position determination unit to facilitate a subsequent position determination by the position determination unit.

Generally, a process of manufacture form of the invention involves a process of manufacturing a telecommunication product including stuffing a printed wiring board (PWB) of the telecommunication product to have cellular engine CE and a satellite positioning engine GE, and an interface including a timestamp line connecting CE and GE, and a telecommunications modem coupled to the CE, loading software into a non-volatile memory coupled to the CE, loading operational parameters to the non-volatile memory for configuring the CE with operational parameters for timekeeping, and for operating a frequency lock loop, and parameters representing characteristics of a cellular network; coupling a user interface to the CE, operating the CE in response to the non-volatile memory to configure and execute CE operations and communicate with the GE over the timestamp line, and testing the stuffed PWB for reduced length of time to position fix TTFF due to the communication of the CE with the GE.

Other forms of the invention involving electronic circuits, positioning systems, methods of operation, and processes of manufacture are also disclosed and claimed.

BRIEF DESCRIPTION OF THE DRAWINGS

FIGS. 6A-6D are graphs of cellular signals versus time, wherein FIG. 6A shows alternating cellular reception RX and transmission TX, FIG. 6B shows two of a series of received synchronization instances (RSIs), FIG. 6C shows an information structure of a received cellular signal, and FIG. 6D shows various number symbols for use in inventive timekeeping processes and structures.

Corresponding numerals in different figures indicate corresponding parts except where the context indicates otherwise. A suffix ".i" refers to any of decimally suffixed elements having the same numeral prefix.

DETAILED DESCRIPTION OF EMBODIMENTS

Figure 1:
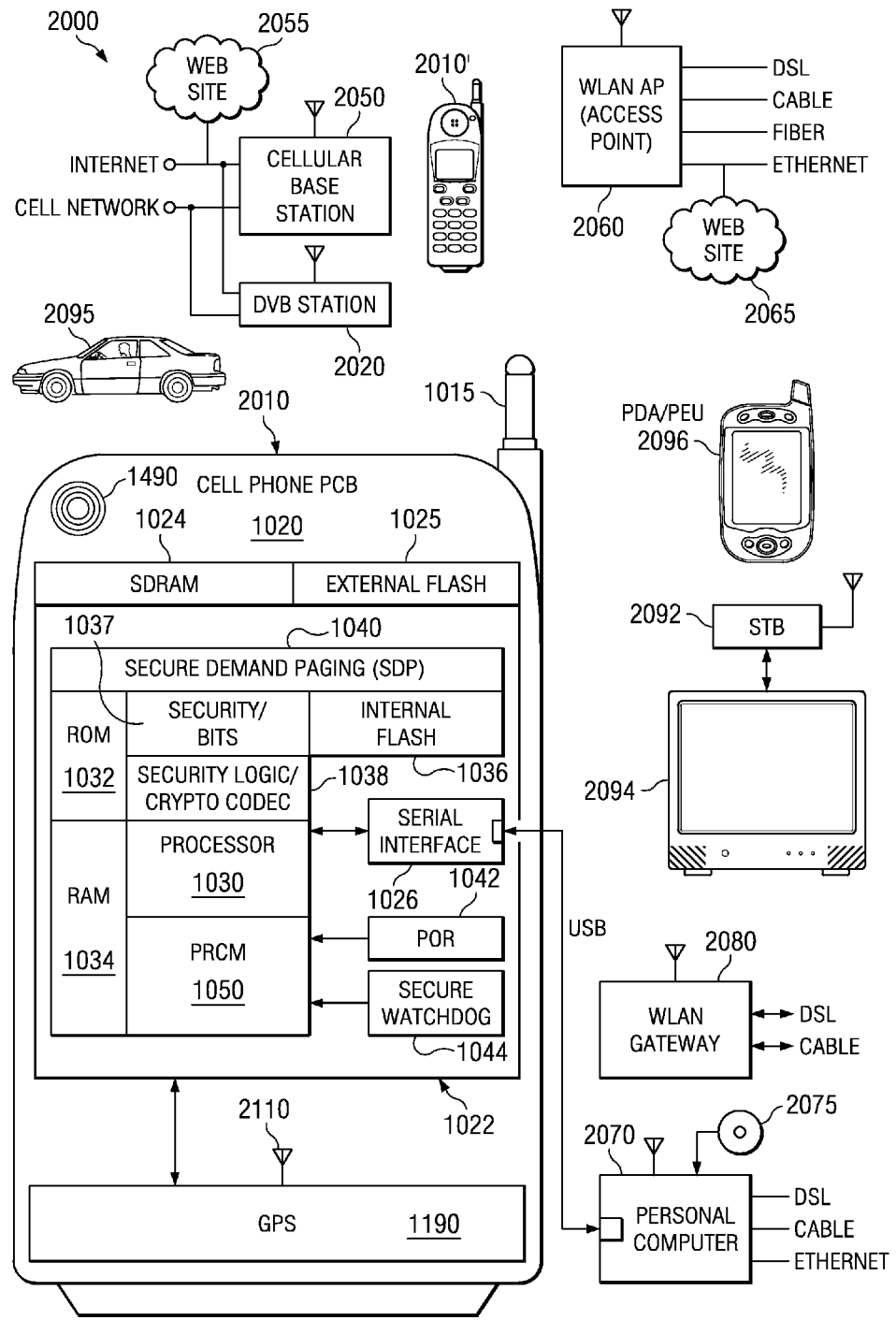
FIG. 1 is a pictorial diagram of a communications system embodiment including system blocks, for example a cellular base station, a DVB video station, a WLAN AP (wireless local area network access point), a WLAN gateway, a personal computer, a set top box and television unit, and two cellular telephone handsets, any one, some or all of the foregoing improved according to the invention.

In FIG. 1, an improved communications system 2000 has system blocks as described next and improved with any one, some or all of the circuits and subsystems shown in FIGS. 1-23 and suitably made by a process as in FIG. 24. Any or all of the system blocks, such as cellular mobile telephone and data handsets 2010 and 2010', digital video broadcast DVB station 2020, a cellular (telephony and data) base station 2050, a WLAN AP (wireless local area network access point, IEEE 802.11 unlicensed mobile application UMA, or otherwise) 2060, a Voice over WLAN gateway 2080 with user voice over packet telephone 2085 (not shown), and a voice enabled personal computer (PC) 2070 with another user voice over packet telephone (not shown), communicate with each other in communications system 2000. Each of the system blocks 2010, 2010', 2050, 2060, 2070, 2080 is provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), Ethernet wideband network, and other methods. Cellular base station 2050 two-way communicates with the handsets 2010, 2010', with the Internet, with cellular communications networks and with PSTN (public switched telephone network).

In this way, advanced networking capability for services, software, and content, such as cellular telephony and data, position-based applications, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), medical-related services, and other services accommodates and provides security for secure utilization and entertainment appropriate to the just-listed and other particular applications.

The embodiments, applications and system blocks disclosed herein are suitably implemented in fixed, portable, mobile, automotive 2905, seaborne, and airborne, communications, control, set top box 2092, television 2094 (receiver or two-way TV), and other apparatus. The personal computer (PC) 2070 is suitably implemented in any form factor such as desktop, laptop, palmtop, organizer, mobile phone handset, PDA personal digital assistant 2096, internet appliance, wearable computer, content player, personal area network, or other type and usable with media 2075 such as optical disk, flash drive, and other media.

For example, handset 2010 is improved for selectively determinable functionality, performance, low power consumption, security and economy when manufactured. Handset 2010 is interoperable and able to communicate with all other similarly improved and unimproved system blocks of communications system 2000. Camera 1490 provides video pickup for cell phone 2010 to send information over the internet to cell phone 2010', PDA 2096, TV 2094, and to a monitor of PC 2070 via any one, some or all of cellular base station 2050, DVB station 2020, WLAN AP 2060, STB 2092, and WLAN gateway 2080. Handset 2010 has a video storage, such as hard drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 2010, is provided a higher-security processor integrated circuit 1022, an external flash memory 1025 and SDRAM 1024, and a serial interface 1026. Serial interface 1026 is suitably a wireline interface, such as a USB interface connected by a USB line to the personal computer 2070 and magnetic, semiconductor and/or optical media 2075 when the user desires and for reception of software intercommunication and updating of information between the personal computer 2070 (or other originating sources external to the handset 2010) and the handset 2010. Such intercommunication and updating also suitably occur via any other processor in the cell phone 2010 itself such as for GPS positioning, cellular modem, WLAN, Bluetooth, a website 2055 or 2065, or other circuitry for wireless or wireline modem processor, digital television and physical layer (PHY).

In FIG. 1, processor integrated circuit 1022 is coupled to a satellite positioning integrated circuit 1190 for GPS or otherwise. The GPS circuit 1190 has an antenna 2110. The processor integrated circuit 1022 includes at least one processor MPU (or central processing unit CPU) block 1030 coupled to an internal (on-chip read-only memory) ROM 1032, an internal (on-chip random access memory) RAM 1034, and an internal (on-chip) flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030. A device-unique security key is suitably also provided in the E-fuses or downloaded to other non-volatile, difficult-to-alter parts of the cell phone unit 2010.

The words "internal" and "external" as applied to a circuit or chip respectively refer to being on-chip or off-chip of the applications processor chip 1022. All items are assumed to be internal to an apparatus (such as a handset 2010, base station 2050, access point 2060, gateway 2080, PC 2070, or other apparatus) except where the words "external to" are used with the name of the apparatus, such as "external to the handset."

ROM 1032 provides a boot storage having boot code that is executable in at least one type of boot sequence. One or more of RAM 1034, internal flash 1036, and external flash 1025 are also suitably used to supplement ROM 1032 for boot storage purposes. A Secure Demand Paging system 1040 effectively expands the size of secure memory in RAM 1034 to include part or all of SDRAM 1024.

Figure 2:
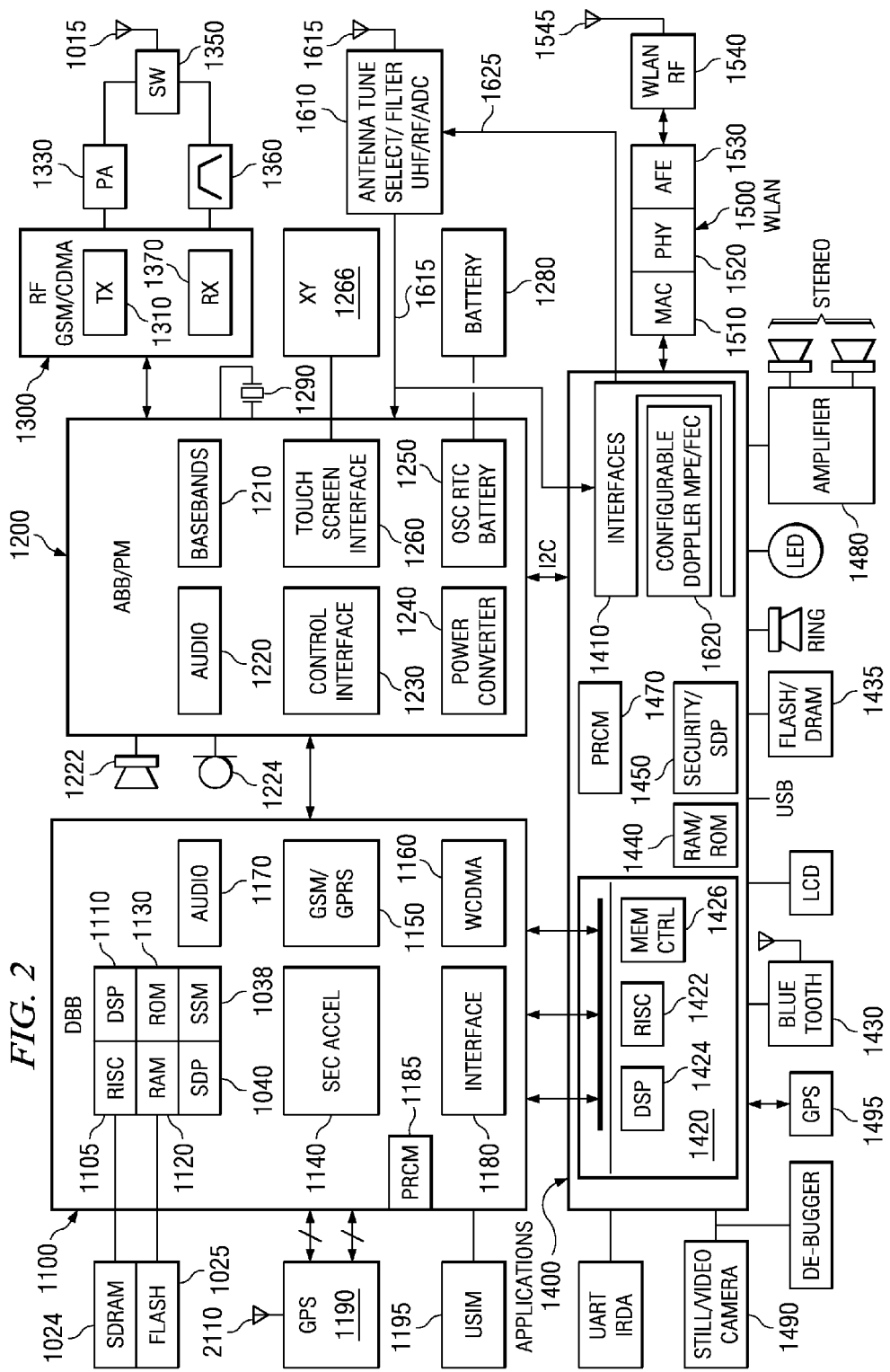
FIG. 2 is a block diagram of inventive integrated circuit chips for use in the blocks of the communications system of FIG. 1, including an inventive partitioning of circuit blocks of a cellular telephone handset.

FIG. 2 illustrates inventive integrated circuit chips including chips 1100, 1200, 1300, 1400, 1500 for use in any one, some or all of the blocks of the communications system 2000 of FIG. 1. The skilled worker uses and adapts the integrated circuits to the particular parts of the communications system 2000 as appropriate to the functions intended. For conciseness of description, the integrated circuits are described with particular reference to use of all of them in the cellular telephone handsets 2010 and 2010' by way of example.

It is contemplated that the skilled worker uses each of the integrated circuits shown in FIG. 2, or such selection from the complement of blocks therein provided into appropriate other integrated circuit chips, or provided into one single integrated circuit chip, in a manner optimally combined or partitioned between the chips, to the extent needed by any of the applications supported by the DVB station 2020, cellular telephone base station 2050, personal computer(s) 2070 equipped with WLAN, WLAN access point 2060 and Voice WLAN gateway 2080, as well as cellular telephones, radios and televisions, Internet audio/video content players, fixed and portable entertainment units, routers, pagers, personal digital assistants (PDA), organizers, scanners, faxes, copiers, household appliances, office appliances, microcontrollers coupled to controlled mechanisms for fixed, mobile, personal, robotic and/or automotive use, combinations thereof, and other application products now known or hereafter devised for increased, partitioned or selectively determinable advantages.

In FIG. 2, an integrated circuit 1100 includes a digital baseband (DBB) block that has a RISC processor 1105 (such as MIPS core(s), ARM core(s), or other suitable processor) and a digital signal processor 1110 such as from the TMS320C55x™ DSP generation from Texas Instruments Incorporated or other digital signal processor (or DSP core) 1110, communications software and security software for any such processor or core, security accelerators 1140, and a memory controller. Security accelerators 1140 provide additional computing power such as for hashing and encryption that are accessible, for instance, when the integrated circuit 1100 is operated in a security level enabling the security accelerators block 1140 and affording types of access to the security accelerators depending on the security level and/or security mode. The memory controller interfaces the RISC core 1105 and the DSP core 1110 to Flash memory 1025 and SDRAM 1024 (synchronous dynamic random access memory). On chip RAM 1120 and on-chip ROM 1130 also are accessible to the processors 1105 and 1110 for providing sequences of software instructions and data thereto. A security logic circuit 1038 of FIGS. 1 and 2 has a secure state machine (SSM) 3560 (FIG. 10) to provide hardware monitoring of any tampering with security features. A Secure Demand Paging (SDP) circuit 1040 is provided for effectively-extended secure memory.

Digital circuitry 1150 on integrated circuit 1100 supports and provides wireless modem interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM/CDMA transmit/receive chip 1300. Digital circuitry 1150 includes a ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA or UMTS) wireless suitably with HSDPA/ HSUPA (High Speed Downlink Packet Access, High Speed Uplink Packet Access) (or 1xEV-DV, 1xEV-DO or 3xEV-DV) data feature via the analog baseband chip 1200 and RF GSM/ CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing). Blocks for uplink and downlink processes of WCDMA are provided.

Audio/voice block 1170 supports audio and voice functions and interfacing. Speech/voice codec(s) are suitably provided in memory space in audio/voice block 1170 for processing by processor(s) 1110. An applications interface block 1180 couples the digital baseband chip 1100 to an applications processor 1400. Also, a serial interface in block 1180 interfaces from parallel digital busses on chip 1100 to USB (Universal Serial Bus) of PC (personal computer) 2070. The serial interface includes UARTs (universal asynchronous receiver/transmitter circuit) for performing the conversion of data between parallel and serial lines. A power resets and control module PRCM 1185 provides power management circuitry for chip 1100. Chip 1100 is coupled to location-determining circuitry 1190 satellite positioning such as GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 2, a mixed-signal integrated circuit 1200 includes an analog baseband (ABB) block 1210 for GSM/GPRS/ EDGE/UMTS/HSDPA/HSUPA which includes SPI (Serial Port Interface), digital-to-analog/analog-to-digital conversion DAC/ADC block, and RF (radio frequency) Control pertaining to GSM/GPRS/EDGE/UMTS/HSDPA/HSUPA and coupled to RF (GSM etc.) chip 1300. Block 1210 suitably provides an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300.

An audio block 1220 has audio I/O (input/output) circuits to a speaker 1222, a microphone 1224, and headphones (not shown). Audio block 1220 has an analog-to-digital converter (ADC) coupled to an audio/voice codec 1170 and a stereo DAC (digital to analog converter) for a signal path to the baseband block 1210 and with suitable encryption/decryption activated.

A control interface 1230 has a primary host interface (I/F) and a secondary host interface to DBB-related integrated circuit 1100 of FIG. 2 for the respective GSM and CDMA paths. The integrated circuit 1200 is also interfaced to an I2C port of applications processor chip 1400 of FIG. 2. Control interface 1230 is also coupled via circuitry to interfaces in circuits 1250 and the baseband 1210.

A power conversion block 1240 includes buck voltage conversion circuitry for DC-to-DC conversion, and low-dropout (LDO) voltage regulators for power management/ sleep mode of respective parts of the chip regulated by the LDOs. Power conversion block 1240 provides information to and is responsive to a power control state machine between the power conversion block 1240 and circuits 1250.

Circuits 1250 provide oscillator circuitry for clocking chip 1200. The oscillators have frequencies determined by one or more crystals 1290. One or more of the oscillators are suitably controlled and stabilized for precise VCXO (variable control crystal oscillator) timekeeping as discussed elsewhere herein, see FIGS. 3, 8, 11, 15 and 19 among other Figures. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine. Battery monitoring is provided by either or both of 1-Wire and/or an interface called HDQ.

In FIG. 2 an RF integrated circuit 1300 includes a GSM/GPRS/EDGE/UMTS/CDMA RF transmitter block 1310 supported by oscillator circuitry with off-chip crystal(s) 1290. Transmitter block 1310 is fed by baseband block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 2, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor 1422 (such as MIPS core(s), ARM core(s), or other suitable processor), a digital signal processor (DSP) 1424 such as from the TMS320C55x™ DSP generation and/or the TMS320C6x™ DSP generation from Texas Instruments Incorporated or other digital signal processor(s), and a shared memory controller MEM CTRL 1426 with DMA (direct memory access), and a 2D (two-dimensional display) graphic accelerator, see also FIG. 10. Speech/voice codec functionality is suitably processed in chip 1400, in chip 1100, or both chips 1400 and 1100.

The RISC processor 1422 and the DSP 1424 in section 1420 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, a shared memory controller 1426 in circuitry 1420 interfaces the RISC processor 1420 and the DSP 1424 via an on-chip bus to on-chip memory 1440 with RAM and ROM. A 2D graphic accelerator is coupled to frame buffer internal SRAM (static random access memory) in block 1440. A security block 1450 includes an SSM analogous to SSM 1038 of FIG. 1, and includes secure hardware accelerators having security features and provided for secure demand paging 1040 and for accelerating encryption and decryption. A random number generator RNG is provided in security block 1450. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography).

The security features contemplated include any of the foregoing hardware and processes and/or any other known or yet to be devised security and/or hardware and encryption/decryption processes implemented in hardware or software.

Security logic 1038 of FIG. 1 and FIG. 2 (1450) includes hardware-based protection circuitry, also called security monitoring logic or a secure state machine SSM. Security logic 1038 (1450) is coupled to and monitors busses and other parts of the chip for security violations and protects and isolates the protected areas. Security logic 1038 (1450) makes secure ROM space inaccessible, makes secure RAM and register space inaccessible and establishes any other appropriate protections to additionally foster security. In one embodiment an unauthorized software jump from Flash memory 1025 (1435) to secure ROM, for instance, causes a security violation wherein, for example, the security logic 1038 (1450) produces an automatic immediate reset of the chip. In another embodiment, such a jump causes the security monitoring logic 1038, (1450) to produce an error message and a re-vectoring of the jump away from secure ROM. Other security violations would include attempted access to secure register or secure RAM space.

On-chip peripherals and additional interfaces 1410 include UART data interface and MCSI (Multi-Channel Serial Interface) voice wireless interface for an off-chip IEEE 802.15 (Bluetooth and low and high rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls and data to position unit GPS 1495 and otherwise, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to Audio codec, a touch-screen controller, and audio amplifier 1480 to stereo speakers.

External audio content and touch screen (in/out) and LCD (liquid crystal display), organic semiconductor display, and DLP™ digital light processor display from Texas Instruments Incorporated, are suitably provided in various embodiments and coupled to interface 1410. In vehicular use, the display is suitably any of these types provided in the vehicle, and sound is provided through loudspeakers, headphones or other audio transducers provided in the vehicle. In some vehicles a transparent organic semiconductor display 2095 of FIG. 1 is provided on one or more windows of the vehicle and wirelessly or wireline-coupled to the video feed. Maps and visual position-based interactive imaging are provided using GPS 1190 (1495) and processor 1105, 1110 (1422, 1424) for fixed, portable, mobile, vehicular and other platforms.

Interface 1410 additionally has an on-chip USB OTG interface that couples to off-chip Host and Client devices. These USB communications are suitably directed outside handset 2010 such as to PC 2070 (personal computer) and/or from PC 2070 to update the handset 2010.

An on-chip UART/IrDA (infrared data) interface in interfaces 1410 couples to off-chip GPS (global positioning system of block 1495 cooperating with or instead of GPS 1190) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 2, an on-chip LCD controller or DLP™ controller and associated PWL (Pulse-Width Light) block in interfaces 1410 are coupled to a color LCD display or DLP™ display and its LCD light controller off-chip and/or DLP™ digital light processor display.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

On chip 1400, a PRCM 1470 supervises and controls power consuming blocks and sequences them as in FIGS. 11-14D. Compare PRCM 1185 on chip 1100 of FIG. 2.

In FIG. 2, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for Barker coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems, and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifier and has low noise amplifier LNA in the receive path. Bandpass filtering couples WLAN RF 1540 to a WLAN antenna 1545. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2.

Still other additional wireless interfaces such as for wideband wireless such as IEEE 802.16 WiMAX mesh networking and other standards are suitably provided and coupled to the applications processor integrated circuit 1400 and other processors in the system. WiMax has MAC and PHY processes and the illustration of blocks 1510 and 1520 for WLAN indicates the relative positions of the MAC and PHY blocks for WiMax.

In some embodiments, the WLAN network time base, WiMax, DVB, or other network time base, and/or internal crystal-controlled time base is used instead of or in addition to the cellular network time base to do precision time keepings when GPS 1190 (1495) and/or cellular modem 1100 is unpowered, all according to or based on the teachings elsewhere herein.

In FIG. 2, a further digital video integrated circuit 1610 is coupled with a television antenna 1615 (and/or coupling circuitry to share antenna 1015 and/or 1545 and/or 2110) to provide television antenna tuning, antenna selection, filtering, RF input stage for recovering video/audio/controls from television transmitter (e.g., DVB station 2020 of FIG. 1). Digital video integrated circuit 1610 in some embodiments has an integrated analog-to-digital converter ADC on-chip, and in some other embodiments feeds analog to ABB chip 1200 for conversion by an ADC on ABB chip 1200. The ADC supplies a digital output to interfaces 1410 of applications processor chip 1400 either directly from chip 1610 or indirectly from chip 1610 via the ADC on ABB chip 1200. Applications processor chip 1400 includes a digital video block 1620 coupled to interface 1410 and having a configurable adjustable shared-memory telecommunications signal processing chain such as Doppler/MPE-FEC. See incorporated patent application TI-62445, "Flexible And Efficient Memory Utilization For High Bandwidth Receivers, Integrated Circuits, Systems, Methods And Processes Of Manufacture" Ser. No. 11/733,831 filed Apr. 11, 2007, which is hereby incorporated herein by reference. A processor on chip 1400 such as RISC processor 1422 and/or DSP 1424 configures, supervises and controls the operations of the digital video block 1620.

In combination with the GPS circuit 1190 and/or 1495, and video display 1266 or LCD, the RISC processor 1105/1422 and/or DSP 1110 (1424) support location-based embodiments and services of various types, such as roadmaps and directions thereon to a destination, pictorials of nearby commercial establishments, offices, and residences of friends, various family supervision applications, position sending to friends or to emergency E911 service, and other location based services now known or yet to be devised. For such services, fast time of position fixing, low system power consumption, and reliability of accurate timekeeping to support position-based services even during power management operations and cellular network base station handover or handoff operations are all desirable for improved technology such as supported by various embodiments herein.

TABLE 1 provides a list of some of the system related abbreviations used in this document.

TABLE 1

GLOSSARY OF SELECTED ABBREVIATIONS

| | |
|---|---|
| ACK | Acknowledge |
| BIOS | Basic Input Output System |
| CLK | Clock |
| CM | Clock Manager |
| DMA | Direct Memory Access |
| DPLL | Digital Phase Locked Loop |
| DPS | Dynamic Power Switching |
| DSP | Digital Signal Processor |
| DVFS | Dynamic Voltage Frequency Scaling |
| GPMC | General Purpose Memory Controller |
| INTC | Interrupt Controller |
| IVA | Imaging, Video and Audio processor |
| L1$, L2$ | Level 1, Level 2 Cache |
| LS | Level Shifter |
| MEM | Memory |
| MPU | Microprocessor Unit |
| OCP | Open Core Protocol bus protocol |
| OPP | Operating Performance Point |
| PLL | Phase Lock Loop |
| POR | Power On Reset |
| PRCM | Power Reset and Clock Manager |
| PRM | Power & Reset Manager in PRCM |
| P1, P2 | Peripheral domain, $1^{st}$ or $2^{nd}$. |
| REQ | Request |
| RISC | Reduced Instruction Set Computer |
| SDRAM | Synchronous Dynamic Random Access Memory |
| SDRC | SDRAM Refresh Controller |
| SLM | Static Leakage Management |

TABLE 1-continued

GLOSSARY OF SELECTED ABBREVIATIONS

| | |
|---|---|
| SMPS | Switch Mode Power Supply |
| SMS | SDRAM Memory Scheduler |
| SRAM | Static Random Access Memory |
| SSM | Secure State Machine |
| UART | Universal Asynchronous Receiver Transmitter (2-way serial interface) |
| VDD | Supply Voltage |
| WDT | Watchdog Timer |
| WKUP | Wakeup |

Some structure and process embodiments herein provide a satellite positioning receiver (SPR) such as, without limitation, a GPS unit. The GPS unit is provided with an initial time input having improved accuracy by connecting the GPS unit to a wireless cellular modem 1100 or applications processor 1400 connected to a wireless modem 1100. The cellular modem is connected to a communications network that is not synchronized to the atomic clock.

Some system embodiments described herein get atomic clock time from the GPS unit 1190 or 1495 and maintain the clock in the cellular modem. The clock is maintained accurately in the modem because it is locked to a moderately accurate clock (e.g., 0.05 ppm) in even an asynchronous cellular network and receives signals at known frequencies and relative time instances. The cellular modem feeds back the time to the GPS unit 1190 or 1495 when the GPS unit does not have an accurate clock, such as upon awakening from a power-saving sleep mode. Such instances also occur on power-up after the GPS unit has been powered down or upon re-acquiring full GPS satellite coverage.

Accordingly, over time intervals of not unduly long duration, the operation and performance of the GPS unit or GPS engine (GE) benefits and is improved by structure and process combination with a processing cellular engine CE that has a time base coupled to and corrected by an asynchronous network. At reception, the system uses the signals transmitted at predefined intervals from the asynchronous network, and uses those signals as a strobe signal or pulse. The system having GE and CE working together uses the signals to count time that is referred to and corresponds with particular predefined intervals and instants. Some embodiments also count clock on the internal clock sources typical of a cellular handset and other consumer product applications when both network time signals and GPS time are absent, and then correct the time when the network becomes available. In this way, when GPS coverage resumes, the total time-to-first-fix (TTFF) is shortened. For instance, some metal-surrounded spaces in buildings may impair the GPS coverage. When the user takes the GPS/cellular unit from such a space into another part of the building or goes outdoors, the coverage resumes and TTFF is shortened.

Further, some embodiments also utilize accurate GPS time that has been determined at the previous satellite (e.g., GPS) position fix. In other words, updated actual time information suitably comes from combining information from the asynchronous communications network such as cellular network and from an earlier GPS time if such earlier GPS time is available. The time information is transferred from the Satellite Positioning Receiver to the cellular transceiver or other lower-accuracy receiver. The cellular transceiver determines and stamps the time referred to and corresponding with the nearest or most recent network reception synchronization instance RSI or time instant. The cellular transceiver also stamps its internal clocks. Then the cellular transceiver counts the number of reception synchronization instances (related to frames from the cellular network) until the GPS positioning commences, so that a satisfactorily-accurate time estimate is on hand for position fix purposes, and handover between base stations is accommodated even though a transition occurs to a different set of RSIs from the new base station.

In some embodiments, a cellular engine CE is connected to a cellular network and tracks elapsed time referred to and corresponding with the signal receptions from the cellular network combined with its own clock or clocks that are operative in the respective periods. The CE uses specific synchronization or ID (identification) sequences in received signals in order to accurately determine the RSIs. The CE also uses received signals to determine and correct for the internal clock frequency offset relative to the more-accurate clock of the cellular network. The processing by the cellular engine CE gets the accurate time from the GPS Engine GE and timestamps it against, or correlates it to, the network time. The CE predicts future time relatively accurately using this information and the elapsed network time. The GE is then powered off to save power in the meantime. Upon the next time the GE powers on, the GE gets the predicted time from the CE and can thereby advantageously achieve a fast position fix. The position determination can depend on having a relatively accurate knowledge of or approximation to atomic clock time, and the CE thus provides such an excellent approximation.

In this way, total time to first position fix (TTFF) is reduced and minimized. Less than atomic-accuracy time from the cellular network is sufficient for reducing TTFF upon wakeup by the improved GPS unit. In other words, less than fully-accurate clocking either by a cellular transceiver clock source and a sleep mode clock source internally in the GPS engine GE and its associated cellular engine CE in a client terminal (such as a cellular handset) is sufficient for satisfactory operation of the GPS engine CE.

The improvements herein are applicable to a wide range of technologies and networks such as GSM and WCDMA (UMTS), which are unsynchronized networks. Where WCDMA hardware, protocol stack and assisted GPS (aGPS) are provided, WCDMA not only provides assisted GPS but benefits Total Time to First Fix (TTFF) for fixes subsequent to the handset power-up fix. The power-up first position fix can be expected to take a longer time than subsequent position fixes that are improved by this procedure. This longer latency interval is nevertheless acceptable first because when the cell phone is turned on, the cell phone consumes time before its display powers up and the phone gets camped on the cellular network. In power-efficient cell phone embodiments wherein power management and battery capacity allow the phone to be turned on for days or weeks, the occasions of power-up first position fix are fewer and the benefits even more greatly predominate as described herein for subsequent fixes. By virtue of the first position/time fix, the handset has now received the accurate time from the GPS, and subsequently tracks that time with the network. GPS fixes suitably performed periodically (e.g., every hour) keep this time accurate.

For example, consider a cellular handset user in a large city who wants to be directed to a desired destination by a software application on the cellular handset facilitated by the GPS position fix. User enters a large building where the GPS signal coverage is hypothetically lost, but cell coverage continues. There is no problem thanks to the improved procedure here because the cellular engine CE in the cell phone now tracks the time (see FIG. 8 or 9) with benefit of cell coverage of the cellular network until the phone can get coverage to the GPS satellite network again. User exits the building, walks out on the street and opens the map application on the cellular handset. The GPS unit now makes a fast fix, facilitated by the improved procedure and system embodiments herein, because GPS unit is provided with a relatively accurate time by the cellular engine CE, which speeds up the time to first fix. User advantageously obtains almost immediate street directions on where to go next in user's itinerary. If cell coverage is also temporarily lost while the GPS coverage is lost, the cellular engine CE continues to track time accurately and even further corrects itself if cellular coverage is regained prior to regaining GPS coverage.

Positioning assistance data provided by some cellular networks is also suitably used in some embodiments. Some other embodiments lack such cellular network positioning assistance data and determine the atomic time starting from a time instant determined from the satellite signals themselves and then approximate subsequent atomic time as it elapses by tracking network transmissions that have determinable and quite time-accurate time intervals. An internal clock for cellular engine CE and GPS engine GE need not be highly accurate and can be switched between an operational clock and a low current sleep mode clock.

Some of the embodiments are useful in a macrocell or asynchronous mobile system. Some of the process and structure embodiments herein maintain time in the cellular engine CE by a combination of RSI (receiver synchronization instances) and Clock (VCXO, DCO or VCTCXO running at a controlled frequency such as 13, 26, 38.4 MHz or other frequency) and using a strobed time instance conveyed between GE and CE. The cellular engine CE at handover from one base station to another copes with and accounts for change of reception time of RSIs due either to unsynchronized network frame transmission instances and/or change of reception synchronization instance RSI due to change of propagation delay due to differences in distances from one base station to another. For example, if one base station is located 4 kilometers away from the cell phone and reception changes to a frame synchronous base station that is 1 km away, the time change of reception instance RSI is 3000 [m]/3e8 [m/s]=10 μs. During handover the CE herein has data about the time differences between successive RSI and thereby corrects its clock instances to the new RSI from the new base station. Practical issues of GPS timekeeping between CE and GE are thereby solved.

Some of the embodiments provide different ways to solve the time-to-fix problem. Cellular engine (CE) can strobe GPS engine (GE) and, alternatively, GE can strobe CE instead. Different combinations of ways are provided for CE and GE to strobe each other. Different ways and moments in GE operation are utilized after GE wakes up and when GE time is updated by CE herein.

Different kinds of receiver embodiments are disclosed herein. One kind of receiver embodiments (FIG. 15, and examples combining FIGS. 15, 17, 18) initialize a counter and then count clocks between RSIs (receiver synchronization instances) and initialize the counter again. Another kind of receiver embodiment (FIG. 19) does a remodulation and phase recovery approach to estimate frequency and time from the cellular network and do timekeeping counter corrections.

Thus, some embodiments advantageously link GPS time tracking with cellular network time tracking. The cellular network time tracking of CE is based, in some further embodiments, both on the AFC (Frequency tracking) and the TOA (Time Of Arrival) tracking, which procedures are related or linked.

Figure 3:
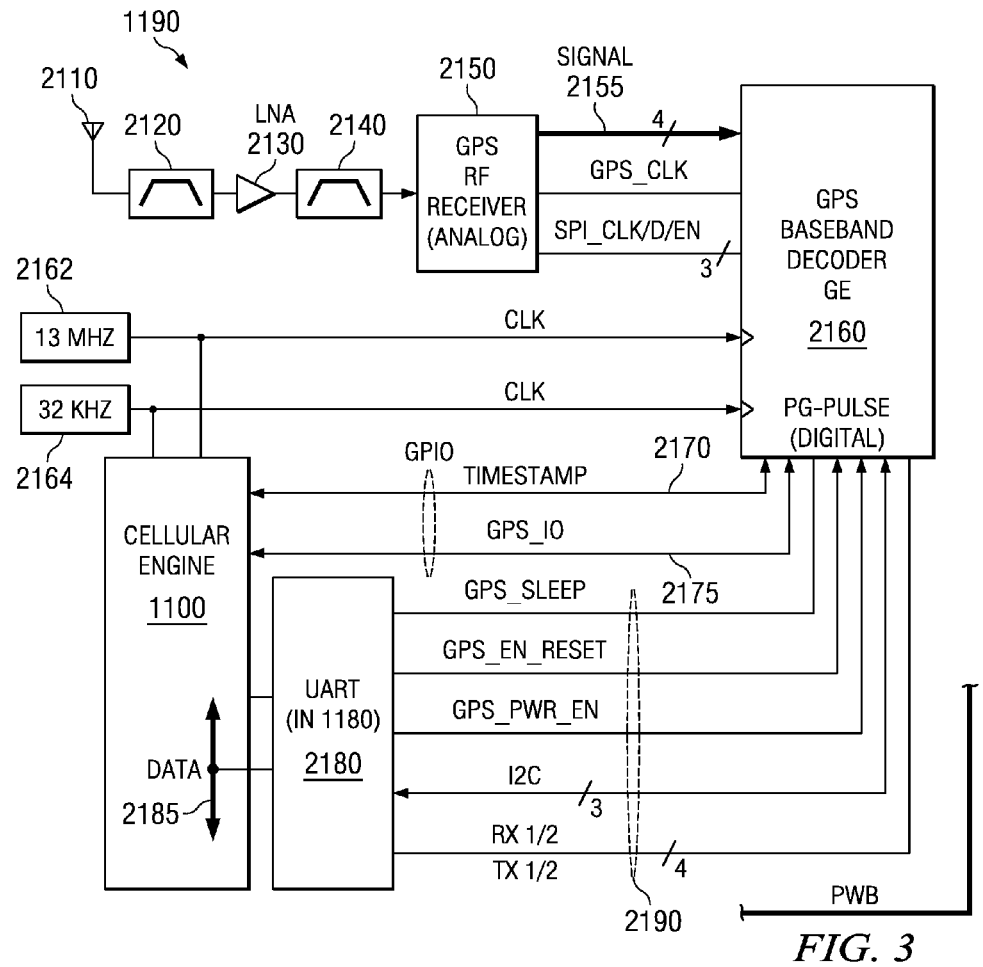
FIG. 3 is a block diagram of an inventive system including a satellite positioning engine or GPS engine GE inventively coupled with a processor integrated circuit in FIG. 2 operating as a cellular engine CE.

In FIG. 3, the improved system of FIG. 2 is further detailed. GPS unit 1190 has an antenna 2110 for reception of satellite positioning signals. Antenna 2110 is coupled to a bandpass filter 2120 followed by a low noise receiver amplifier LNA 2130 followed by another bandpass filter 2140. A GPS RF receiver 2150 is provided as an analog or mixed-signal integrated circuit fed from bandpass filter 2140. Receiver 2150 in turn supplies signals to a digital GPS baseband decoder 2160 integrated circuit. Receiver 2150 supplies four signal output lines 2155 to the GPS baseband decoder 2160. Three lines for SPI (serial port interface) clock, data, and enable and a further GPS clock line connect receiver 2150 and GPS baseband decoder 2160.

GPS baseband decoder 2160 is called a satellite positioning or GPS engine GE 2160 herein. GPS is a typical satellite positioning process for supplying information to GE 2160, and the acronym GE herein is used to designate a baseband decoder circuit for association with a satellite positioning engine herein whether of GPS type or any other satellite positioning scheme.

GE 2160 is coupled to integrated circuit 1100 (or 1400) of FIGS. 2 and 3 by lines TIMESTAMP 2170 and GPS_IO 2175. Processor integrated circuit 1100 (or 1400) as used for timekeeping herein is called a Communication Engine or Cellular Engine CE that is suitably provided as a processor in hardware, or in hardware combined with software or in hardware combined with firmware. CE is associated with, and/or integrated into, a communications modem including digital baseband DBB 1100, analog baseband ABB 1200 and RF transmitter/receiver TX/RX 1300 of FIG. 2. In FIG. 3, Cellular Engine CE acts as a processing engine for time information derived from the cellular communications network. CE also processes some information from GE 2160, or not, depending on embodiment. CE need not be limited to cellular or wireless communication networks.

In FIG. 3, a printed wiring board has signal connection line TIMESTAMP 2170 and GPS_IO 2175 that couple time-related information between the GE and CE. These lines are dedicated in some embodiments and are suitably shared with other uses in other embodiments. The signal connection line TIMESTAMP carries a strobe pulse that has a pulse edge that has a particular time of occurrence described by data sent on line GPS_IO 2175. Both lines 2170 and 2175 are bi-directional so that GE can send information over both lines to CE, and at another time CE can send information over both lines to GE. In still other embodiments, a single line 2170 carries both TIMESTAMP strobe and the data representing the particular time of the strobe. Still other embodiments send a strobe TIMESTAMP from GE to CE and send back a time from CE to GE, or send a strobe TIMESTAMP from CE to GE and send back a time from GE to CE as described elsewhere herein.

In FIG. 3, processor 1100 (or 1400) is coupled by a UART 2180 in interfaces 1180 of FIG. 2 to control the GE. Accordingly, a data bus 2185 in processor 1100 provides controls and data as parallel bits to the UART 2180 and these bits are supplied on particular lines in a set of lines 2190 to control the GE. For example, these lines convey control inputs to GE 2160 including a GSP_SLEEP input, a soft enable/reset GPS_EN_RESET, and a power up enable GPS_PWR_EN. Further lines to GE 2160 from UART 2180 include three I2C interface lines for bi-directional serial communication, and two pairs of lines TX1, RX1 and TX2, RX2 for communication directed to decoder 2160 on the RX1, RX2 lines and for communication to UART 2180 on the TX1, TX2 lines.

In FIG. 3, a first clock 2162 has a frequency illustratively between 10 and 100 MHz or higher, that during reception is continually (or selectively) locked to or synchronized with clocks present in base stations. Between receptions the first clock (e.g., 13 MHz) is switched off or is left to run depending on the operating mode. The first clock 2162 benefits from correction by the cellular network and the reciprocal of the frequency of the first clock 2162 is in range 0.1-0.01 ppm or less. The particular frequencies and ppm numbers are utilized to describe embodiments without limitation as to other embodiments.

Some embodiments introduce a second clock 2164 with a lower frequency, e.g., below 1 MHz. such as at 32 KHz). The second clock 2164 is on and operative between receptions when the first clock 2162 is turned off for power saving. Processing circuitry 1100 (or 1400) acts as CE and is connected to the cellular modem and to the first clock 2162 and second clock 2164 and to GE 2160. The cellular engine CE, for one example, performs the following method or process:

1) Measure the time instant of arrival (TOA) of signals from the cell base station 2050 relative to internal clock 2162 counts and last received synchronization instance (RSI). Each RSI is generated using burst, frame number and/or synchronization sequence SYNCHSEQ of FIG. 6C.

2) Generate a number $n_2$ of clock cycles or clock counts of first clock 2162 and/or clock counts $n_3$ of second clock 2164 until next RSI.

3) Receive and send accurate global time information SGT between cellular engine CE and GPS Engine GE and log the internal time SCT relative to global time SGT. Maintain a table in memory of the global time at which the first clock 2162 and/or the second clock 2164 generate their clock cycles.

4) Determine the time TOA of the instant of arrival of RSI signals and/or first clock 2162 and/or second clock 2164 using counters relative to the global time received from position determination unit PDU in the GE 2160. Project future time relative to one or more of the three time references, namely RSI instant or instance of arrival, and first clock source 2162, and second clock source 2164. Note the following aspects that are suitably or optionally implemented regarding this process step 4 and structures used.

Figure 15:
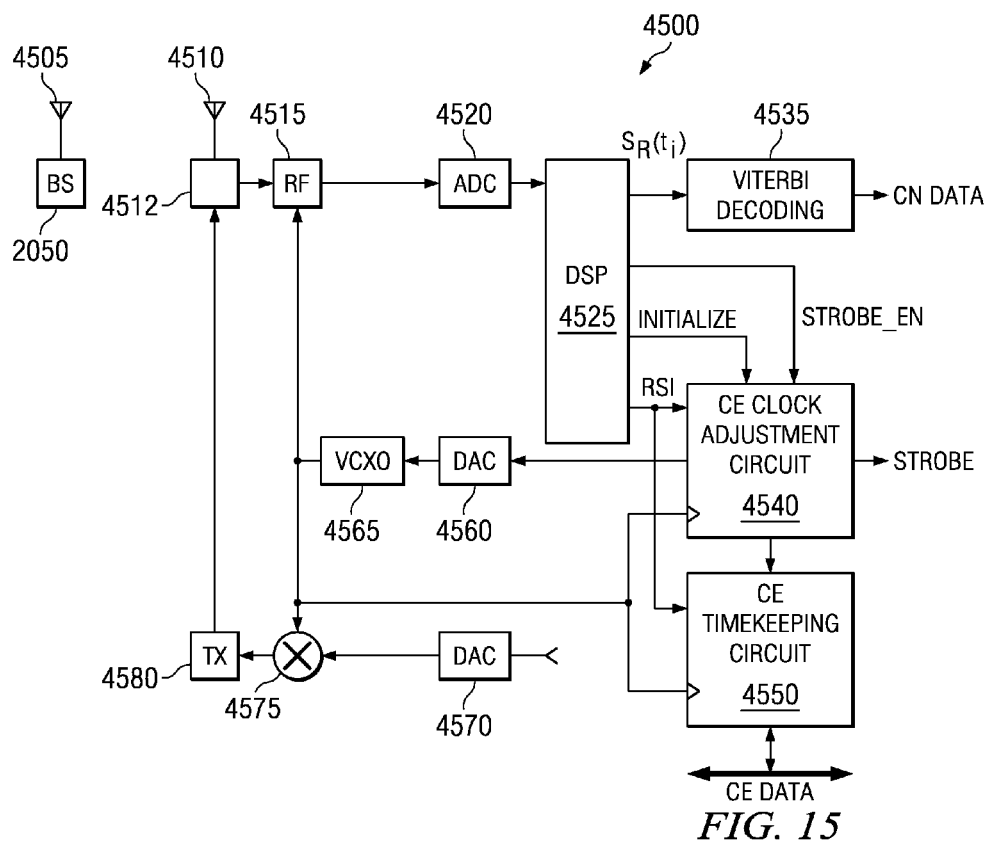
FIG. 15 is a block diagram of another form of an inventive cellular engine CE receiving from a remote cellular network base station BS or in overlapping cells of FIG. 4 of base stations sending RSIs (received synchronization instances) as in FIG. 16.

4.1) The process includes a correction for time of arrival offset when the cellular modem changes or performs handover to other base stations or channels as the source of information received. Some embodiments run the clocks and reset the clock adjustment (FIG. 15, 17). Other embodiments count RSIs, fractionally adjust them, count on handover, and adjust for RSI-RSI interval ratio if any between cells by a multiplier constant.

4.2) The process includes a correction for time of arrival changes such as due to Doppler effect when the cellular modem is moving. The correction for time of arrival changes suitably utilizes link propagation delay information sent from a wireless base station, such as timing-advance information. In different embodiments Doppler is handled by 1) averaging, 2) counter correction by RSI/clock, 3) frequency lock loop, or 4) phase lock loop.

4.3) The process includes a correction for crystal drift due to thermal effects and other causes.

Some embodiments transfers time information accurately between a GPS Engine GE and a Cellular Engine CE without requiring Atomic Time synchronized strobing signals. One type of operational process embodiment is called Process 1. See TABLE 2 for a Glossary.

TABLE 2

GLOSSARY

Figure 4:
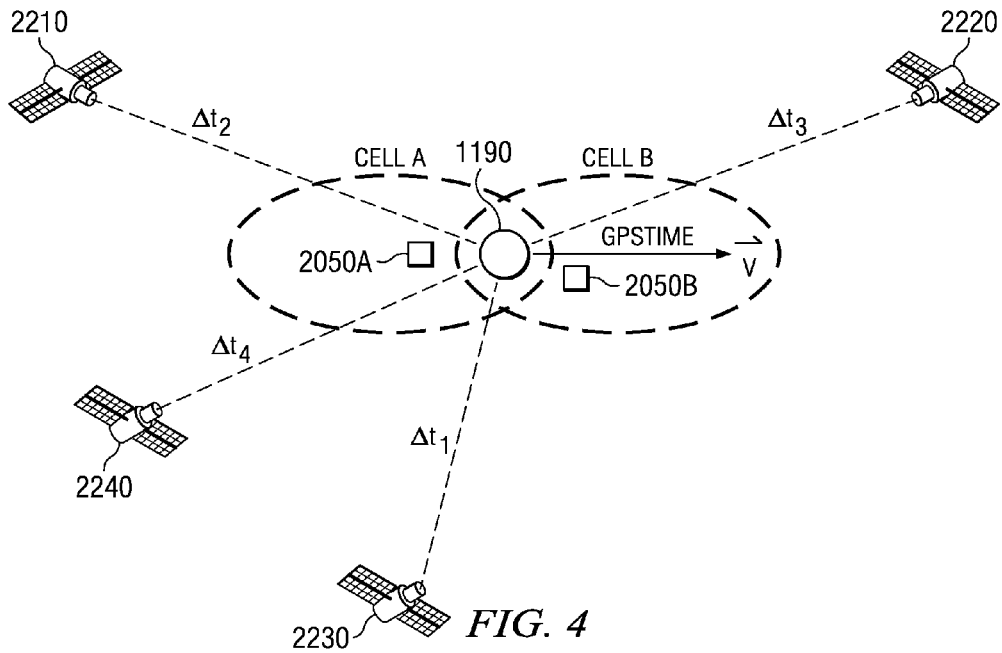
FIG. 4 is a partially pictorial, partially block diagram of orbiting positioning satellites and a GE/CE system of FIG. 3 coupled to receive satellite transmissions and cellular network signals when the GE/CE system is undergoing handoff from one cellular network cell to another cellular network cell.

| | |
|---|---|
| CE | Communication Engine associated with modem |
| GE | Satellite Positioning Engine such as a GPS unit |
| CN | Cellular Network |
| SPN | Satellite Positioning Network (e.g., GPS satellites) of FIG. 4 |
| GT | GPS Time (atomic reference, global time) |
| CT | Cellular Time |
| SGT | Stored GPS Time |
| SCT | Stored Cellular Time |

Figure 5:
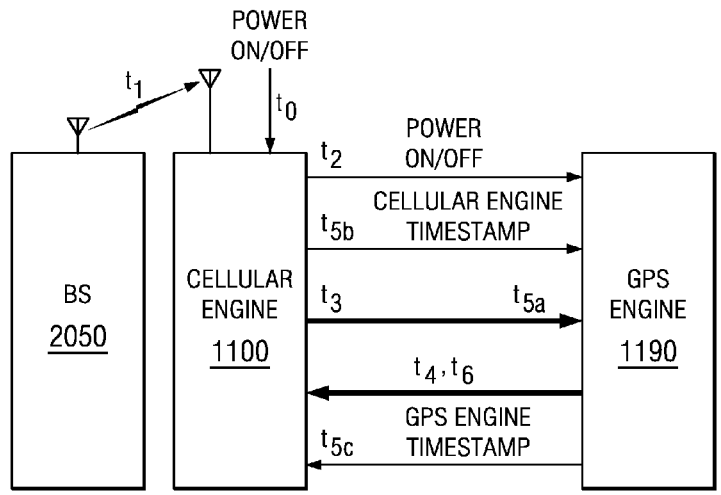
FIG. 5 is a block diagram of an inventive integrated circuit combination of a base station of FIG. 1 and an inventive GE/CE system of FIG. 3 showing various moments or times of operations on some coupling lines.

In FIGS. 3 and 5 after power-on, communications engine CE (e.g., in cell phone for GSM, CDMA or WCDMA or device with modem for WLAN 802.11, WiMAX, UWB, etc.) asks GE to make a position/time fix (power-up). If the modem has network-assisted GPS data, such data is loaded to the GPS unit GE prior to the request for position/time fix. When GE has determined the position/time fix and is about to be powered down, GE loads back the current GPS time to the CE. In some embodiments, CE and GE are on separate integrated circuits or chips, and in some other embodiments they are in separately controlled power domains on one integrated circuit substrate. This load-back operation is performed using a strobe signal called GE TIMESTAMP generated from either GE or CE and a message following indicating what the time (GPS) was at the strobe edge. The modem CE maintains the time by having and maintaining a synchronization to the cell network base station. For instance, GSM wireless network base stations are believed generally accurate to less than 0.05 ppm (parts per million) in stability of interval between RSIs even when absolute time itself is not sent over GSM. The time synchronization to the moderately-accurate clock of the base station 2050 is maintained by either making frequency error estimates on the cell network modulated signal as in FIG. 19 or by tracking the time slot positions or RSIs on the cellular network modulated signal as in FIG. 15. When GE has no fix after being powered down and then powered up, the communications engine CE sends the maintained time to re-powered GE together with possible network-assisted GPS data. This time from CE is linked to a timestamp signal generated from either GE or CE. The process then repeats itself.

A summary of Process 1 steps is provided next.

1. GE makes a first fix using whatever assistance information is provided by the asynchronous communications network. Some delay in making the first handset power-up fix is acceptable for reasons discussed hereinabove, but subsequent fixes are more rapid and are facilitated by the improved procedure described here.
2. When and given that first fix is already or earlier completed, CE generates a pulse on TIMESTAMP output line of FIGS. 3, 5 and 7 and stores the corresponding GSM or CDMA time (CT) or other time from an asynchronous communications network.
3. GE sends to CE the GPS time (GT) corresponding to the TIMESTAMP pulse sent from CE. GE goes to sleep.
4. CE stores the couple (CT, GT) in memory.
5. CE tracks elapsed CT time counting a combination of number $n_1$ of RSIs (received signal instances) from cellular network CN (e.g. correlating with synchronization or network ID (identification) sequences of FIG. 6C) and internal clock(s) counts $n_2$ and $n_3$.
6. Next time GPS fix is required, CE computes approximate atomic time GT-prime (GT') from current elapsed CT time which is relatively stable and much stabilized due to Frequency and/or Time tracking performed from Cellular (GSM) network signal itself at about 0.05 ppm accuracy. CE or the system awakens GE.

7. CE generates another TIMESTAMP pulse at the instant of time GT-prime (GT') and provides the TIMESTAMP pulse and its GT-prime (GT') time to GE.
8. GE performs the new fix rapidly using that GT-prime (GT') time information.
9. The process repeats starting from step 2 with GE still activated and CE maintains elapsed time CT while GE sleeps after step 3. Over time, the occurrences of timestamps come in close-spaced pairs of FIG. 5A corresponding to step 7 and step 2 in that order when GPS engine GE is briefly powered up.
10. Repeat the process from step 1 when GE is activated from sleep or otherwise powered up and CE has not been maintaining time CT while GE slept. If CE is activated from a power off state or battery discharged condition, this step 10 is executed.

In FIG. 4, the GPS unit 1190 receives a plurality of signals from satellites 2210, 2220, 2230, and 2240. Each of the satellites provides known pseudo-random signal sequences at intervals interspersed with identification and other data from each satellite. GE 2160 of FIG. 3 in GPS unit 1190 of FIG. 4, when sufficient time and power and signals to make a fix are available, can and does by itself generate a signal GPSTIME that recovers atomic-accuracy time from the satellite positioning system as well as generates position information specifying the geographic position of the GPS unit 1190. (The geographic position can also include GPS unit 1190 elevation above the surface of the earth, when enough GPS satellites are received.)

Cellular network base stations 2050A and 2050B, etc. establish respective geographic cells of cellular reception such as Cell A, Cell B, etc. The GPS unit 1190 has a velocity vector v that subjects the signals received by GPS unit 1190 to a degree of time-shift and phase-shift called the Doppler effect.

As described herein, desirable rapid positioning and time-to-first-fix operations are provided even when the circumstances of time and power and signals are less than sufficient to provide the atomic-accuracy time at all times by operation of the GPS unit 1190 alone. Improved processes, circuits and systems are provided herein by utilizing the availability of the CE, and recognizing and working within the stringent power and battery life demands of mobile devices and similar considerations and constraints in other portable and even fixed applications.

Even if and when WCDMA (UMTS) networks become more prevalent, WCDMA (UMTS) lacks an absolute time base so the arrangement where GE updates CE and CE updates GE is very useful. If even in the future even one base station lacks ability to provide absolute time, then this arrangement remains useful, since the situation can occur wherein CE needs to depend on GE for GPS time on power up first strobe as described. Where network providers find extra investment undesirable to provide absolute time in networks that do not ordinarily require absolute time, a wide deployment of absolute time capability in network infrastructure is less likely. The E911 need for emergency location of the cell phone for emergency assistance to a user, as well as GPS support for various user applications, make inexpensive, fast GPS position fixes desirable.

In GPS, three satellites send their satellite identification or position, plus their respective absolute times. GE recovers the three absolute times of arrival at GE. This time-recovery circuit portion is physically situated in GE. Position generation based on the time-recovery is situated locally to the GPS unit in some embodiments. Other embodiments alternatively provide for GE to thereupon send the time-recovered times to base station for off-loaded position generation. Keeping the entire GPS position determination in GE is efficient because 1) GE does not depend on CE to be powered up when GE is powered up, 2) GE does not compete with other apps for cellular bandwidth to talk to base station, and 3) GE does not depend on base station to do off-loaded position determination for GE. CE is powered down sometimes when GE is powered up without losing GE functionality and apps based on GPS unit 1190. Other times, GE is powered down and CE keeps time using processes taught herein involving Tcellular, Tonclock, and Tsleepclock as described herein and even when base station handover to a base station for another cell is involved.

Figure 6A:
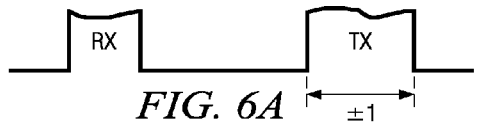
Figure 6B:
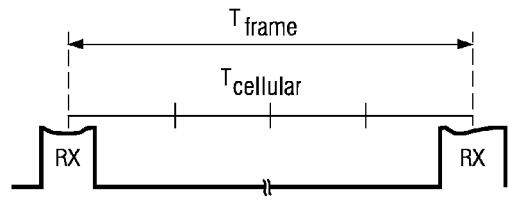
Figure 6C:
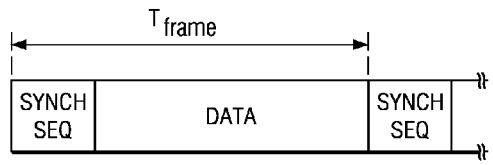
Figure 6D:
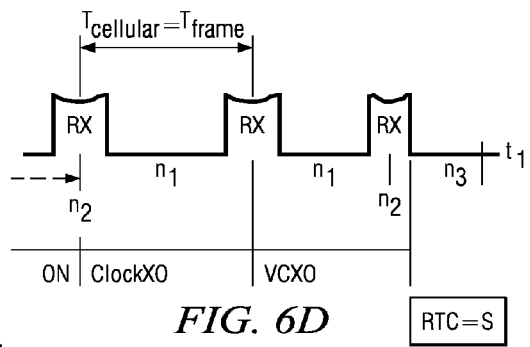

Received synchronization instances (RSIs) from the frames on the network are used to produce the time interval reference as further discussed herein in connection with FIGS. 6B, 6C and 6D.

Various embodiments as described herein are applicable to any of CDMA, WCDMA, GSM, GPRS, EDGE, UMTS, etc. WCDMA and UMTS are technologically similar and the embodiments are especially useful in the WCDMA network context because there is likely no absolute time base provided by the network.

To conserve accuracy, a CTPU (cellular time processor unit) as described herein is made quite accurate and controls CE generation of a TIMESTAMP hardware strobe signal and sends the TIMESTAMP strobe to GE. GE accordingly stores the corresponding cellular network time. In some embodiments, GE requests cellular network time from CE and then CE translates that cellular network time into GPS time and provides it to GE.

The system provides relatively simple yet powerful way to improve the performance of GPS and an asynchronous network especially in power-managed devices. CE AFC (Automatic Frequency Control) capability also improves the GPS performance.

In some embodiments, the CE and GE processes are suitably added as a ROM or other flash memory patch for an existing telecom product or as part of a new ROM release for a new telecom product whereby new interacting combinations of hardware result. Other embodiments provide new hardware structures along with new software for flash memory or ROM (read only memory).

In FIGS. 3, 5, 7 and 8, the CE (e.g., using Layer 1 of GSM 1) time stamps with microsecond or better accuracy a signal by generating an RSI pulse at a given known cellular network time provided by the already mentioned modem Time Processing Unit TPU in the modem of FIG. 2. This pulse is called a strobe herein and is provided by CE to the GPS unit 1190 to get the corresponding GPS time.

Figure 8A:
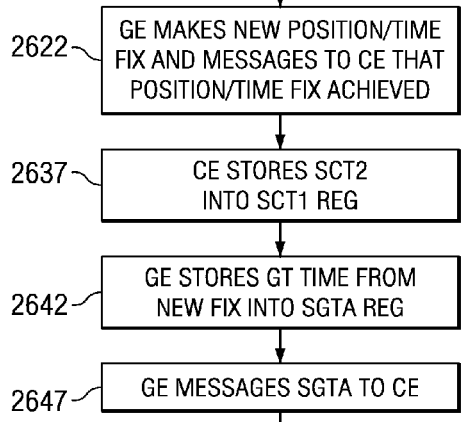
FIG. 8A is a flow diagram supplementing the flow diagram of FIG. 8, and FIG. 8A together with FIG. 8 depict another inventive process for single strobing of FIG. 5B.
Figure 7:
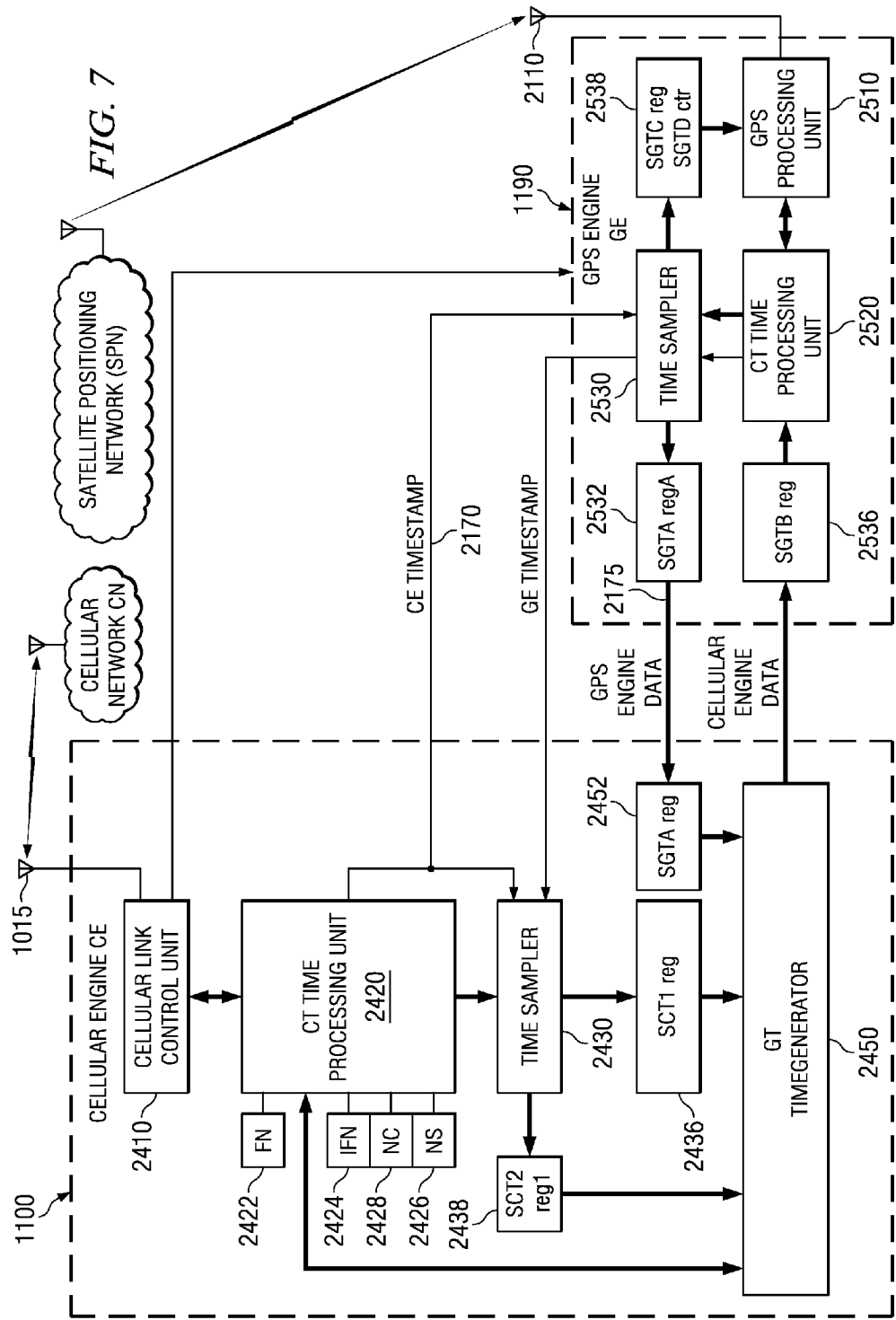
FIG. 7 is a block diagram of an inventive cellular engine CE and an inventive GPS engine GE coupled together into an inventive system and for receiving signals from a cellular network CN and a satellite positioning network SPN.
Figure 8:
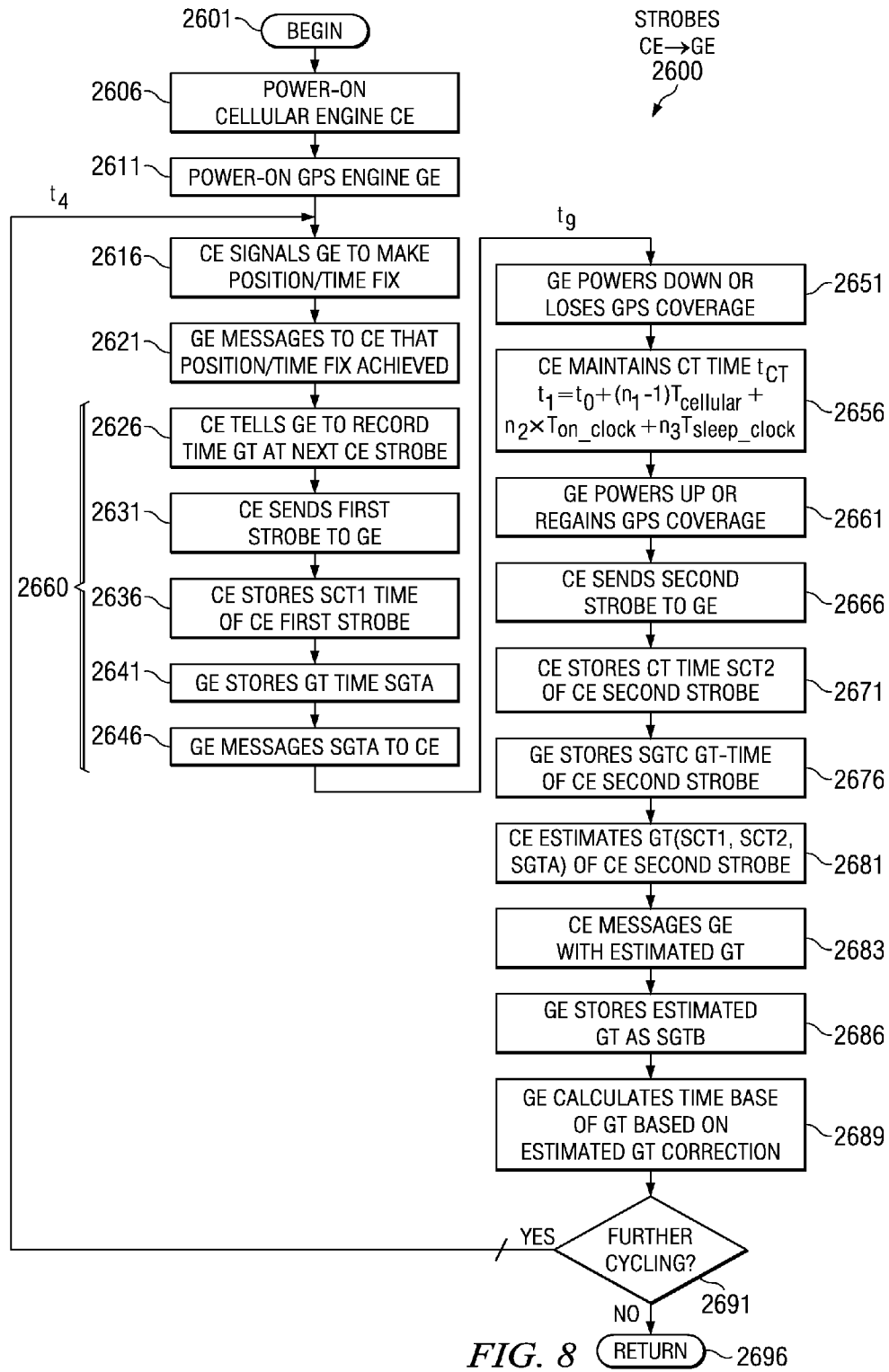
FIG. 8 is a flow diagram of an inventive process of operation of the inventive CE/GE of FIGS. 3, 5 and 7 wherein CE strobes GE.
Figure 9:
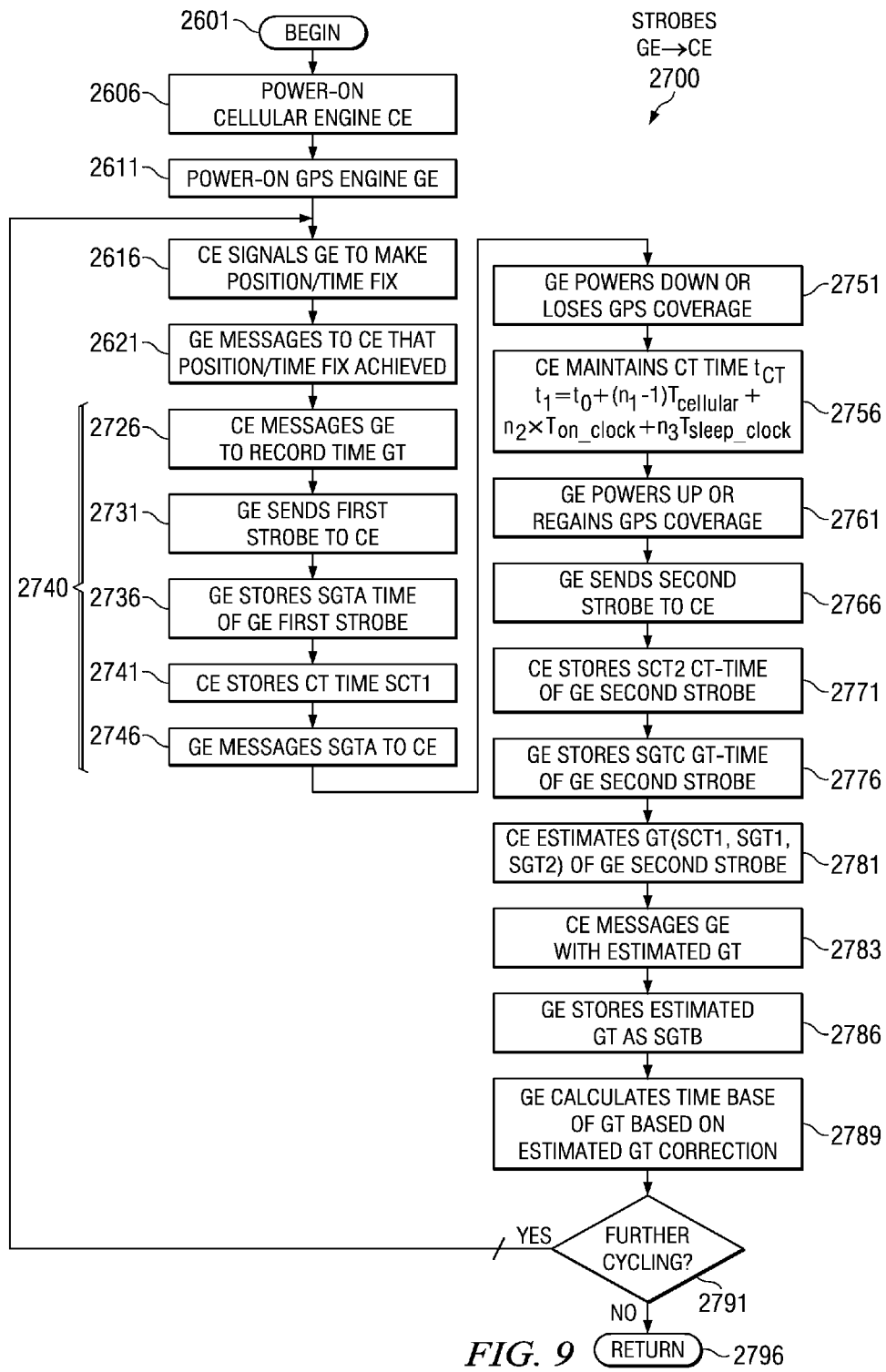
FIG. 9 is a flow diagram of another inventive process of operation of the inventive CE/GE of FIGS. 3, 5 and 7 wherein GE strobes CE.

In FIGS. 7, 8 and 9, the procedure(s) loads the absolute time corresponding to whichever strobing method is used (GE strobe to CE, or CE strobes GE) and maintains time in the CE. CE is camped to the cellular network (asynchronous) and maintains a very accurate relative time because of the cellular network time accuracy from the BTS (Base Station Transceiver System) or BS 2050. Even if an accurate absolute time from the network is unavailable, GPS can determine the absolute time very accurately. CE is used to maintain accurate relative time, or time elapsed from last known GPS absolute time even when the GPS core is powered down or when the cellular terminal is isolated from GPS coverage, such as in a metal enclosed building. Using CE and GE to cooperate with each other synergistically delivers a fast total time to fix.

Two examples of embodiments for tracking the cellular base station BS 2050 clock/time reference by the CE are as follows:

1) Time of arrival (TOA). See FIG. 15. Based on the training sequence (or spreading codes for (W)CDMA systems) in the received burst (pagings, traffic or data burst) the channel processing keeps L1 (Layer 1) updated on the time reference on the received burst. This time estimation may have short term variations on the order of microseconds due to propagation path, but the long term error averages to the BTS reference clock.

Figure 19:
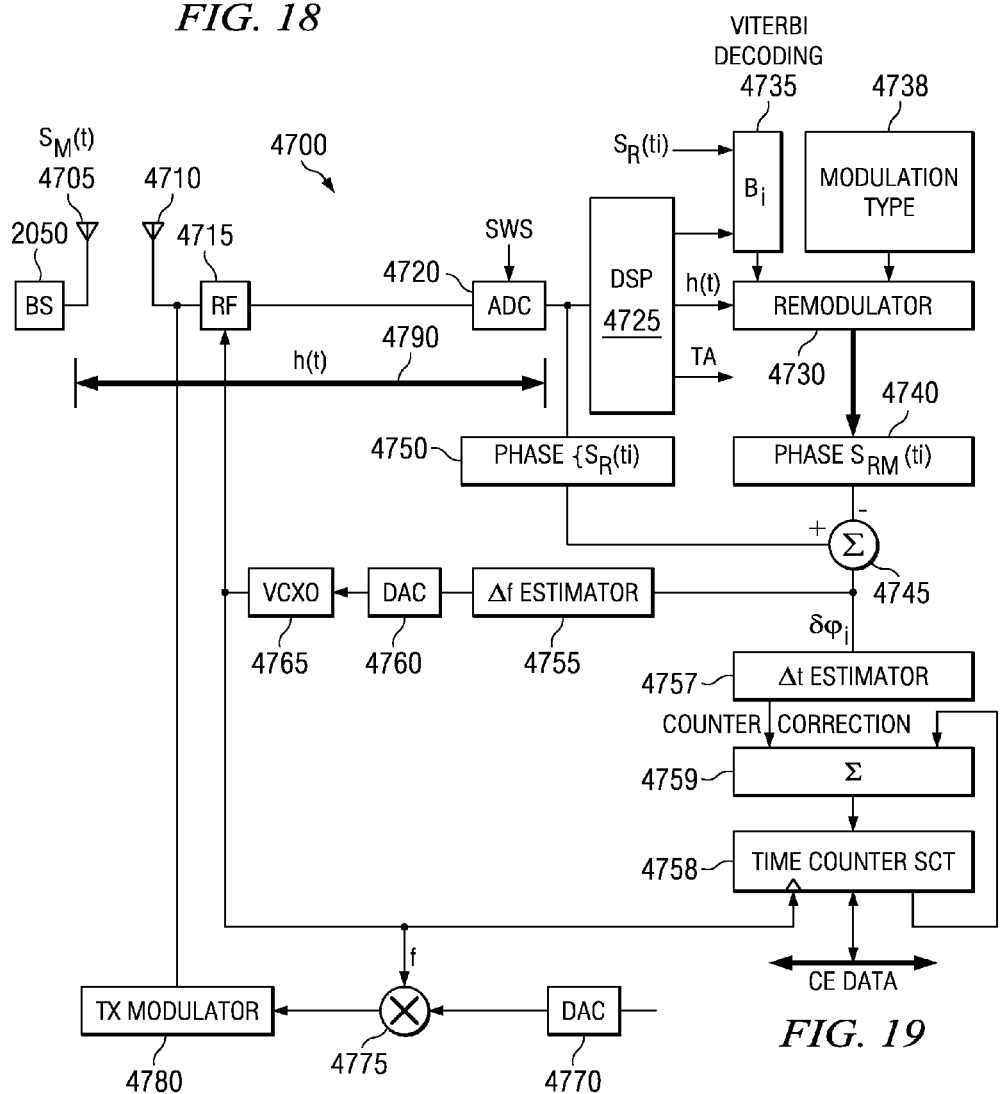
FIG. 19 is a block diagram of another inventive cellular engine CE receiving from a remote cellular network base station BS or in overlapping cells of FIG. 4 of base stations and inventively combining inventive phase/frequency control circuitry and inventive time counter and counter correction circuitry.

2) AFC (automatic frequency control) tracks the BTS radio frequency with good short term accuracy by a Reference clock (e.g. 13 MHz) AFC process as in FIG. 19 and also is used for sleep clock (e.g., 32 KHz) calibration for GE in FIGS. 3 and 5. In this way, an inexpensive but stable sleep clock time base is also usefully employed in the system.

At 0.05 ppm the integrated time accuracy of a GSM base station BS 2050 is 0.18 milliseconds (ms) per hour of elapsed time. This works out to 6.48 milliseconds over 36 hours of elapsed time. Put another way, the integrated time accuracy is 3.6 ms./ppm/hr (=6.48/(0.05×36)).

In some embodiments, hardware as shown in FIG. 15 and using a protocol layer such as GSM Layer L1 suitably accounts for special situations when determining accurate relative time to the GPS atomic clock, such as when the cellular modem is doing channel handover in a given cell or handover from one cell to another cell. In some embodiments, internal clock (e.g., VCXO) maintains accurate relative time during handover as discussed herein.

Another embodiment has GE provide a reference time strobe (GE Timestamp in FIG. 9 acts as a reverse timestamp) and timing is defined by and based on a predetermined signal edge of the corresponding GE Timestamp strobe pulse. The circuitry of FIG. 3 uses GE to drive an interrupt IRQ into the CE at an interrupt driven IO on CE.

In FIG. 4, network assistance data is also optionally used as discussed herein and suitably includes any such data that is supported by the cellular network. Examples are Orbit data, Almanac, and ephemeris data and time. (Ephemeris refers to satellite position data over time.) Assistance data are believed to be not mandatory in GSM/WCDMA and may not be available from some actual networks. GSM and WCDMA (both 3GPP standards) may incorporate optional time information, one called Time of Week and another called TDMA Timestamp. TDMA Timestamp timewise connects, identifies, and refers a specific transmission over the network to the Time of Week.

NTP (network time protocol) pertains to an internet protocol. NTP is used in some embodiments of the improved procedures and improved systems herein where the internet is supported by and runs on the cell handset 2010 or other telecom terminal embodiment through data transmission functionality like HSDPA, HSUPA, and/or WLAN, and other wireless and wireline data services.

In FIG. 5, Cellular modem or engine CE is reciprocally coupled with satellite positioning GPS engine GE. Time designations of FIG. 5 are tabulated in TABLE 3.

TABLE 3

TIME DESIGNATIONS FOR COMMUNICATIONS BETWEEN CE AND GE

| TIME DESIGNATION | REMARKS |
|---|---|
| $t_0$ | Power on of CE |
| $t_1$ | Get possible assisted position data from network |
| $t_2$ | Power on of GE |
| $t_3$ | CE signals GE to make fix and reply when ready |
| $t_4$ | GE tells CE that fix is achieved |
| $t_{5a}$ | CE asks GE for time info |
| | Make reference time instance |
| $t_{5b}$ | --either from CE |
| $t_{5c}$ | --or from GE |
| $t_6$ | GE sends time message referred to |
| | either GE TIMESTAMP or CE TIMESTAMP signal. |

In FIGS. 3 and 5, the TIMESTAMP strobe is suitably connected via a GPIO (general purpose input-output) line between the CE processor 1100 (1400) and the GE. The system operates to get time from GPS GE and maintain it in CE synchronized to cellular network. The system loads back time to GPS GE when GPS wakes up or is powered up. The operation is based on 1) starting with a known time GT of last strobe pulse and maintain a running counter f=Fcount, and then 2) using internal reference clock time at arbitrary second strobe pulse, and then 3) generate a usefully accurate estimate of Time-Now GT-prime (GT') for loading back to GPS GE.

In FIGS. 3, 5 and 7, in a cellular terminal embodiment or system embodiment, such as a cell telephone handset of FIGS. 1 and 2, the terminal or system has a cellular unit which is herein designated Cellular Engine CE. Cellular Engine CE connects to a Cellular Network and a Positioning Determination Unit which is herein called GPS Engine or GE synchronizing to a Satellite Positioning network.

The Cellular Engine CE gets the atomic clock time from the GPS Engine GE and maintains the clock in the Cellular Engine CE. The clock is maintained accurately in the Cellular Engine CE because the clock is locked or synchronized to an accurate clock in the cellular network (<0.05 ppm). The Cellular Engine CE feeds back the time to the GPS Engine GE when the GPS engine does not have an accurate clock such as when GPS Engine GE has been powered down or is without GPS satellite coverage.

Figure 5A:
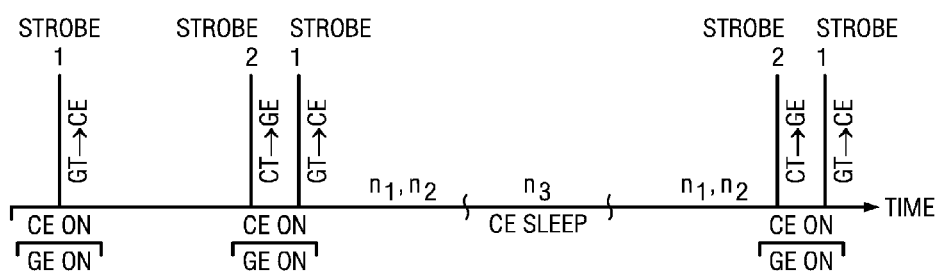
FIG. 5A is a timing diagram of an inventive process of operation of the inventive CE/GE systems of FIGS. 3, 5 and 7 showing paired strobes.
Figure 5B:
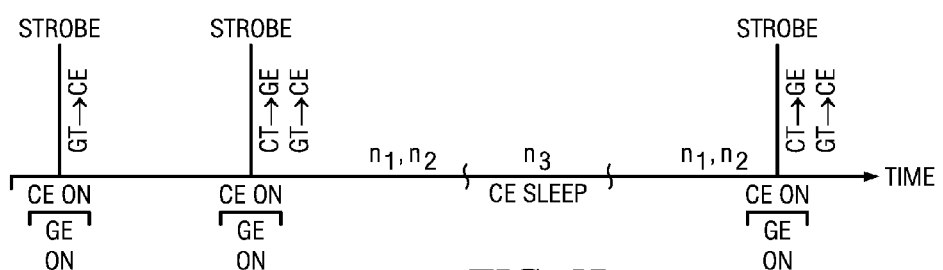
FIG. 5B is a timing diagram of another inventive process of operation of the inventive CE/GE systems of FIGS. 3, 5 and 7 showing single strobes.

In the description "on_clock" and "reference_clock" can refer to a same first clock such as clock 2162 of FIG. 3. Also, "sleep_clock" and real time clock "RTC" refer to a same second clock such as clock 2164. In other embodiments, the on-clock, reference clock, sleep clock and RTC can be all different clocks. FIGS. 6A, 6B, 6C, 6D have different scales from figure to figure. FIGS. 5A and 5B have comparable time scales that are different from the time scales of FIGS. 6A-6D.

In FIG. 6A, a receive RX pulse is followed by a transmit TX pulse which has plus or minus one (+/−1) symbol of jitter. For instance, receive and transmit operations may occupy different time slots in a time division communications system. Pulse position determination is determined as a particular counting number representative of symbol position.

In FIG. 6B, a pair of successive receive RX pulses from the cellular network CN have their pulse midpoints displaced by a time interval Tframe. The RX pulses are used in a process of determining whether or not Tframe is equal to a time Tcellular maintained in the cellular engine CE. If not, the reference clock 2162 in cellular engine CE is suitably stabilized as taught herein to make Tcellular=Tframe in FIG. 6B and 6D.

In FIG. 6C, a GSM frame is used to derive a RSI (received synchronization instance). The GSM frame includes a synchronization symbol sequence and a frame number FN followed by frame Data, and then another frame begins with its own synchronization symbol sequence.

In FIG. 6D, a series of successive RX pulses have legends beneath the series. Similar to FIG. 6B, a pair of successive receive RX pulses have their pulse midpoints displaced by a time interval Tcellular. The RX pulses are used in a process of determining whether or not Tcellular is equal to Tframe. In FIG. 6D, an ON mode is activated and an ON-interval elapses before a first pulse RX is acquired from the cellular network. This ON interval occupies a number $n_2$ of reference clock cycles to the midpoint of this first RX pulse. The number $n_2$ is counted when the modem is not delivering RSIs.

Then in FIG. 6D, a number $n_1$ of synchronized time base timing clock cycles from the reference clock (e.g., a VCXO as in FIGS. 15 and 19) measures a time interval from midpoint-to-midpoint or RSI-to-RSI of each successive pair of RX pulses in the series. The rightmost or last RX pulse in the series has a legend $n_2$ showing a number of timing clock cycles from the midpoint to the falling edge of that last RX pulse.

Further in FIG. 6D, a subsequent time interval $t_1$ evolves a third number $n_3$ of the timing clock cycles during a sleep mode for the CE processor of FIGS. 3 and 5. The real time clock RTC 2164 acts as sleep clock, and measurements and corrections thereto are made to determine the exact period of sleep clock. RSIs and reference clock are used prior to CE power down to make measurements and corrections to the measurements of the period of sleep clock.

In FIG. 7, Cellular Engine CE has a Cellular Link Control Unit CLCU 2410 in digital baseband 1100 coupled to receive timing from Cellular Network CN via handset antenna 1015. CLCU 2410 is bi-directionally coupled to a Cellular Time Processing Unit CTPU 2420. CTPU 2420 supplies a CE TIMESTAMP strobe on a CE Timestamp line 2170 coupled to GPS Engine GE 1190. CTPU 2420 maintains a counter 2422 for Frame Number FN, a counter 2424 for Intra-Frame Number IFN, a counter 2426 for Number of Sleep clock counts NS of 32 kHz sleep clock and a counter 2428 for Number of Counts NC of 13 MHz clock. Different embodiments provide and use some or all of these counters, or alternatively provide other circuits.

CTPU 2420 supplies counter information and strobe to a Time Sampler 2430. Time Sampler 2430 responds to the strobe and supplies outputs to a first SCT stored cellular time register 2436 for time SCT1 representing a first Strobe 1, and to a second SCT register 2438 for SCT2 representing a later Strobe 2. For instance, in FIG. 5A these strobes are labeled Strobe 1 and Strobe 2. The strobes span an interval in at least part of which interval GE is off. GE absolute time data SGTA for Strobe 1 is fed from GE 1190 to a register 2452 in CE.

A Global Time GT Generator GTG 2450 accesses SCT1 register 2436, SCT2 register 2438, and SGTA register 2452 and using the information from those registers generates a GPS time estimate SGTB. GTG 2450 supplies estimate SGTB as CE Data to GPS Engine GE. Also GTG 2450 is coupled to CTPU 2420 and feeds adjustments back to CTPU 2420 to keep CTPU 2420 synchronized with Cellular Network CN.

Further in FIG. 7, GPS Engine GE 1190 (1495) has a GPS Processing Unit 2510 coupled to GPS antenna 2110 for receiving satellite signals from a Satellite Positioning Network SPN. GPS Processing Unit 2510 supplies position data for use by handset 1010. GPS Processing Unit 2510 supplies GPS high-accuracy time to a GE CT Time processing unit GCTPU 2520 in GE. GCTPU 2520 is coupled to a GE Time Sampler 2530 which responds to CE TIMESTAMP on line 2170 to generate the GPS time SGTA of the first strobe Strobe 1 in FIG. 5A to a register SGTA regA 2532 that in turn feeds the SGTA GE Data on line 2175 to SGTA register 2452 in CE.

Later, after GE has powered off and powered up again, Strobe 2 is exchanged between CE and GE. CE feeds back time value SGTB of Strobe 2 as CE Data on line 2175 or an additional line to GE to a register 2536 for holding time value SGTB. GCTPU 2520 accesses SGTB register 2536 and together with GE Time Sampler 2530 supplies a time value SGTC of the second strobe to a register SGTC reg 2538. GPS Processing Unit 2510 then uses the time SGTC from the register 2538 to reduce the total time to establish a fix consumed by GPS Processing Unit 2510.

FIG. 7 shows a separate line for a GE-generated strobe GE TIMESTAMP for use in some alternative embodiments. In such case GE TIMESTAMP is sent the second strobe Strobe 2, or as both first and second strobes, along a timestamp line from GE Time Sampler 2530 to CE Time Sampler 2430. GE data on line 2175 correspondingly supplies a value of the GPS Time SGTA of the GE generated strobe Strobe 1 whereupon GE powers down. Later, CE data to SGTB register 2536 supplies a value of CE-approximated GPS time SGTB corresponding to Strobe 2 from GE when GE powers back up.

Now the process steps are even more extensively listed and specifically described in connection with FIG. 8 and an alternative process is described using FIG. 9. In FIG. 8, process steps are further detailed using 26xx numerals. In FIG. 9, process steps are labeled using 27xx numerals where the illustrated process of FIG. 9 is different from that of FIG. 8. The reader may place FIGS. 8 and 9 side-by-side for comparison. Time identifiers T0 through T13 herein help differentiate various moments of the processes.

In FIG. 8 operations commence at a BEGIN 2601. Steps 2601-2621 are the same in FIGS. 8 and 9.

T0) The CE is powered on (e.g., by user) in a step 2606.

T1) The CE gets possible GPS assist data from cellular network CN (optional).

T2) The GE is powered on in a step 2611.

T3) The CE provides possible GPS assisted data to GE, as obtained in step T1.

T4) The CE asks GE to make a position and/or time fix in step 2616.

T5) The GE makes a position/time fix in a step and sends a message to CE in step 2621 that the position and/or time fix is achieved. The message is provided either by CE polling UART 2180 of FIG. 3, or by using interrupt circuit methodology with IRQ line GPS_IO 2175 in FIG. 3. CE receives the message.

Following step T5 just above either of the following sequences "a)" or "b)" of steps are performed. These sequences each have three steps. The steps for sequence "a)" are respectively designated T6a, T7a, T8a and shown in FIG. 8. The steps for sequence "b)" are respectively designated T6b, T7b, T8b and shown in FIG. 9.

First Alternative Sequence a) 2660 of FIG. 8:

T6a) In step 2626, the CE sends a signal or message to GE to record time GT at next CE TIMESTAMP strobe pulse 2 of FIG. 5A. GPS_IO 2175 or UART 2180 of FIG. 3 is used for the signal or message. Some embodiments suitably use CE TIMESTAMP 2170 as both a signal line and a strobe line. GE receives the message.

T7a) In step 2631, the CE sends a CE TIMESTAMP strobe pulse Strobe 2 to GE 1190 and stores cellular time CT time (SCT1) of an edge of the strobe at step 2636 as either a single register value representing a time SCT1 or as a set of counts SCT1 {FN; NC; NS}, or counts accompanied by an initial time reference SCT1 {FN; NC; NS; CT (old)}. When the CE sends TIMESTAMP pulse Strobe 2 to GE 1190 in step 2631 the CE Timestamp is suitably sent at a synchronous instance (for example, when intra-frame count FN reaches RSI+constant). For simplicity, the RSI instance matches the RSI instance that is used for updating CT time. If another RSI instance is chosen, the difference in clock counts is accounted for in the projection process.

In response to CE strobe 2 of step 2631, GE time sampler 2530 concurrently samples GPS time at the moment of Strobe 2 and then stores a value of GPS time SGTA into SGTA regA 2532 in a step 2641 of FIG. 8. Thus, the CE operation at step 2631 establishes the instant when the CE TIMESTAMP pulse is generated and the CE in step 2636 thereupon determines and stores the CT time SCT1 as the time of that CE TIMESTAMP pulse. In step 2641, GE correspondingly stores a GPS time SGTA pertaining to the CE TIMESTAMP pulse.

T8a) In step 2646 of FIG. 8, the GE 1190 further responds by sending a message to CE with the GPS time SGTA of step 2641 referred and pertaining to CE TIMESTAMP Strobe 2 of step 2631. At this point CE now has i) established the CE TIMESTAMP that CE generated itself for use as a reference instant for keeping absolute time thereafter, ii) the time SCT1 pertaining to CE TIMESTAMP, and iii) the GPS time SGTA delivered from GE and pertaining to CE TIMESTAMP. One instant named CE TIMESTAMP now has time representations in the cellular time system SCT1 and in the GPS time system SGTA for that same one instant. Since both times SCT1 and SGTA refer to the same instant $t_{5b}$ of FIG. 5 and Strobe 2 defined by the CE timestamp, it is possible to also correct a cellular time CT (old) in embodiments wherein the CTPU 2420 of FIG. 7 operates on absolute time. This pair of time representations in cellular time system and GPS time system is thus achieved by the process as described here in First Alternative Sequence a) 2660 of FIG. 8. Notice that the physical propagation delay on the board PWB from CE to GE in FIG. 3 is small (nanoseconds) for this purpose. Accordingly, correction for the time delay on the board for propagating the strobe from the originating circuit CE to the receiving circuit GE, corrects for a slight lag of SGTA behind SCT1 in T8a, and is included or omitted depending on embodiment and magnitude of the lag compared to desired accuracy.

Second Alternative Sequence b) 2740 of FIG. 9:

T6b) In a step 2726, the CE sends a message to GE to return GPS time and a strobe pulse. GE receives the message from GPS_IO 2175 or UART 2180 of FIG. 3, for instance.

T7b) In step 2731, the GE sends GE TIMESTAMP strobe pulse to CE. The GE stores a corresponding time SGTA in a step 2736. The CE stores CT time SCT1 in a step 2741 as a single register value for time SCT1 or as a set of counts SCT1 {FN; NC; NS}, or counts accompanied by an initial time reference SCT1 {FN; NC; NS; CT (old)}. Thus, the GE operation at step 2731 determines the instant when the GE TIMESTAMP pulse is generated and the CE in step 2741 thereupon determines and stores the cellular network time SCT1 as the time of that GE TIMESTAMP pulse received by CE from GE over the TIMESTAMP line of FIG. 3 and GE TIMESTAMP line of FIGS. 5 and 7.

T8b) In step 2746, the GE further sends a message to CE with the GPS time SGTA of step 2736 referred and pertaining to the GE TIMESTAMP strobe instant established by GE in step 2731. At this point CE now has i) the GE TIMESTAMP sent in step 2731 from GE for use as a reference instant for keeping time thereafter, ii) the time SCT1 generated by CE in step 2741 pertaining to GE TIMESTAMP, and iii) the GPS time SGTA delivered from GE pertaining to GE TIMESTAMP. One instant named GE TIMESTAMP now has time representations in both the cellular time system SCT1 and in the GPS time system SGTA for that same one instant. Since both times SCT1 and SGTA refer to the same instant defined by the GE timestamp, it is also possible to correct a cellular time CT (old) in embodiments wherein the CTPU 2420 of FIG. 7 operates on absolute time. This pair of time representations in cellular time system and GPS time system is thus achieved by the process as described here in this Second Alternative Sequence b) 2740 of FIG. 9. Notice that the physical propagation delay on the board PWB from GE to CE in FIG. 3 is small (nanoseconds) for this purpose. Accordingly, correction for the time delay on the board for propagating the strobe from the originating circuit GE to the receiving circuit CE corrects for a slight lag of SCT1 behind SGTA in T8b, and is included or omitted depending on embodiment and magnitude of the lag compared to desired accuracy.

The process now continues with steps T9-T13 next described for FIGS. 8 and 9.

T9) The GPS in step 2651 (2751) now enters a period of time without GPS coverage or powered down. The CE maintains cellular time SCT in different embodiments either by T9.1) tracking network timeslot/synchronization sequence time as in FIGS. 15 and 18, or T9.2) by tracking the network frequency as in FIG. 19, or T9.3 by a combination of T9.1 and T9.2.

In FIGS. 8 and 9, the network timeslot/synchronization time is tracked in step 2656 by counting frame number FN referred to the network frame timings and additionally to make time fixes of instance of arrival of RSIs (received synchronization signals) referred to the CE clock 2162, and by counting internal clock 2162 of FIG. 3 (clock 4565 of FIG. 15 and 4765 of FIG. 19). The instant or instance of arrival is considered as a clock beat or tick. The cellular engine CE has prior knowledge of the atomic time interval of frame based receptions (clock beats), based on the network communication standard. The CE determines the frame interval by receiving frames from the cellular network CN. Elapsed network time is generated within CE at any RSI instance, based on the time of reception and Frame numbering and internal clock(s) counts.

A time projecting process for step 2656 is expressed for an example, as a sum of counter values or as a sum of hardware and/or software multiplications and additions of products of time intervals and counter values representing numbers n of clock beats according to Equation (1).

$$t_{CT} = t_0 + (n_1 - 1) \times T_{cellular} + n_2 \times T_{on\_clock} + n_3 \times T_{sleep\_Clock} \quad (1)$$

where $t_0$ is absolute time SCT1 at last strobe.

$t_{CT}$ is projected time SCT or estimated absolute time based on time projection.

$n_1$ is the integer frame number of transmissions of frame length $T_{cellular}$ between $t_0$ and $t_{CT}$ $n_2$ is the number of on-clock periods of $T_{on-clock}$, e.g. 1/(13 MHz), not overlapping the periods counted with $n_1$.

$n_3$ is the number of sleep clock periods not overlapping periods counted with $n_1$ or $n_2$, e.g., of Tsleep clock length 31.25 microseconds or 1/(32 KHz).

In an alternative process, Equation (2) of a time-projecting process of step 2656 keeps separate count of the intra-frame number IFN designated $n_4$ that counts an intra-frame interval $T_{ifn}$ that is 12 periods, for instance, of $T_{on\_clock}$. The processor 1100 transitions from sleep clock count $n_3$ to cellular count $n_1$ on an integral sleep clock pulse boundary. The processor transitions from sleep clock to cellular counts on a reference clock on_clock pulse boundary. For purposes of Equation (2), the number $n_2$ is the number of on-clock periods $T_{on\_clock}$ beyond the most recent intra-frame count IFN at which a transition from network connection to disconnection by the modem occurs.

$$t_{CT}=t_0+(n_1-1)\times T_{cellular}+n_4\times T_{ifn}+n_2\times T_{on\_clock}+n_3\times T_{sleep\_Clock} \quad (2)$$

or $$t_{CT}=t_0+(n_1-1)\times T_{cellular}+(n_4\times Cnst1+n_2)\times T_{on\_clock}+n_3\times T_{sleep\_Clock} \quad (3)$$

where
$n_4$ is the number of intra-frame counts not overlapping the periods counted with $n_1$.

Cnst1 is a constant (e.g., 12) number of $T_{on\_clock}$ periods in one intra-frame period $T_{ifn}$ and represented by one intra-frame IFN count.

Projecting time in both CE and GE domains can have both CE and GE based on seconds as unit time interval, or use a conversion between the unit time intervals of both systems CE and GE. The above equations (1) and (2) express ways to convert time from a set of counts {n1,n2,n3} to a system of some absolute reference (e.g., Coordinated Universal Time UTC) and with a single time step resolution. The process is applied when time is stored to a register or requested as absolute time. If a time interval between strobes is requested, then the time $t_0$ can be set to zero.

$T_{cellular}$ applies to the frame length (e.g., 4.62 milliseconds) defined by the network standard. In the description of a particular embodiment hereinbelow on_clock and reference_clock refer to a same first clock 2162 of FIG. 3 such as the 13 MHz clock. Some embodiments count intervals of 0.9225 microseconds or 12 periods of the 13 MHz clock as in process Equations (2) and (3). Also, sleep_clock and RTC (real time clock) refer to a same second clock 2164. In other embodiments, the on-clock, reference clock, sleep clock and RTC are different clocks and the description of the process is adjusted from process (1) or (2) to another analogous process based on the time projection as taught herein.

CT Time processing unit CTPU 2420 of FIG. 7 maintains tracks the traffic counts {$n_3$ $n_2$ $n_1$}. The counted periods are suitably non-overlapping and cover all the elapsing time intervals leaving no time gaps in the measuring process. The counter(s) 2422, 2424, 2426, 2428 used to generate the time interval between strobes and the estimated absolute time are selected by CTPU 2420 depending on mode of operation as tabulated in TABLE 4. "Down" refers to respective GPS or CN no-coverage status or low power data retention sleep mode. CE UP refers to fully functional power-up of CE regardless of CN coverage.

TABLE 4

MODE DEPENDENCE OF COUNTERS

| Mode | Counter | Remarks |
| --- | --- | --- |
| GE UP/ CE UP | $n_4, n_2,$ $n_1$ | FN and IFN are selected and counting in CE during CE coverage. NC counts on-clock if/when CN coverage is lost (GE powered up with GPS coverage) Strobes and time data are exchanged between CE and GE. |
| CE UP/ GE DOWN | $n_4, n_2,$ $n_1$ | FN and IFN are Selected and Counting in CE during CN coverage. NC counts on-clock if/when CN coverage is lost. Sleep counter NS is in retention re $n_3$. (GE either lacks GPS coverage or is asleep or off) |
| GE UP/ | $n_3$ | Sleep counter NS is selected and counting. |

TABLE 4-continued

MODE DEPENDENCE OF COUNTERS

| Mode | Counter | Remarks |
| --- | --- | --- |
| CE DOWN | | FN, IFN, NC in retention |
| CE DOWN/ GE DOWN | $n_3$ | FN and IFN and NC are deselected and in retention, not counting. Sleep counter NS is Selected and Counting (GE either lacks GPS coverage or is asleep or off) (CE is asleep) |
| CE OFF | | All counters zeroed or deselected |

Network CN has handover situations and the CE corrects for handover adjustments as discussed elsewhere herein.

Count $n_1$ and $T_{cellular}$: In FIG. 7, the quantities $n_1$ and $T_{cellular}$ are obtained by cellular time processing unit CTPU 2420. When connection to cellular network CN is established, the CE is synchronous with the CN and traffic time counted on CE or CN is based on frame number FN, and process counts up the $n_1$ counter 2422. Such a process is called, for instance, at every RSI received synchronization instance.

T_cellular is the duration in time at which a certain state or event is repeated in the cellular network CN. For the above example it is the Frame duration in FIG. 6B in the cellular system (GSM establishes 4.62 milliseconds). The occurrence of RSIs (receiver synchronization instances) normally occurs at periodicity of the frame length or multiples thereof.

When there is no connection to the network CN and the Reference clock (e.g., 13 MHz) is on (CE UP), the elapsed time in units of $T_{on\_clock}$ is counted on the Reference clock 2162 to update count $n_2$.

T_on_clock=reciprocal of Reference source frequency, where reference source frequency is the actual frequency obtained by calibration to network CN as in FIG. 15 and/or FIG. 19.

When there is no connection to the CN and only the Real Time Clock RTC 2164 is running, the elapsed time is counted in $T_{sleep\_Clock}$ units on the RTC counter NS 2426 to update count $n_3$.

$T_{sleep\_Clock}$=reciprocal of RTC source frequency, where RTC source frequency is the actual RTC frequency obtained by calibration to network CN and/or Reference clock 2162.

When connection to cellular network CN is present, but the connection changes timing such as by handover, the count $n_2$ is updated. This is suitably done by adjusting the count $n_2$ with the number of clock cycles equivalent to the time interval difference between RSIs.

Tonclock and Tsleepclock are both moderately stable because they are based on internal crystal-control but can vary with temperature. Time intervals Tonclock and Tsleepclock have low accuracy from unit to unit since cost-saving forces use of low cost, lower accuracy crystals. However, the low accuracy is acceptable from a cost standpoint, using the teachings herein. Also, low cost crystals and oscillator circuitry may exhibit more frequency drift due to temperature and other variations in the oscillator circuit(s) 2162 and 2164. Accordingly, some of the embodiments provide repeated calibration of the time units in count registers or provide stabilization feedback to stabilize either or both of the oscillators 2162 and 2164. Crystal accuracy here refers to the closeness of the actual crystal frequency to a nominal frequency that the crystal was manufactured to approximate. Crystal stability here refers to the degree to which the actual crystal frequency does not vary, regardless of its closeness to some nominal frequency.

An example GSM cellular network CN is based on a reference clock of 13 MHz. Each symbol period is 3.69 microseconds (us) or 48 cycle periods of a 13 MHz clock (48 counts in counter NC). Each timeslot has 156.25 symbol periods. A frame in GSM has 8 timeslots (Frame length of 4.62 milliseconds). Frames are combined into a frame structure of multiple frames, for example called multi-frame or super-frame or hyper-frame.

In FIG. 7, the number of frames FN is counted with frame counter 2422 using a modulus matching the size of the frame structure. For example, the GSM frame structure is called a hyper-frame and has 2,715,647 frames (approximately 3.5 hours). The frame counter 2422 uses the hyper-frame size as modulus so that frame count FN increments from 0 to 2,715,647 and rolls over.

An intra-frame counter 2424 of an intra-frame number or count IFN is further provided and has a clock period of one Quarter of the Symbol period (1 QS equals ¼×3.69 us equals 0.9225 us). The total frame length therefore has 156.25×8×4=5000 QS counts. The intra-frame counter IFN counts QS periods modulo 5000. Within the frames, or between RSIs if the RSI-RSI interval is longer, the intra-frame number IFN is counted modulo an intra-frame modulus such as 5000; (0<=RSI_N<=5000).

For example, given an inaccurate CE clock near 13 MHz, the RSI may correspond in QS count IFN, or count position herein, to a particular value RCP0 (e.g., 4937 decimal, say) at a first RSI synchronization instance. If the Reference clock 2162 is stable despite its inaccuracy in this example, each subsequent RSI count position RCP stays constant and equal to RCP0 (assuming the handset or terminal 2010 is not physically moving). Over a long time, however, the RSI count position RCP will change due to crystal drift in the nominally 13 MHz time base. Some embodiments as in FIGS. 15 and 19 stabilize the CE clock using feedback to adjust CE clock up or down in frequency to stay synchronous to the network timebase. Other embodiments count RSIs in counter FN 2422 and continually update RCP0 so that when cellular coverage is lost, the CE internal clock is counted in counter NC modulo latest RCP0 to update the counter FN 2422 and to interpolate for a fractional RSI when a strobe 2 comes along. The interpolation amount is RCP/RCP0×$T_{cellular}$.

A GSM system has different modes of operation of the link connection such as 1) a synchronized connection mode where RSI occurs at every frame count (for example, Traffic mode or call established), 2) a synchronized paging mode where RSI occur at intervals of a multiple of frames (for example, paging mode where cellular phone stays synchronous to the network CN and processor goes to sleep between the RSI instances), and 3) an unsynchronized mode where network signal cannot be or has not been received or synchronization established.

In FIG. 7 GPS (and cellular) time tracking, the CT Time Processing Unit (counters, register and process) 2420 keeps track of elapsed time, depending on mode of operation of the CE (synchronized, connected, paging, not connected, Reference clock running, Only sleep mode clock running) and changes between modes. See also TABLE 4. CTPU 2420 in some embodiments is mode-based and combined with processes of time tracking and synchronization to the cellular network CN to share counters.

In FIG. 7, an example of a CT time processing unit CTPU 2420 contains the following counters and registers:
FN: Frame count (0 to 2,715,647) used as $n_1$ or to determine $n_1$ (counter 2422)
IFN: Intra Frame count (can be 0 to 5000) used as $n_4$ (counter 2424)
NS: An RTC sleep mode clock 2164 counter (32 kHz) used as $n_3$ (counter 2426)
NC: A cellular reference clock 2162 counter (13 MHz) used as $n_2$ (counter 2428)

The process appropriately accounts for rollover in a counter such as at end of a hyperframe in counter 2422. In some embodiments, CTPU 2420 initiates signals and processing steps at instances when IFN counter equals an RSI event timing number (IFN time synchronous event) as in the example of updating RSI count position RCP0 above.

Some embodiments re-use a thermal sensor provided in the handset and couple it to the processor which runs an additional correction process to correct the counter RCP0 for thermally-caused crystal drift when the oscillator 2162 of 2164 is running freely and/or cellular network CN coverage is absent. For instance, each on-chip sensor used for adaptive voltage scaling (AVS) of FIG. 12 has a temperature dependence and is suitably also used for predicting thermally-caused crystal drift or other oscillator drift in the on-clock oscillator and real-time clock RTC oscillator. Some embodiments further provide temperature variation modeling software and parameters for a counter correction process thereof. For example, given a constant ambient, a transition to sleep mode can produce a predictable temperature variation in the CE as a function of time, and this is translated into counter corrections for a clock period of the sleep clock or RTC. Similarly, given a change in battery current to the CE due to MPU and IVA running more or fewer applications when the ambient temperature is constant, a predictable temperature variation in the CE can result, and this is translated into counter corrections for the counter value RCP0. Some modeling software also receives ambient temperature sensor data and analogously accounts for changes in ambient temperature in determining the corrections when cellular network coverage is temporarily unavailable or in case of a sleep mode.

For the purpose of maintaining a CT time estimate, the CTPU 2420 starts a process at predetermined frame count FN intervals or triggered by events occurring in the Cellular link control unit 2410 (for example, loss of signal, handover, connection established etc.) The input to the CTPU 2420 process is suitably any one or more of the following: type of event occurring, relevant frame count interval used since last process call, handover RSI change, RSI, FN, GT time information, or other input. The elapsed time data to accumulate relative to time at last process call to CTPU 2420 is determined depending on the type of event triggering the call of the process.

Internal oscillator drift is suitably detected and delivers a correction or adjustment to the time counter(s) as in FIGS. 15 and 19. Frequency stabilization of the nominally 13 MHz internal clock is provided in the process. Another form of frequency lock loop is provided as in FIG. 19 to lock onto the network-based RSIs that establish time intervals accurately in the CE. This loop provides automatic frequency control (AFC).

In FIG. 7, an example of pseudocode for a time generating process in GT Time Generator 2450 to determine elapsed or absolute CE Time clock (T9) after a strobe 1 and delta (counter change) to strobe 2 is shown in TABLE 5.

TABLE 5

PSEUDOCODE FOR TIME GENERATING PROCESS

BEGIN
  IF steady synchronous mode :
    Delta_FN = FN − FN_old;
    Delta_IFN = 0 or retention if not 0.

TABLE 5-continued

PSEUDOCODE FOR TIME GENERATING PROCESS

```
    Delta_NC=0 or retention if not 0.
    Delta_NS=0 or retention if not 0.
IF QS and/or FN has been changed (for example due to handover, use
number RSI in new CN cell):
    Delta_FN=RSI–RSI_old;
    Delta_IFN=(QS–QS_old) mod 5000;
    Delta_NC=0;
    Delta_NS=0 or retention if not 0.
IF connection lost and NC running:
    Delta_FN = 0 or retention if not 0.
    Delta_IFN=0 or retention if not 0.
    Delta_NC=NC – NC old;
    Delta_NS=0 or retention if not 0.
IF connection lost and NC not running, sleep clock is used:
    Delta_FN = 0 or retention if not 0.
    Delta_IFN=0 or retention if not 0.
    Delta_NC= 0 or retention if not 0.
    Delta_NS=NS – NS_old;
```

In response to a strobe 2 of FIG. 5A, the processed time is saved in an elapsed counts time format {FN; NC; NS; t0}:

```
{ FN = FN_old + Delta_FN;
  NC = NC_old + Delta_NC + Delta_IFN * Cnst1;   (Cnst1 =12)
  NS = NS_old + Delta_NS; t0 }
```

Frame number FN and RSIs continue to be monitored after strobe 2. When a strobe 1 thereafter occurs, the holding variables that represented an earlier time instant are updated:
FN_old=FN;
QS_old=0;
NC_old=NC;
NS_old=0;
$t_0$=GT from GE representing new strobe 1.
End of pseudocode.

In response to strobe 2, absolute time is determined according to processes of Equations (3) and/or (1) of step 2656.

$$t = t_0 + FN \times T\_frame + NC \times T\_On\_Clock + NS \times T\_Sleep\_Clock;$$

Time $t_0$ at an RSI instance when used for Strobe 1 is calibrated with a time source like atomic time assist from Cellular Network or with GPS time from GE. The time $t_0$ value is not altered in between two GPS fixes, and then is accounted for or updated in the time projection fed back by CE to the GE. When GE is used for strobing, the strobe is not necessarily coincident with an RSI, so current values of FN, QS, NC are used to update FN_old, QS_old, and NC_old.

Counts {FN; NC; NS} are integer counts.

Times and intervals {t0, T_frame, T_On_Clock, T_Sleep_Clock} have numerical formats and values that match the resolution and timebase used for the clock projection. Absolute time is generated by process Equation (2) to directly yield absolute time CT as follows:

$$CT = CT\_old + Delta\_FN \times T\_frame + Delta\_IFN \times T\_QS + Delta\_NC \times T\_On\_Clock + Delta\_NS \times T\_Sleep\_Clock\};$$

where CT_Old at an earlier RSI instance used for Strobe 1 is calibrated with a time source like atomic time assist from Cellular Network or with GPS time from GE. The time CT is updated between two GPS fixes.

The counts NC and NS are suitably sampled at known synchronous instances (for instance when synchronized, the processing suitably occurs when NC clock counting rounds or reaches RSI count position RCP0 which refers to the count position of an RSI to which subsequent RSI count positions RCP resulting from counting from internal clock are to be locked or referenced. In some embodiments, each value of discrepancy RCP-RCP0 is used as an adjustment to the internal clock, as described later hereinbelow in connection with FIGS. 15 and 17.

The description herein has been describing step 2656 in FIG. 8 and step 2756 in FIG. 9. Sampling and projection of time SGTB as a function of SCT1, SGTA, SCT2 are described next. When a second timestamp is to be exchanged between CE and GE (or has been exchanged), a process similar to the one above is advantageously called to determine and store projected time at the second timestamp strobe 2. This process desirably uses and projects from the counter information determined for strobe 1 that was generated by the first CE synchronous timestamp instance (first alternative sequence a) 2660 of FIG. 8 or by a first GE timestamp instance (b) (2740 of FIG. 9). The time information that gets stored is in any format mentioned in the processes hereinabove.

Four embodiments, among others, are categorized and arranged to operate according the source CE or GE of the first and second timestamps: {CE, CE}, {GE, GE}, {CE, GE}, {GE, CE}. FIG. 8 shows a process embodiment {CE, CE} wherein CE is source of both the first and second strobes. FIG. 9 shows a process embodiment {GE, GE}, wherein GE is source of both the first and second strobes. The other two categories of embodiment {CE, GE} and {GE, CE} are prepared in an analogous manner based on the teachings herein.

In FIG. 8, GE 1190 in step 2651 has lost GPS coverage, or been put in a sleep mode by a signal on line GPS_SLEEP of FIG. 3, or experienced a warm reset on line GPS_EN_RESET, or been powered down by a signal on GSP_PWR_EN. In the meantime, CE maintains CT time in step 2656. FIG. 9 shows another embodiment using 27xx numerals with corresponding last two digits to identify reciprocally analogous steps in CE and GE.

T10) In step 2661, the GPS GE is ready to make a fix when GE is powered up in step 2661 or determines by a series of reception tries that full GPS coverage has now returned. If the GPS assist data is available from CN, then the GPS assist data from CN is sent from CE to GE.

T11) In step 2666 of FIG. 8, CE now sends a second CE TIMESTAMP strobe pulse Strobe 2 to GE (distinct from and subsequent to the CE TIMESTAMP pulse of T7*a* step 2631). In alternative embodiment step 2766 of FIG. 9, GE is the unit that sends the second strobe pulse GE TIMESTAMP to CE (distinct from and subsequent to the GE TIMESTAMP pulse of T7*b* step 2731). In step 2671, CE stores current time CT of this new CE TIMESTAMP pulse as SCT2, the second stored cellular time as either counts SCT2 {FN; NC; NS}, counts with an initial time reference SCT2 {FN; NC; NS; t0} or as a single time SCT2 value.

When the CE at step 2666 sends the second TIMESTAMP pulse strobe 2 to GE, that strobe 2 is suitably sent at a synchronous instance, for example, at an RSI if CN coverage in on or when clock count rounds or reaches RSI count position RCP0 if CN coverage is off. For simplicity, the RSI instance matches the RSI instance that is used for updating CT time. If another RSI instance is chosen, the difference in RSI and clock counts is accounted for in the projection process.

In step 2676, GE correspondingly stores the GPS time of this new CE TIMESTAMP pulse as SGTC, the second stored GPS time.

T12) In step 2681, CE performs an estimation of the GPS time SGTB of that new CE TIMESTAMP pulse. The estimation of SGTB is calculated from SCT1, SCT2 and SGTA. An example for linear time units is suitably:

$$SGTB = SGTA + (SCT2 - SCT1) \qquad (4)$$

See also the description hereinabove in connection with step 2656.

In step 2683 of FIG. 8, CE sends a message to GE communicating the GT estimated by CE of that new CE TIMESTAMP pulse strobe 2. In step 2686, the GE stores the GT time content of the message as the value SGTB in GE storage.

In step 2689 GE generates a GPS time correction based on SGTB and SGTC. In an example of such a time correction at step 2689, the current time (now later than strobe 2) of the GE is corrected with the difference SGTB-SGTC as both SGTB from CE and SGTC (GE internal) are timestamps referring to the same event.

If GT' is uncorrected time in GE, and GT designates corrected time in GE, then step 2689 performs an adjustment $$GT=GT'+SGTB-SGTC. \quad (5)$$

GE thus corrects the internal time base of GE based on the generated time correction.

T13) The procedure now goes back and repeats, starting with T4 and step 2616. If and when CE powers down, operations loop back to BEGIN 2805.

As described herein, CE-estimated GT time is stored in GE as SGTB and is associated with strobe 2. By way of further detail, time SGTB is determined at step 2681 by the GT time generator 2450 in CE according to the following pseudocode examples of process operation, among other alternatives.

IF CE saves and processes time as absolute time and calibrates CT time to GE time, {CT}, then SGTB corresponds to cellular time CT (doing any conversions in format between CT time format and GPS time format).

IF CE saves time as counts with an absolute time reference {t0, SCT {FN; NC; NS; t0}:

$$SGTB=SGTA+FN \times T\_\text{cellular}+NC \times T\_\text{On\_Clock}+NS \times T\_\text{Sleep\_Clock}; \quad (6)$$

SGTB is generated just above by the GT Time Generator 2450 for a system maintaining and saving time SGTA, SCT1, SCT2 as absolute time {CT} by recognizing that the process Equation (1) is differenced (symbol deltaΔ) to yield differenced numbers n:

$$SGTB-SGTA=SCT2-SCT1=\Delta n_1 \times T_{cellular} + \Delta n_2 \times T_{on\_clock} + \Delta n_3 \times T_{sleep\_Clock} \quad (7)$$

The difference expressed by Equation (7) is then added to a known absolute time $t_0$, which is herein called old cellular time SCT1 or cellular time of first CE Timestamp strobe, in pseudocode as follows. The result is a desired cellular time SCT2 of the second CE Timestamp strobe.

$$SCT2=SCT1+(FN-FN_{13}\text{old}) \times T\text{cellular}$$

$$+(NC-NC\_\text{old}) \times T\_\text{on\_clock}$$

$$+(NS-NS\_\text{old}) \times T\_\text{sleep\_clock} \quad (8)$$

GE can provide the time format used by GE for known GPS time $t_0$ as SGTA. For simplicity in some embodiments, the desired global time estimate SGTB for the second Timestamp strobe is generated by CE in the same time format used by GE.

IF CE saves time as counts {FN; NC; NS} and does no calibration of a possible absolute time reference, then:

$$SGTB=SGTA+(FN-FN\_\text{old}) \times T\_\text{cellular}+$$

$$(NC-NC\_\text{old}) \times T\_\text{On\_Clock}+$$

$$(NS-NS\_\text{old}) \times T\_\text{Sleep\_Clock}; \quad (9)$$

Appropriate embodiments are prepared depending on considerations of engineering economy, precision of resulting time SGTB and desired absolute time accuracy and calibration of cellular time.

A correction example is tabulated in TABLE 6. SGTB is CE time designation for $2^{nd}$ strobe. Time SGTB is combined with time SGTC to get a corrected GPS time GT using correction process Equation (5).

TABLE 6

CORRECTED GPS TIME AFTER STROBE 2

| RSI # | GT | GT' | SGTB | SGTC | SGTD |
|---|---|---|---|---|---|
| 1 | 17 | 11 | 17 | 11 | 0 |
| 2 | 18 | 12 | 17 | 11 | 1 |
| 3 | 19 | 13 | 17 | 11 | 2 |
| 4 | 20 | 14 | 17 | 11 | 3 |
| 5 | 21 | 15 | 17 | 11 | 4 |

In step 2689, software corrects GT' with difference SGTB-SGTC in some embodiments. In some other embodiments, a GE counter SGTD is provided that starts counting from zero in step 2666 in response to the second strobe. The GE register 2538 is replaced by the GE counter for SGTD. Step 2676 is omitted. When SGTB is sent from CE to GE, a GE register 2536 in step 2686 is loaded with SGTB, and the GE counter SGTD continues counting as in TABLE 6. Correct time GT equals sum of SGTB now in register 2536 added to the counter SGTD value at any time after register 2536 is loaded with SGTB. The corresponding equations that lead to this alternative are shown next.

$$GT=GT'+SGTB-SGTC \quad (10)$$

$$GT=SGTB+(GT'-SGTC) \quad (11)$$

$$\text{Let } SGTD=GT'-SGTC \quad (12)$$

$$\text{Then } GT=SGTB+SGTD \quad (13)$$

In some embodiments, multiplier constants are not used to relate the actual number representing the time interval between RSIs (receiver synchronization instances) to the time periods represented by the actual numbers Tonclock and Tsleepclock. The network clock and RSI are used to establish the precise time period interval of Tonclock and Tsleepclock. Network clock and RSI establish Tcellular directly.

Some embodiments, after receiving Strobe 2, in effect reuse Strobe 2 itself as a new strobe 1. See FIG. 5B. Thus the value SGTC from step 2676 is used to help GE make a new fast fix of a new SGTA, and SCT2 becomes used as a new SCT1 in CE. GE can be powered down thereafter and then powered up later whereupon a new strobe 2 is issued, and new values for SCT2 and SGTB are computed, etc. The number of strobes is cut in half since Strobe 1 and Strobe 2 in FIG. 5A become the same strobe in FIG. 5B.

For some single-strobe embodiments of FIG. 5B, the steps of FIGS. 8 and 9 are revised as follows: At step 2691 (2791), further cycling (Yes) goes not to step 2616 but to a series of separate steps in FIG. 8A, enumerated for comparison by reader one digit above corresponding steps in FIG. 8. In FIG. 8A, step 2691 (2791) Yes goes to a step 2622 wherein GE swiftly makes a fast new position/time fix and GE in FIG. 8A step 2622 messages to CE that a position/time fix is achieved. Next, in a step 2637, CE stores the SCT2 value from SCT2 reg 2438 of FIG. 7 into SCT1 reg 2436. This is because the CE-generated ending time estimate SCT2 at the single strobe is the same as and now becomes the beginning CE time to be updated when a next future strobe arrives.

A succeeding step 2642 in FIG. 8A has GE store GT Time from the new fix into SGTA regA 2532 in GE of FIG. 7. Notice that the new fix by GE occurs at a GPS time designated SGTE herein, and delayed by an interval measured in SGTD counter beyond the occurrence of the strobe at which CE estimated time value SGTB was provided by CE to GE at step 2686 (FIG. 8) to speed up the new fix by GE. Accordingly, at steps 2642 and 2647 of FIG. 8A, GE generates and provides CE with absolute time value SGTA where $$SGTA=SGTE-SGTD \tag{14}$$

Thus, in step 2647 of FIG. 8A, GE messages SGTA from register 2532 to SGTA reg 2452 in CE, whereupon operations go to step 2651 of FIG. 8 and continue to cycle until no further cycling is needed (No) at step 2691 (2791).

Figure 10:
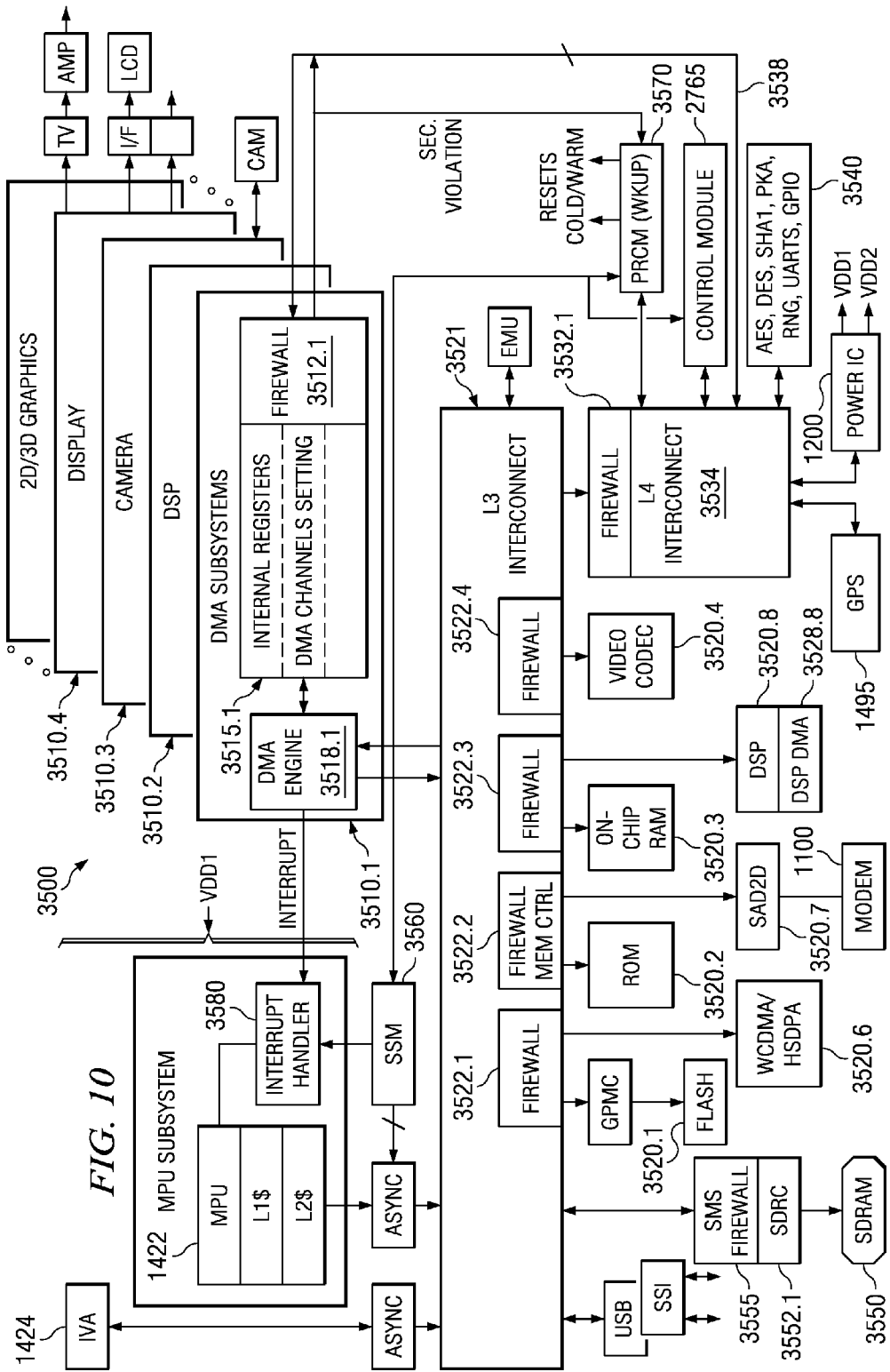
FIG. 10 is a block diagram of an inventive position-based system including an inventive applications processor integrated circuit in FIG. 2 with associated circuits including an inventive GPS circuit for situating the systems of FIGS. 3, 5 and 7.

In FIG. 10, a system 3500 has an MPU subsystem, an IVA subsystem, and DMA subsystems 3510.i. The MPU subsystem suitably has a RISC or CISC processor, such as a superscalar processor 1422 with L1 and L2 caches designated L1$ and L2$ respectively. The IVA subsystem has a DSP (digital signal processor 1424) for image processing, video processing, and audio processing. The IVA subsystem has L1 and L2 caches, RAM and ROM, and hardware accelerators as desired such as for motion estimation, variable length codec, and other processing. DMA (direct memory access) is integrated into the system 3500 in such a way that it can perform target accesses via target firewalls 3522.i and 3512.i of FIG. 10 connected on interconnects 3521 and 3534. A target is any circuit block in FIG. 10 targeted or accessed by any other circuit blocks acting as an initiator. In order to perform such accesses the DMA has DMA channels programmed. Each DMA channel specifies the source or initiator location of the Data to be transferred and the destination or target location of the Data.

Data exchange between the peripheral subsystems 3510.i and a memory subsystem 3550 and 3520.i and general system transactions from memory to memory are handled by the System SDMA 3510.1. Data exchanges within a DSP subsystem 3510.2 are handled by the DSP DMA 3518.2 therein. Data exchange to refresh a display is handled in display subsystem 3510.4 using a DISP DMA 3518.4 (numeral by analog with subsystem 3510.1). This subsystem 3510.4, for instance, includes a dual output three layer display processor for 1×Graphics and 2×Video, temporal dithering (turning pixels on and off to produce grays or intermediate colors) and SDTV to QCIF video format and translation between other video format pairs. The Display system 3510.4 feeds an LCD panel using either a serial or parallel interface. Also television output TV and Amp provide CVBS or S-Video output and other television output types. Data exchange to store camera capture is handled using analogous Camera DMA 3518.3 in camera subsystem CAM 3510.3. The CAM subsystem 3510.3 suitably handles one or two camera inputs of either serial or parallel data transfer types, and provides image capture hardware image pipeline and preview.

A hardware security architecture including a security state machine SSM 3560 hardware-monitors busses for unpermitted access attempts and detects other security violations. SSM 3560 propagates qualifiers on the interconnect 3521 and 3534 in FIG. 10. Processor MPU 1422 issues bus transactions and sets some qualifiers on L3 Interconnect 3521. SSM 3560 also provides an MreqSystem qualifier(s). The bus transactions propagate through the L4 Interconnect 3534 and then reach a DMA Access Properties Firewall 3512.1. Transactions are coupled to a DMA engine 3518.i in each subsystem 3510.i which supplies a subsystem-specific interrupt to an Interrupt Handler 3580. Interrupt Handler 3580 is also coupled to SSM 3560.

Firewall protection by firewalls 3522.i is provided for various system blocks 3520.i, such as GPMC to Flash memory 3520.1, ROM 3520.2, on-chip RAM 3520.3, Video Codec 3520.4, WCDMA/HSDPA 3520.6, MAD2D 3520.7 to Modem chip 1100, and a DSP 3528.8. Various initiators in the system are given 4-bit identifying codes designated ConnID. Some Initiators and their buses in one example are Processor Core MPU 1422 [RD, WR, INSTR Buses], digital signal processor direct memory access DSP DMA 3510.2 [RD, WR], system direct memory access SDMA 3510.1 [RD, WR], Universal Serial Bus USB HS, virtual processor PROC_VIRTUAL [RD, WR, INSTR], virtual system direct memory access SDMA VIRTUAL [RD, WR], display 3510.4 such as LCD, memory management for digital signal processor DSP MMU, camera CAMERA 3510.3 [CAMERA, MMU], and a secure debug access port DAP for an emulator EMU.

GPS engine GE 1495 is coupled to the system as in FIG. 3 and in FIG. 10. In FIG. 10 GE 1495 is coupled to an interface to L4 interconnect 3534. L4 interconnect is protected by a firewall 3532.1.

The DMA channels support interconnect qualifiers collectively designated MreqInfo, such as MreqSecure, MreqPrivilege, MreqSystem in order to regulate access to different protected memory spaces and blocks. The system 3500 configures and generates these different access qualifiers in a security robust way and delivers them to hardware firewalls 3512.1, 3512.2, etc. and 3522.1, 3522.2, etc. and 3532.1 associated with some or all of the targets. The improved hardware firewalls protect the targets according to different access rights of initiators. Some background on hardware firewalls is provided in incorporated patent application TI-38804, "Method And System For A Multi-Sharing Security Firewall," Ser. No. 11/272,532 filed Nov. 10, 2005, which is hereby incorporated herein by reference.

DMA channels 3515.1, .2, etc. are configurable through the L4 Interconnect 3534 by the MPU 2610. A circuitry example provides a Firewall configuration on a DMA L4 Interconnect interface that restricts different DMA channels according to the configuration previously written to configuration register fields. This Firewall configuration implements hardware security architecture rules in place to allow and restrict usage of the DMA channel qualifiers used in attempted accesses to various targets.

When an attempt to configure access for DMA channels in a disallowed way is detected, in-band errors are sent back to the initiator that made the accesses and out-band errors are generated to registers and logic in a Control Module 2765 and converted into an MPU Interrupt to Interrupt Handler 3580 and MPU 1422. Some background on security attack detection and neutralization is described in the incorporated patent application TI-37338, "System and Method of Identifying and Preventing Security Violations Within a Computing System," Ser. No. 10/961,344 filed Oct. 8, 2004, which is hereby incorporated herein by reference.

In FIG. 10, the MPU 2610 and System DMA (SDMA) 3510.1 each supply or have some or all of the MreqInfo signals MreqSystem, MreqSecure, MreqPrivilege, MreqDebug, MreqType, and other signals for various embodiments. L4 Interconnect 3534 supplies the MreqInfo signals to the DMA Firewall and other firewalls 3512.i via a line 3538. Interconnect 3534 is also coupled to Control Module 2765 and cryptographic accelerator blocks 3540 and PRCM 3570 and to an interface to GPS engine GE 1495.

A signal ConnID is issued onto the various buses by each initiator in the system 3500. The signal ConnID is coded with the 4-bit identifying code pertaining to the initiator originating that ConnID signal. MreqSystem identifies a virtual world for these initiators to protect their real time operation. For background on these initiators and identifiers, see for instance incorporated patent application TI-61985, "Virtual Cores And Hardware-Supported Hypervisor Integrated Circuits, Systems, Methods and Processes of Manufacture," Ser. No. 11/671,752, filed Feb. 6, 2007, which is hereby incorporated herein by reference.

A System Memory Interface SMS with SMS Firewall 3555 is coupled to SRAM Refresh Controller SDRC 3552.1 and to system SRAM 3550. A new ConnID is suitably generated each time the processor core MPU 1422 or system SDMA 3510.1 performs an access in the case when the MreqSystem qualifier is active.

In FIG. 10, Control Module 2765 coupled to Interconnect 3534 receives a Security Violation signal when applicable from DMA Firewall 3512.1. A Flag pertaining to the Security Violation is activated in a Control_Sec_Err_Status register of Control Module 2765 and is forwarded to a Platform_Status_ Register in SSM 3560. This flag is read on every Monitor Mode switch or otherwise frequently read, or interrupt handler 3580 generates an interrupt each time one of the Flag bits is updated or activated by the hardware.

In FIG. 10, a power, resets and control module PRCM 3570 (compare PRCM 1470 and/or PRCM 1185 of FIG. 2) is provided in a voltage domain called Wakeup domain WKUP. PRCM 3570 is coupled to L4 Interconnect 3534 and coupled to Control Module 2765. PRCM 3570 is coupled to a DMA Firewall 3512.1 to receive a Security Violation signal, if a security violation occurs, and to respond with a Cold or Warm Reset output. Also PRCM 3570 is coupled to the SSM 3560. System 3500 is partitioned into various domains called voltage domains and power domains that are respectively controlled by PRCM 3570. An MPU domain is provided for MPU and IVA. A Core domain is provided for interconnect. One or more Peripheral domains are provided for peripherals. A further domain called Wakeup domain WKUP is provided In FIG. 11, PRCM 3570 of FIG. 10 includes a PRM Clock Generator 3910 in the Wakeup domain and a Clock Manager CM Clock Generator 3920 in the Core domain.

Power and Reset Manager PRM 3910 is located in the WAKEUP domain and runs off the sleep clock (32 kHz) or system clock sys_clk (on order of MHz or tens of MHz). PRM 3910 controls the system clock sys_clk output and supplies a 32 kHz clock Func_32k_fclk and a system clock Sys.clk to a PRM clock management circuit 3930 for the Wakeup domain. PRM 3910 also supplies a 32 kHz clock CM_32k.clk and system clock CM_sys.clk to a Clock Manager CM 3920 in the Core domain. Control registers 3925 are coupled to PRM 3910 and CM 3920 to control clock switches in PRM 3910 and CM 3920 and to control digital phase lock loops DPLLs designated DPLL1-5 for MPU, IVA, Core domain, P1 Peripherals, and P2 Peripherals domain respectively.

Figure 11:
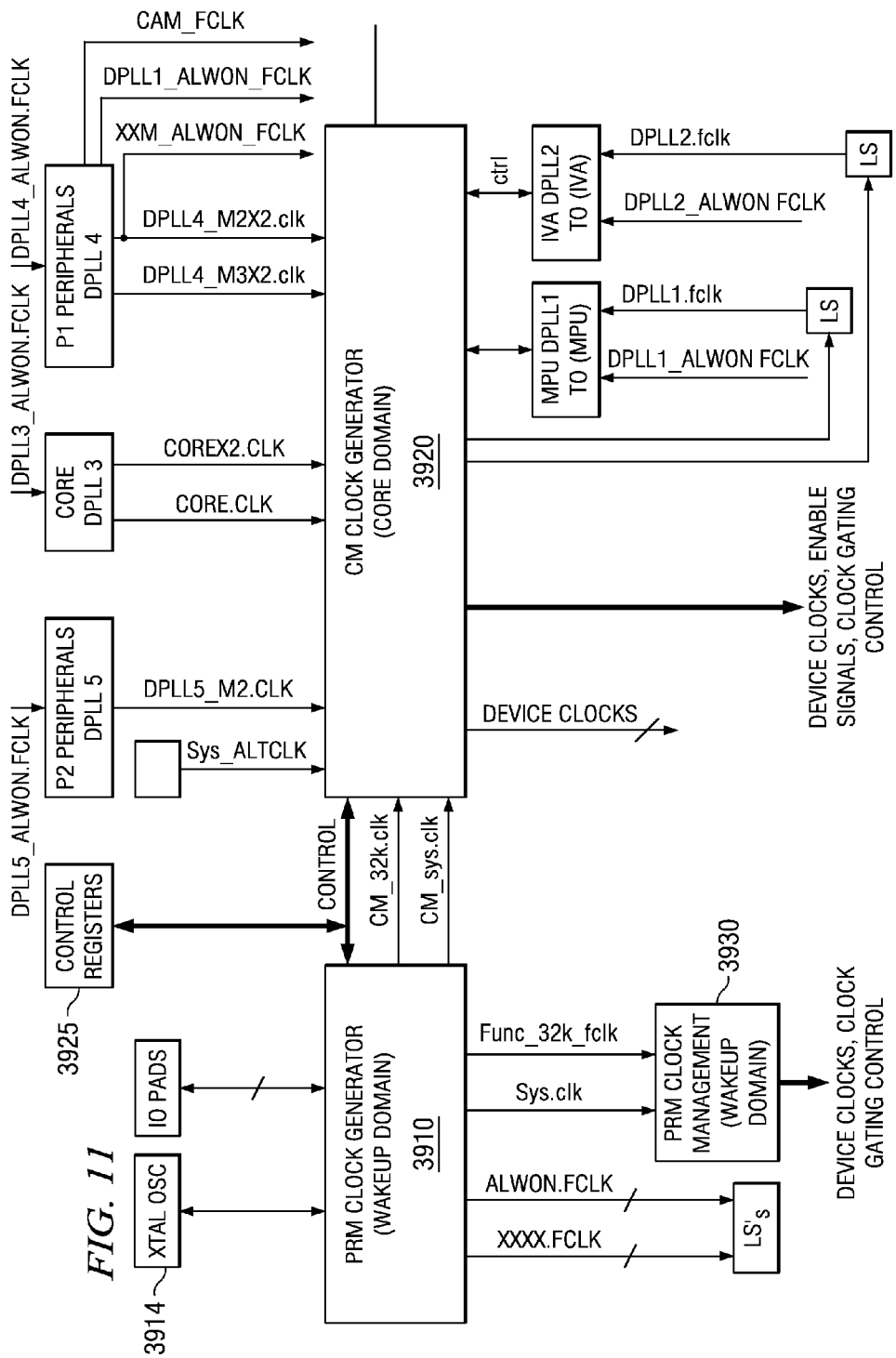
FIG. 11 is a block diagram of inventive clock control structure and process for power management of position-based applications and systems and establishing frequencies and turning clocks off and on for Operating Performance Points (OPPs) of FIG. 12 and for use in a power, resets and control module (PRCM) in the inventive position-based system of FIG. 10.

In FIG. 11, PRM 3910 generates primary source clock, device global reset, and local reset for power domains. PRM 3910 controls power domains sleep/wakeup transitions between inactive and retention and off power states. PRM 3910 controls isolation cells, controls retention flipflop save and restore, controls power domain switches, controls memory states, and controls level-shifters. The PRM 3910 detects power domain wakeup events, manages power domain wakeup transition dependencies, and controls wakeup domain input isolations. The PRM 3910 sequences device transition to and from OFF mode, controls analog cells OFF state (internal LDO, etc.), and switches to OFF mode pad configuration. PRM 3910 controls input/output IO isolation for power transition glitch control, and IO wakeup, and detects OFF mode wakeup events. PRM 3910 manages an interface with AVS (adaptive voltage scaling) on-chip sensor(s) to adjust voltage depending on switching speed of the corresponding integrated circuit real estate portion, and manages an interface with power IC 1200 to control supply voltages VDD1 and VDD2 etc. from switch mode power supplies in power IC 1200. PRM 3910 latches sys_boot signals at power on reset from Power on Reset POR 1042 of FIG. 1 and handles reset from secure watchdog circuit 1044 of FIG. 1.

An OCP (Open Control Protocol) bus interface from MPU 1422 of FIG. 10 accesses control and status registers 3925 in FIG. 11. Registers 3925 are used, for instance, for controlling DVFS/DPS power managed operation (dynamic voltage and frequency scaling and dynamic power switching) of FIGS. 12, 13, and 14A-D. This OCP interface runs off the system clock and is connected to the Wakeup domain of FIG. 10. Some embodiments include the PRM registers 3925 in a Control Module 2765 of FIG. 10 or elsewhere and these control registers 3925 are run-time re-configurable from Control Module 2765 and/or the OCP bus from MPU and/or IVA processors. Some hardware-controlled embodiments load the contents of the control registers 3925 from and under the control of a Device FSM (finite state machine) and control those registers to power manage the system 3500 in a manner such as depicted in FIGS. 13 and 14A-14D. Higher level parameters or controls on functionality of the Device FSM are configurable using other portions of registers 3925 by boot or initialization software from MPU and/or IVA processors of FIG. 10.

In FIG. 11, part of a Clock Manager 3920 portion called Clock Generator CG is located in the MPU-and-IVA domain to generate the clock there. The Clock Generator CG uses as input the source clock from the PRM 3910 and the DPLLs. Some embodiments derive clock 2162 of FIG. 3 for GPS 1495 (1190) from a peripheral DPLL or from a crystal oscillator 3914, or from a modem 1100 crystal oscillator delivered through an input Sys_ALTCLK for an alternative clock in FIG. 11. A real time clock RTC clock operates at much lower sleep clock rate (e.g. 32 KHz) and is also provided for clock 2164.

In FIG. 11, a Clock Controller CC portion of Clock Manager 3920 handles device clock gating and manages power domain sleep/wakeup transition between On and Inactive power states. The Clock Controller CC manages Smart Idle handshake protocol with target modules, and manages Smart Standby handshake protocol with initiator modules. Clock Controller CC detects power domain sleep transition conditions, manages power domain sleep transition dependencies, and controls power domain clock signal gating.

PRM 3910 in FIG. 11 has an interrupt circuit to generate interrupts to MPU and IVA processors of FIG. 10. The interrupts respond to and depend on PRM 3910 and CM 3920 internal events or external peripherals wake-up events. Depending on the context, the PRM can process a domain wake-up associated to the interrupt event. The interrupt events are maskable in a PRM interrupt enable register. Their status is readable in a PRM interrupt status register.

The Clock Manager CM 3920 can power off the Core power domain for DPS (dynamic power switching). In that case, clock outputs cease and their OFF state is latched by isolation circuits. DPLLs controls are also latched. The full Clock Manager CM setting in Control Registers 3925 is saved by retention flip-flops and is transparently restored when the Core power domain becomes active again.

Control of DPLLs supports several power modes. Each DPLL power mode establishes a different trade-off between power saving and DPLL re-lock time period. The PRCM 3570 hardware also introduces sequencing in the transitions between the DPLL power modes. Each next power mode is configurable.

Figure 12:
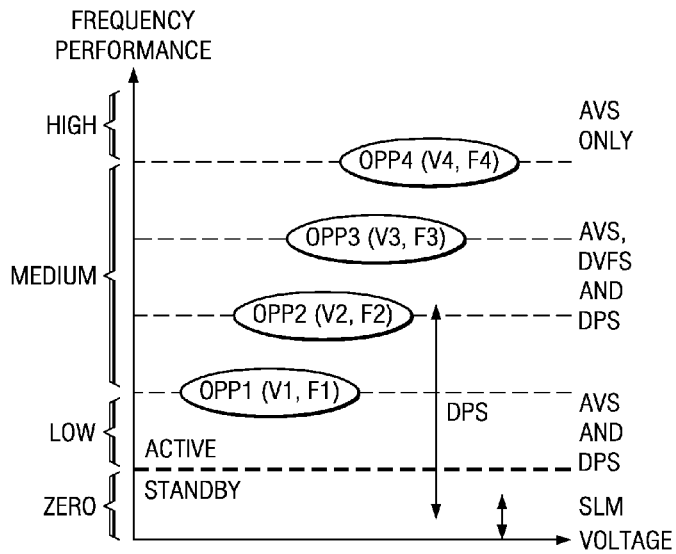
FIG. 12 is a graph of frequency versus voltage and showing Operating Performance Points (OPPs) spread over a spectrum of increasing frequency or device performance on the ordinate axis, and over a spectrum of voltage on the abscissa axis, and legended with designations of various power management processes and structures of some of the inventive position-based embodiments.

In FIG. 12, Standby Leakage Management (SLM) provides power management that reduces standby power consumption, or leakage power consumption. With SLM, the PRCM 3570 of FIGS. 10 and 11 selectively switches into low power system modes for GPS unit 1495 (1190) and for various domains of the integrated circuits such as in FIG. 10. SLM is applied either automatically or in response to explicit user requests. SLM is suitably applied to one, some or all peripherals and system blocks during system standby time such as when no application is started and the system activity is negligible or very limited.

Standby Leakage Management (SLM) selectively puts the system into a selected lowest feasible static power mode compatible with desired system response time. The integrated circuit operation in Standby Leakage Management SLM has an ultra-low power mode called Off mode having very low total chip current and wherein the Wakeup domain on the chip can still be activated. One or more low power sleep modes are provided also. The wakeup clock (e.g., 32 kHz) remains on and a wakeup power voltage remains applied to the Wakeup domain WKUP. A system and security timer and watchdog timer 1044 are functional and can wake up the system or portion thereof. Also, a level transition can be detected, logged from any pad and thereby wakeup the system or portion. Also, a small backup memory is retained in the low power Off or sleep modes. Thus, the SLM circuit still wakes up autonomously in response to a timer interrupt or detection of any pad transition. SLM trades off static power consumption and wakeup latency (time interval consumed by a wakeup process).

Some application processor features to enable SLM are the same as or analogous to those provided to enable dynamic power switching DPS. Both DPS and SLM switch between system modes, but DPS latency time scales are less. Domain state transitions are controlled in sequence according to their sleep and wakeup dependencies. The transition latency is kept short enough so that the transition latency does not noticeably degrade the user experience of interacting with the application. Intelligent idle and standby power management is provided in any one, some or all modules. A main voltage domain (processor/core) in GPS engine 1190 and/or GPS engine 1495 of FIG. 2 and in applications processor integrated circuit 1400 and in digital baseband 1100 can be fully turned Off in a lowest power mode, while full hardware control is maintained by the power management interface controller block PRCM 3570. Software configurability of the IO state in lowest power mode reduces IO leakage. Flexible wakeup capability is provided from any pad in lowest power modes.

DPS and SLM also can differ by the type of wakeup event that triggers wakeup transitions. For DPS, wakeup events are application related (timer for GPS time/position update, GPS engine GE activation from cellular engine CE due to location-based software application in applications processor 1400, DMA request, FIFO fill signal, GPS or other peripheral interrupt, key pressed to request GPS related application or other application). In case of SLM, wakeup events are more user related, such as from touch screen, key-press, peripheral connections, etc.

In regard to FIG. 12, Operating Performance points (OPP) are discussed further. For practical reasons related to device design (flow, tools), the DVFS dynamic voltage/frequency scaling process in some embodiments utilizes a few discrete steps. Each step or Operating Performance Point (OPP) is composed of a voltage/clock frequency (V, F) pair.

When adaptive voltage scaling (AVS) is used on a device, it is in some cases easier to set the frequency steps and let the AVS adapt or adjust the voltage according to the device silicon performance. In such case, each frequency step corresponds to a range of voltage, rather than a voltage step, depending on whether the device is a hot (high performance semiconductor) device or a cold (lower performance semiconductor) device. This range of voltages depends on the device fabrication process and its real-time operating state (temperature) at a given frequency.

In FIG. 12, DPS is a power-management technique, like DVFS, aimed at reducing active power consumption by the system 3500 of FIG. 10. Whereas DVFS in FIG. 12 reduces both dynamic and leakage power consumption, DPS reduces leakage power consumption and temporarily shuts down one or more parts of the system in FIGS. 14A-14D. With DPS, the system switches its blocks dynamically between high and low consumption system power modes during system active time. When DPS is applied, a processor or a system portion runs at a given OPP (full OPP frequency Fn) even when the OPP frequency exceeds a target performance frequency that would execute the application adequately. DPS thus combined with DVFS operates to complete tasks as fast as possible, given a currently established DVFS OPP, followed by an automatic switch (see DPS arrow in FIG. 12) to a low-power mode, for minimum leakage power consumption. DPS is also useful, for example, in situations herein where a real-time application is waiting for an event. The system can switch into a low-power system mode if the wake-up latency conditions allow it. This technique involves maximizing the idle period of the system to reduce its power consumption.

In FIG. 12, when medium application performance is desired or when application performance requirements vary, the DVFS technique is applied. The voltage and frequency are scaled to match the closest OPP that meets the performance requirement. When application performance requirements fall between two OPPs or when very low application performance is required and it is below the lowest performance OPP, DPS is applied to switch to low-power mode.

In FIG. 12, combining of these contradictory power management processes DVFS/DPS/AVS/SLM is provided and some background is described in patent application TI-60478, Ser. No. 11/760,263 filed Jun. 8, 2007, which is hereby incorporated herein by reference. Enhanced active power savings are obtained by combining DVFS, DPS and AVS processes and using SLM for static leakage management. AVS is used at boot time to adapt the voltage to device process characteristics (strong/weak) and then continuously to compensate temperature variations. See for some AVS background, e.g., US Patent Application Publication US2005/0194592 dated Sep. 8, 2005, which is hereby incorporated herein by reference.

In FIGS. 13 and 14A-14D, the integrated circuit voltage domain and power domain partitioning enables very efficient DPS for GPS engine operation (see GPS 1190 and 1495 of FIG. 2, and FIG. 3, which is subject to static and dynamic power dissipation). During GPS engine GE operation with power enable GPS_PWR_EN active and GPS_SLEEP inactivated (for not-sleep) to GPS unit in FIG. 3, the power domains in the rest of the system of FIG. 2, such as integrated circuits 1100 and 1400, only operate as needed and otherwise remain in a sleep low leakage mode, see FIGS. 5A and 5B and process flows of FIGS. 8 and 9. Conversely, during Cellular engine CE operation when the GPS engine GE has previously provided GPS information and is not needed, the GPS engine GE is powered down using either DPS or SLM power management modes by inactivating the power enable GPS_P-WR_EN or activating a GPS sleep control line GPS_SLEEP. Cellular engine CE of FIG. 3 in some embodiments has a peripheral buffer FIFO coupled to UART 2180 that is refreshed with GPS positioning data via an I2C communication bus from GPS engine GE decoder 2160. Similarly, GE decoder 2160 has an input buffer FIFO in some embodiments that is refreshed with timekeeping update data via the I2C communication bus from UART 2180. The FIFOs supplement the registers shown in FIG. 7. For instance, some embodiments execute hash authentication and encryption for GE and CE data communications, and suitably have stored maps and images in GE that are communicated to CE. Each of the buffer FIFOs is sized sufficiently large and in some embodiments both buffer FIFOs are sized to feed the respective engines CE and GE with data independently of the rest of the respective engine CE and GE and thus permit most of each of CE and GE to be in low leakage mode.

In a wakeup process called a Smart Standby mode, the Core domain feeds data to and wakes up the GPS engine 1190 (1495) automatically and also can access a memory buffer in external DDR SDRAM memory 3550 of FIG. 10. The processor MPU in Cellular engine CE does not need to wake up on every FIFO-fill signal since DDR controller is built with retention D-flipflops and its configuration is automatically restored. Once the internal FIFO is refilled, the FIFO generates a FIFO-full signal. In response to the FIFO-full signal, the Core domain turns off automatically and returns to low leakage mode. The MPU suitably operates on wakeup to execute position-based applications and re-fill the DDR memory and re-fill the internal FIFO, whereupon the MPU does a DPS context save and returns to low leakage mode.

Figure 13:
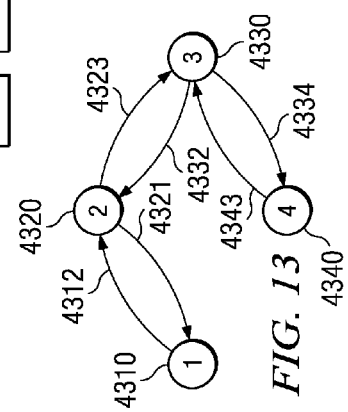
FIG. 13 is a state transition diagram of an inventive position-based power management operational process of an inventive position-based integrated circuit and system with various portions of the integrated circuit powered and unpowered as illustrated in FIGS. 14A-14D.

In FIGS. 13 and 14A-14D, DPS operations are shown for a GPS engine and position-based application of an MPU RISC 1422 and DSP 1424 in FIG. 2. FIG. 13 shows a state transition diagram for a state machine having state machine states 4310, 4320, 4330, 4340 that respectively correspond to FIGS. 14A, 14B, 14C, 14D. These state machine states identify and generate power modes specifically to correspond to FIGS. 14A-14D and FIG. 10. In state 4310, power is applied to MPU 1422, DSP 1424, Display 3510.4, SDMA 3510.1, Core domain with L3/L4 interconnect 3521, 3534 and SDRC 3552.1 and GPMC 3520.1, and to P1 and P2 peripheral domains, and to the Wakeup domain WKUP. GPS data, and any maps/images data from GE, is accessed through peripheral P2 domain by MPU 1422 and user desired position-based information input is similarly accessed from peripheral P1 domain, and stored in SDRAM 3550, as shown by transfer arrows in FIG. 14A. When this operation is completed a power management transition 4312 is initiated in FIG. 13 and operations reach state 4320.

Figure 14C:
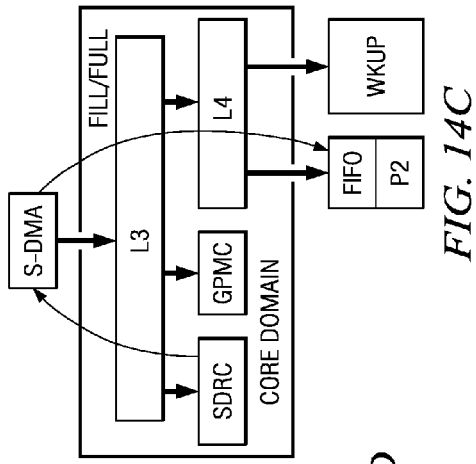
FIGS. 14A-14D is an inventive process sequence of various portions of the same inventive integrated circuit and system of FIGS. 3, 5, 7 and 10, wherein any given portion of the integrated circuit is shown when powered and not shown when unpowered, wherein the sequence is correspondingly illustrated in the inventive state transition diagram of FIG. 13.
Figure 14B:
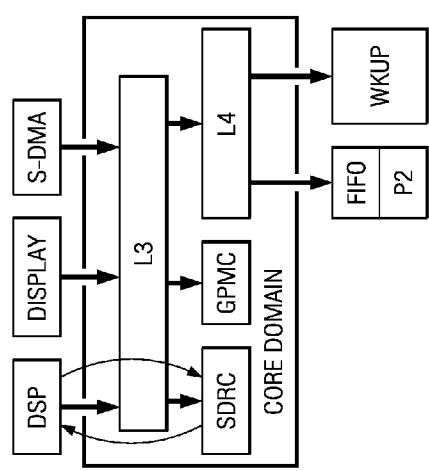

In state 4320 of FIG. 13, the MPU domain and P1 peripheral domain are put in low power standby mode and not shown in FIG. 14B, but the other domains are running in FIG. 14B. DSP 1424 performs two way accesses with SDRAM 3550 and decodes the GPS data and executes a position-based application and performs Cellular engine CE timekeeping of FIG. 8 or 9 step 2656 (2756) while GPS engine GE 1495 (1190) is sleeping or off. Display refresh and display of maps and positioning data continues even with MPU 1422 in standby and even when DSP 1424 (IVA) completes and is put in standby. When this operation is completed, a power management transition 4323 is initiated in FIG. 13 and operations reach state 4330.

In state 4330 and FIG. 14C, the MPU domain and P1 domain continue in low power standby mode, and DSP and Display are put into low power Standby mode, while the other power domains are running as shown. Now the System DMA SDMA transfers timekeeping data according to FIGS. 5 and 7 and FIG. 8 or 9, from SDRAM to a FIFO buffer associated with the P2 peripheral domain coupled to GPS engine GE 1495 (1190). WKUP domain is powered at all times. Notice in FIG. 14C that still more power is saved by having MPU, DSP, Display, and P1 peripheral domains on low power Standby mode. When this operation is completed a power management transition 4334 is initiated in FIG. 13 and operations reach state 4340.

Figure 14D:
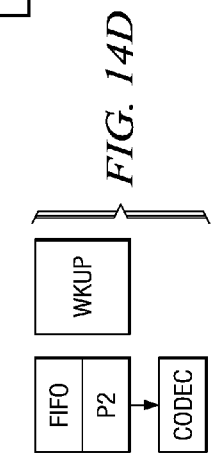
Figure 14A:
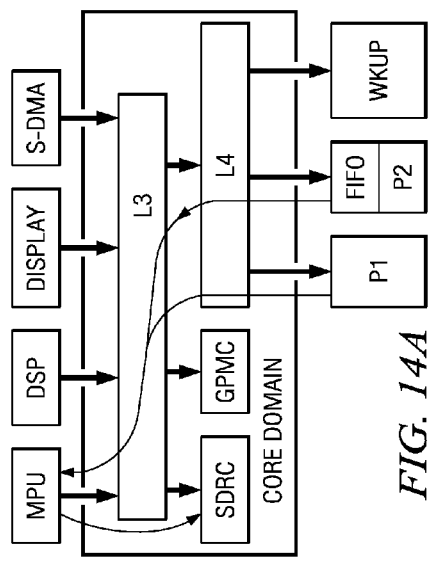

In state 4340 of FIG. 13 and in FIG. 14D, even S-DMA and Core domains are now put on low power Standby mode. The MPU domain, P1 domain, DSP and Display continue in low power standby mode. Now only the P2 peripheral domain and WKUP domain are running. At this point the P2 peripheral domain transfers timekeeping update information from the P2 FIFO buffer to the input buffer of GPS engine GE. GPS engine GE suitably wakes up to make a new GPS position fix. Notice in FIG. 14D that still more power is saved by having almost the entire applications processor chip in low power Standby mode.

Further in FIG. 13, transitions are suitably made from any step to the next previous step to refill buffers or do more processing. Partitioning of the integrated circuitry in FIGS. 2, 3, 5, 7, 10 and 14A-14D is established structurally in a manner that optimizes power conservation by power modes for use with a satellite positioning engine such as GPS engine GE 1495 (1190).

In FIG. 15, an embodiment of a Cellular Engine CE receiver 4500 with a frequency lock loop locked to network RSIs is depicted for use in supporting the circuits and functions described in connection with the other Figures herein. A base station BS 2050 for a given cell in a cellular network CN sends a modulated signal from an antenna 4505 to an antenna 4510 coupled to receiver 4500. Antenna 4510 (1015) is coupled via a switchplexer 4512 (1350) to a radio frequency (RF) section 4515 (1370) which amplifies and heterodynes an incoming signal to baseband and supplies an output to analog-to-digital converter (ADC) 4520. ADC 4520 has an input Sample_Window_Start SWS is fed with internal sample time base that suitably establishes when the analog signal from RF 4515 is sampled and converted to digital form. ADC 4520 supplies a digitized output to a digital signal processor (DSP) 4525 (1110 or 1424 in FIG. 2).

In FIG. 15, DSP 4525 provides these outputs among others: 1) a received signal $S_R(t_i)$ as a function of time $t_i$ from a base station 2050 for CN cell i, 2) an initialization pulse encompassing the first RSI when and for which synchronization is first achieved after power up and after re-acquiring synchronization, and 3) a time of arrival TOA signal RSI which provides an edge indicative of a receiver synchronization instant. An error-reducing decoder 4535 such as Viterbi decoder 4535 supplies Cellular Network CN data and CN communications such as cell phone calls, e-mails and video output.

In FIG. 15, a CE Clock Adjustment Circuit 4540 responds to lines for the Initialize and RSI and supplies an output digital signal (representing a desired estimated frequency correction) to the input of a digital to analog converter (DAC) 4560. DAC 4560 then provides an analog voltage representative of the desired frequency correction to the input of a voltage-controlled crystal oscillator (VCXO) 4565. VCXO 4565 generates the internal Reference clock 2162 of FIG. 3 (or on-clock nominally 13 MHz) that is corrected and stabilized in frequency. The output of VCXO 4565 feeds to a clock input of CE Clock Adjustment Circuit 4540 for comparison with the RSIs on the RSI line from DSP 4525.

In FIG. 15, the analog voltage representative of desired frequency correction from DAC 4560 controls the capacitance of a voltage-controllable capacitive element in the VCXO 4565 that varies the frequency output by VCXO 4565 to also actually correct the frequency fed to a CE Timekeeping Circuit 4550 that maintains a stored cellular time SCT running count based on the nominal 13 MHz internal clock from VCXO 4565.

VCXO 4565 in some embodiments also supplies internal clock to receiver RF section 4515 as a local oscillator signal for heterodyning by receiver RF section 4515. In this way, a frequency-lock loop is completed and the receiver achieves network synchronism or synch with the cellular network CN. With the receiver in frequency-lock, DSP 4525 even more satisfactorily supplies times of arrival RSI, which are used to support timing Tcellular as described elsewhere herein. VCXO 4565 further supplies internal clock to a multiplier 4575, which has an analog input from a DAC 4570 supplied with data to be transmitted. Multiplier 4575 feeds to a transmitter RF section TX 4580 which produces RF output to the switchplexer 4512 and antenna 4510 in cellular modem transmit mode. Further heterodyning (not shown) inside receiver RF section 4515 and transmitter RF section TV 4580 may be provided.

Comparing the embodiments of FIG. 7 and FIG. 15, the Cellular Link Control Unit 2410 of FIG. 7 resembles or compares to RF 4515, ADC 4520, DSP 4525 and Viterbi decoder 4535 of FIG. 15. The combination of some functions of DSP 4525 and CE Clock Adjustment circuit 4540 of FIGS. 15 and 17 resembles or compares to the combination of CT Time Processing Unit 2420 and Time Sampler 2430. The combination of SCT1 register 2436, SCT2 Register 2438, SGTA register 2452 and GT Time Generator 2450 resembles or compares to CE Timekeeping Circuit 4550 in FIGS. 15 and 18. The different illustrations helpfully depict and highlight structures in various embodiments.

Figure 16:
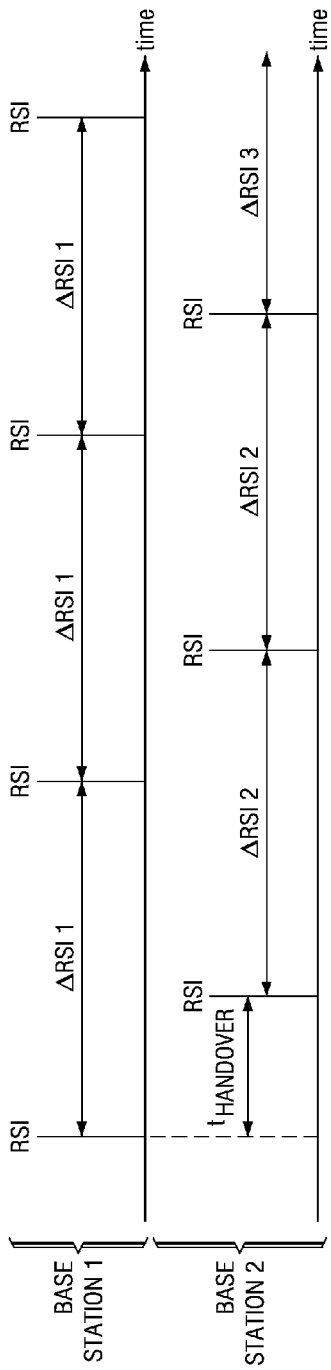
FIG. 16 is a pair of graphs of cellular RSIs (received synchronization instances) versus time because the RSIs coming to the cellular engine CE from different base stations sending RSIs that are spaced at different time intervals and wherein the cellular engine CE is subject to handover or handoff from one base station to another base station, and for utilization in the inventive cellular engines CE of FIGS. 15, 17, 18 and 19.
Figure 17:
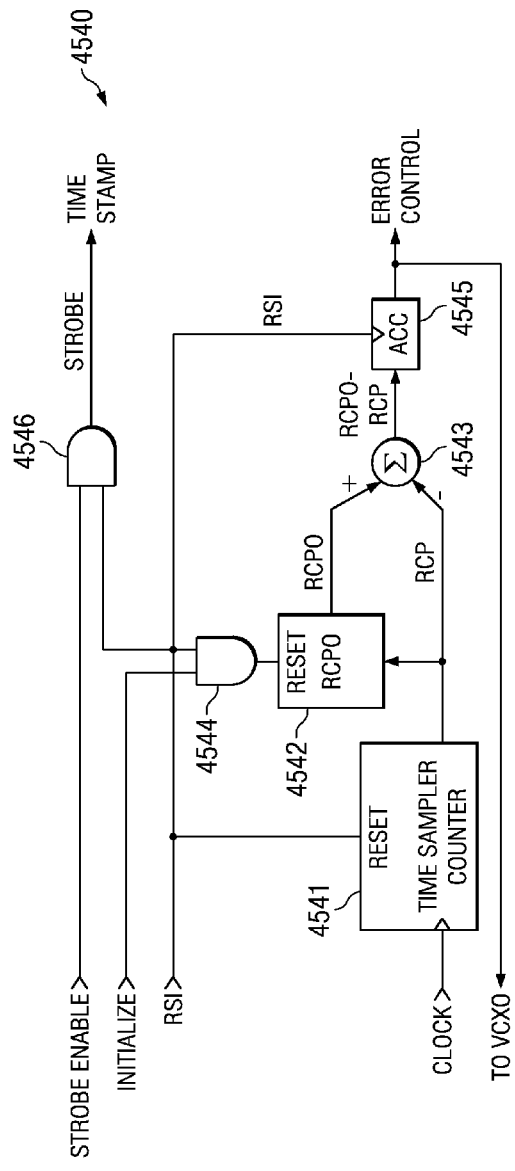
FIG. 17 is a partially block, partially schematic diagram of an inventive CE clock adjustment circuit for use in the inventive cellular engine CE of FIG. 15.

In FIG. 16, a cellular network operational handover between base stations in FIG. 4 is accommodated in FIGS. 15 and 17 whether an average interval ΔRSI2 from the new base station in Cell B is the same as or different from the average interval ΔRSI1 from the previous base station in Cell A of FIG. 4. Each base station 2050A and 2050B of FIG. 4 supplies a succession of synchronization data of FIG. 6C, which DSP 4525 of FIG. 15 responds to and processes by delivering receiver synchronization instance RSI pulses or rising edges thereof. The successive instants of each RSI rising edge resulting from the DSP processing, for instance, are shown as vertical RSI lines in FIG. 16. DSP 4525 has cellular network CN information indicating existence of a handover event when the handover occurs. DSP 4525 in FIG. 15 activates the Initialize line not only on power up but also on handover in FIG. 15 to initialize the CE Clock Adjustment Circuit 4540 in FIG. 15. A handover interval $t_{HANDOVER}$ elapses when handover occurs in FIG. 16. Some embodiments measure $t_{HANDOVER}$ using counter IFN as discussed earlier in connection with FIG. 7, and other embodiments run the VCXO and counters as in FIG. 17 to effectively handle the handover interval.

In FIG. 17, an example of a circuit embodiment for CE Clock Adjustment Circuit 4540 includes a time sampler counter 4541 clocked by VCXO 4565, and further includes a register 4542 coupled to an output of the counter 4541 to hold a first or initial RSI position count RCP0. RCP0 is loaded to register 4542 from a time sampler counter 4541 or from DSP 4525 in response to high output from an AND gate 4544 that detects occurrence of an initialization pulse INITIALIZE from DSP 4525 indicative of first synchronization concurrently with an RSI from DSP 4525.

The value of RCP0 in register 4542 is accessible and quality-controlled, such as at boot time, upon wakeup, and after each Initialization, by DSP 4525 to make sure that RCP0 lies within an expected or predetermined first range (e.g., +/−15%) of the RCP0 value that is pre-calculated assuming that on-clock VCXO 4565 is running at nominal frequency (e.g., 13 MHz) and assuming that counting occurs between hypothetical perfect network RSIs. If the first range is violated or departed from, DSP 4525 re-issues the pulse INITIALIZE to get a new RCP0 value from counter 4541 or enter a new RCP0 value from DSP 4525.

The quality-controlled RCP0 value is maintained in the register 4542 and is fed to a plus (+) input of a summer 4543. A varying running count RCP from time sampler counter 4541 is fed to a minus (−) input of the summer 4543. Time sampler counter 4541 counts the number of VCXO clocks between the latest pair of RSI pulses in FIG. 16 to produce the running count RCP. When a latest RSI from the RSI line from DSP 4525 is provided to a reset input of counter 4541, then counter 4541 holds a latest count RCP in an internal output register of counter 4541. Counter 4541 is reset to zero due to the RSI at the reset input of counter 4541.

Further quality control is suitably provided, such as in case of a missing RSI or an extra interpolated RSI due to multi-path environment like urban canyon, or noise pulse or glitch, by providing a comparator inside of time sampler counter block 4541. In one type of embodiment, the comparator checks the running count in counter 4541 at each next RSI to determine whether the running count lies in an expected or predetermined second range (e.g., within +/−20% of the RCP0 value in register 4542). If the running count violates or departs from the second range, then the existing count RCP in the internal output register of block 4541 is not updated until a subsequent RSI at which a later-established newer running count is achieved that is indeed inside the expected range. In another type of embodiment, an extra RSI that comes too soon (such as due to multi-path) is ignored and the block 4541 is arranged to keep counting until a next subsequent RSI in case that the count RCP to next subsequent RSI lies in the predetermined second range and can be used to assist in frequency lock after all. In still other embodiments, DSP 4525 runs a software process to quality-control each RSI with or without further hardware quality control. The parameters, such as upper and lower percentages, defining the first and second expected ranges for quality control are configured at boot time.

Summer 4543 produces as output a difference RCP0-RCP between the RSI count position RCP0 and the running count RCP of the counter 4541. Summer 4543 suitably operates either continually or just when an RSI occurs.

In FIG. 17, an accumulator 4545 (or DSP routine) is fed with a difference RCP0-RCP from the summer 4543. The accumulator 4545 is actuated when an RSI occurs. Accumulator 4545 keeps a running sum or accumulation of all positive, negative, and zero values of difference RCP0-RCP. When each latest RSI occurs, the difference by which the actual count position in counter 4541 of the latest RSI differs from the first RSI count position RCP0 is determined by summer 4543 and added to the running sum in the accumulator 4545.

If the 13 MHz internal clock from VCXO 4565 is perfectly synchronized to cellular network CN, then the difference RCP0-RCP is zero from summer 4543. Notice that this operation successfully happens even if handover in FIG. 16 makes the average interval ΔRSI2 from the new base station in Cell B different from the average interval ΔRSI1 from the previous base station in Cell A. In FIG. 17, this difference RCP0-RCP in general represents departure of the time base formed by VCXO 4565 from the cellular network time. If the difference RCP0-RCP fed to from summer 4543 to accumulator 4545 is positive, this means that the 13 MHz internal clock is running too slow and not keeping up with the cellular network time and the internal clock should be increased in frequency. If the difference RCP0-RCP fed to accumulator 4545 is negative, this means that the 13 MHz internal clock is running too fast and getting ahead of the cellular network time as it increments counter 4541, and the internal clock VCXO 4565 should be decreased in frequency.

VCXO 4560 frequency in FIG. 15 varies directly or inversely to the voltage applied by DAC 4560. The plus (+) and minus (−) input connections of summer 4543 of FIG. 17 are established or reversed to effectuate a subtraction therein and to make the loop operate properly as a frequency-lock loop. Alternatively, in some embodiments, the DAC 4560 of FIG. 15 is omitted, and a digital output from CE Clock Adjustment Circuit 4540 of FIG. 15 controls a digitally selected capacitance(s) in VCXO 4565 to achieve the correction.

DSP 4525 of FIG. 15 has cellular network information indicating existence of a handover event when handover occurs in FIG. 16. DSP 4525 in FIG. 15 activates the Initialize line to initialize the CE Clock Adjustment Circuit 4540 in FIGS. 15 and 17. In FIG. 17, an active state of the Initialize line appropriately starts time sampling counter 4541 counting the intervals ΔRSI2 instead of the intervals ΔRSI1 of FIG. 16. The AND-gate 4544 resets the register 4542 upon the first RSI from the new base station when the Initialize line is active such as on handover. In this way, time sampler counter 4541 or DSP 4525 is operative on handover to enter the count for the first such interval of ΔRSI2 as a revised count RCP0 into the register 4542 of FIG. 17. In this way, the circuit of FIG. 17 acting as a CE Clock Adjustment Circuit 4540 of FIG. 15 robustly operates to maintain appropriate error control of VCXO 4565 even upon a cellular network handover event. Also, in some variations of the circuitry of FIG. 17, the accumulator 4545 is either ramped gradually to zero or immediately zeroed in response to the Initialize line so that the VCXO 4565 frequency is controlled in a stable manner during a temporary condition such as cellular network handover.

Also in FIGS. 15 and 17, a Strobe signal to act as a CE Timestamp of FIGS. 3, 5, and 7 is provided. DSP 4525 (or MPU) determines according to the process of FIG. 8 or 9 when a strobe should be enabled for sending to the GPS Engine GE. DSP 4525 (or MPU) upon such determination activates a strobe enable pulse on a line STROBE_EN in FIGS. 15 and 17. The strobe enable pulse is shorter than the applicable interval ΔRSI in FIG. 16 between RSIs. In FIG. 17, an AND-gate 4546 has respective inputs fed with the RSI line and fed with strobe enable STROBE_EN. The AND-gate 4546 thereupon outputs as a strobe to the GPS Engine GE a strobe pulse or rising edge that coincides with the latest RSI that lies in the interval defined by the strobe enable pulse on line STROBE_EN. In some embodiments, the line STROBE_EN is activated by cellular engine CE, and in some other embodiments the line STROBE_EN is activated by GPS engine GE.

In some embodiments, VCXO 4565 is not only stabilized but also stabilized with substantial accuracy to a nominal frequency for purposes of recovering any or all of network synchronization pulses and synchronization information and incoming modulated voice and data communications. In FIG. 17, when stabilization to the particular nominal frequency is advisable, DSP 4525 (or MPU) suitably loads the register 4542 on initialization, and at handover, with the pre-calculated or predetermined number of counts RCP0 that corresponds to counting a known or downloaded time interval between RSIs that is characteristic of the network based on the particular nominal frequency to which VCXO 4565 should be locked. The counter circuitry for counter 4541 is driven by the VCXO 4565 itself and the counter has a sufficiently long number of bits to achieve a high desired amount of precision in counting and frequency locking. In the embodiments of this paragraph, that pre-calculated or predetermined number of counts loaded into register 4542 is used as the value of RCP0 instead of loading an initial measured number of counts from register 4541 as the value RCP0 used in the description of some other embodiments described elsewhere herein.

Figure 18:
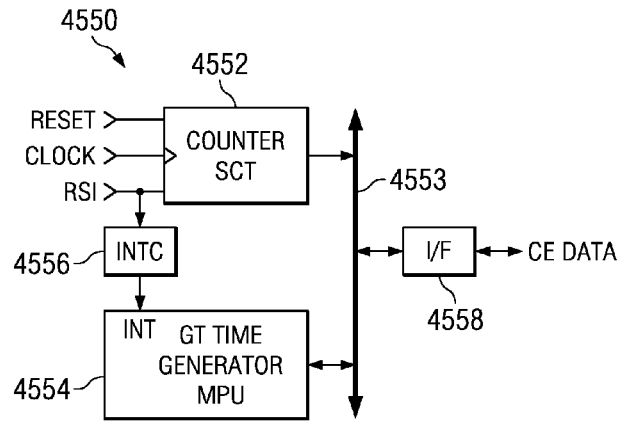
FIG. 18 is a partially block, partially schematic diagram of an example of a CE timekeeping circuit for use in the inventive cellular engine CE of FIG. 15 and coupled to an inventive time generator processor and system.

In FIG. 18, an example of a circuit embodiment for CE Timekeeping Circuit 4550 of FIG. 15 is shown. In FIG. 18, a counter 4552 is clocked from the VCXO 4565 of FIG. 15 and keeps a running count of time SCT since first initialization. Notice that counter 4552 differs from time sampler counter 4541 of FIG. 17 in that counter 4541 is reset on each RSI, while counter 4552 maintains a running count that is not reset on each RSI.

Notice that because counter 4552 is counting the internal VCXO 4565 clock, the operation of counter 4552 to perform a running count of time SCT successfully happens even during indeterminate handover interval $t_{HANDOVER}$ when handover occurs in FIG. 16. Moreover, because counter 4552 is counting internal VCXO 4565 clock, the operation of counter 4552 to perform a running count of time SCT successfully happens even when handover in FIG. 16 makes the average interval ΔRSI2 from the new base station in Cell B different from the average interval ΔRSI1 from the previous base station in Cell A. Also counter 4552, by building up the running count, economically averages out statistical variations in time interval ΔRSI1 between successive RSI from base station of Cell A, and then averages out statistical variations in time interval ΔRSI2 from base station of Cell B. Such variations can also occur due to Doppler effect, so the influence the influence of variations in receiver velocity v in FIG. 4 is reduced.

Further in FIG. 18, the running count SCT from counter 4552 is coupled via a bus 4553 to a processor 4554 such as an MPU 1422 (1105) of FIG. 2 or FIG. 10. Processor 4554 is operated as a Time Generator 2450 of FIG. 7 to generate and output a close approximation, by operation of cellular engine CE, to GPS time GT. In FIG. 18, processor 4554 updates the GPS time GT in response to a real-time interrupt (e.g. fast interrupt request FIQ) supplied with each RSI or according to some predetermined count number of RSI. The RSI line as an interrupt request is fed to an FIQ input of an interrupt handler INTC 4556 and coupled from the interrupt handler 4556 to processor MPU 4554 to service the timekeeping interrupt by thereupon utilizing the running count SCT from counter 4552. Also in FIG. 18, an interface 4558 couples timekeeping information such as running count SCT and GPS time GT from processor MPU 4554 via interface 4558 to provide Cellular Engine CE timekeeping data to GPS Engine GE in FIGS. 3, 5, 7 and 10. In this way, CE data is provided from the circuit of FIG. 18 performing as a CE Timekeeping Circuit 4550 of FIG. 15.

In some embodiments, counter 4552 is FIG. 18 includes plural subcounters for FN, IFN, NC and NS as discussed in connection with FIG. 7, and managed in alternative ways depending on embodiment. Link propagation delay timing-advance information received from the network is also suitably used to adjust the subcounters such as IFN or added by a processor acting as time generator 2450. Changes in link propagation delay timing-advance information indicate changes in delay of the signal path or channel from the base station 2050 to the cellular engine CE. In some embodiments, these changes in delay are applied from time to time to CE Timekeeping Circuit 4550 in FIGS. 15 and 18 by DSP 4525 or from CE Clock Adjustment Circuit 4540 as indicated by a coupling arrow between blocks 4540 and 4550. The relation of such delay and Doppler frequency error is discussed further in connection with Counter Correction in connection with FIG. 19.

In FIG. 19, another type of cellular engine CE receiver embodiment 4700 is depicted with a frequency lock loop for use in supporting the circuits and functions described in connection with the other Figures herein. A base station BS 2050 of FIGS. 1 and 4 sends a modulated signal $S_M(t)$ from an antenna 4705 to an antenna 4710 (2110) coupled to receiver 4700. Antenna 4710 (2110) is coupled to a radio frequency (RF) section 4715 which amplifies and heterodynes an incoming signal to baseband and supplies an output to analog-to-digital converter (ADC) 4720. An input Sample Window Start SWS is fed with internal sample time base that establishes when the analog signal from RF 4715 is sampled and converted to digital form. ADC 4720 supplies a digitized output $S_R(t_i)$ to a digital signal processor (DSP) 4725.

DSP 4725 provides three outputs: 1) a received signal $S_R(t_i)$ as a function of time 2) a channel impulse response h(t), and 3) a time of arrival TOA signal $t_A$.

In FIG. 19, a Remodulator 4730 is fed with the channel impulse response h(t) from DSP 4725. Further the Remodulator 4730 is fed by an output of a Viterbi decoder 4735 or a Viterbi decoding 4735 operation executed by DSP 4725 depending on embodiment. The Viterbi decoding 4735 has the received signal $S_R(t_i)$ as input. Remodulator 4730 is further fed by a modulation control block 4738 that selectively configures Remodulator 4730 to have, or establishes therein, a particular type of modulation that was used by base station BS 2050.

Remodulator 4730 thus operates to generate or reconstruct a near-replica of the modulated signal generated by base station 2050 by modulating recovered frames or packets from the Viterbi decoding 4735 onto a waveform having the phase of the internal oscillator VCXO 4765. Remodulator 4730 further operates to apply the channel impulse response h(t) to the near-replica to as to generate or reconstruct a signal $S_{RM}(t_i)$ comparable to received signal $S_R(t_i)$ except that signal $S_{RM}(t_i)$ has a phase error relative received signal $S_R(t_i)$. The modulated signal generated by base station 2050 is inherently subject to the channel impulse response of the actual channel 4790 between base station and handset to deliver received signal $S_R(t_i)$ having its own phase. Correspondingly, the remodulator 4730 generates a near-replica of the modulated signal generated by base station 2050, the near-replica being subjected in the remodulator 4730 to the channel impulse response h(t) as provided or estimated by DSP 4725.

In this way, Remodulator 4730 locally generates a remodulated signal $S_{RM}(t_i)$ as output 4740 to a subtracting (−) input of a summer 4745. Summer 4745 has a positive summing (+) input fed by an input 4750 phase {$S_R(t_i)$}. In this way, summer 4745 provides an estimated phase error change output related or equal to a difference $\delta\phi_i$ of the phase of the received signal $S_R(t_i)$ less the phase of the remodulated signal $S_{RM}(t_i)$. Summer 4745 is suitably implemented as a correlator or product detector circuit fed with the signal $S_R(t_i)$ and followed by low-pass filter LPF, so as to heterodyne down the signal $S_R(t_i)$ (e.g., modulated 13 MHz obtained from RF 4715) to near-DC using remodulated signal $S_{RM}(t_i)$ (e.g., remodulated 13 MHz) as local oscillator for the product detector. The output of the LPF represents or is related to the phase difference or phase error $\phi$ between signal $S_R(t_i)$ and remodulated signal $S_{RM}(t_i)$. Determination of phase error can also be determined from rotation angle of a constellation of remodulated signal $S_{RM}(t_i)$ relative to constellation of received signal $S_{RM}(t_i)$.

Phase error and phase error change are discussed in connection with FIGS. 20A, 20B and 21 and then the description of FIG. 19 continues herein.

Figure 20A:
FIGS. 20A and 20B are different exemplary graphs of a phase error φ versus time, and showing a frequency error as a derivative or slope of the graph of FIG. 20B, the graphs showing a perfectly controlled phase error in FIG. 20A and an uncontrolled phase error φ in FIG. 20B each for use in some embodiments.

In FIG. 20A, a phase lock loop (PLL) embodiment would maintain the phase error $\phi$ constant and very close to zero. No time correction to time counters would be used because the interval time base (e.g., 13 MHz) would be phase-locked to the cellular network CN.

Figure 20B:
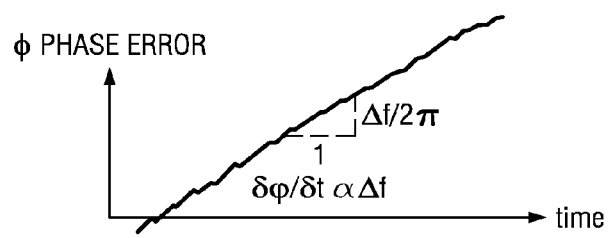

FIG. 20B shows a hypothetical example of the phase error $\phi$ between the phase at 4750 in FIG. 19 of the received signal $S_R(t_i)$ less the phase at 4740 of the remodulated signal $S_{RM}(t_i)$. The phase error $\phi$ is shown as a ramping linear quantity as a function of time in FIG. 20B. The slope of the curve of phase error $\phi$ is approximately constant and has positive slope. The ramping curve of FIG. 20B results from the CE internal Reference clock (e.g., 13 MHz) being perhaps a few Hertz (cycles per second) higher in frequency than the cellular network CN time base. In the special case of a linear ramp as in FIG. 20B, time counter(s) 4758 in FIG. 19 are continually corrected by a particular unchanging number of counts to keep time synchronized with the cellular network CN time base. An embodiment corresponding to FIG. 20B would be constructed to accurately keep track of increments $\delta\phi_1$ even if there is a large value of phase error $\phi$ (large ordinate value in FIG. 20B).

Figure 21:
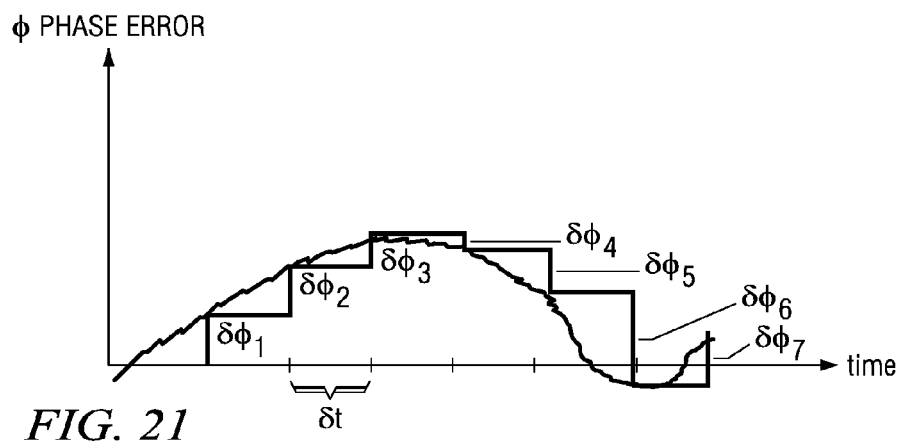
FIG. 21 is another graph of a phase error signal φ versus time under effective control of the inventive cellular engine CE of FIG. 19 wherein successive phase error changes or slopes are determined for effective control therein from changes monitored from the phase error signal φ.

Frequency-locking in FIG. 21 keeps the phase errors relatively controlled within a range of values which is believed to provide a relatively economical embodiment. The time counter(s) 4758 receives varying counter corrections.

FIG. 21 shows a hypothetical graph of phase error versus time for an embodiment employing a frequency-lock loop as in FIG. 19. The overall phase error averages to zero over time due to frequency locking Over successive intervals $\delta t$, each $\delta t$ being about a second in time duration for instance, a varying instantaneous slope of the curve is detected as incremental phase error values $\delta\phi_1, \delta\phi_2, \ldots \delta\phi_7$, etc. These incremental phase error values are detected and used to correct the time counter(s) 4758 in CE in FIG. 19 using a succession of varying counter corrections.

Returning to description of the embodiment of FIG. 19, desirably uncomplicated circuitry and processes helps keep correct time relative to the cellular network CN and to drive the average phase error over time to zero.

In FIG. 19, a frequency difference estimator circuit 4755 (or DSP routine) is fed with phase difference $\delta\phi_i$ from the summer 4745. Frequency difference estimator 4755 determines an estimated frequency difference $\Delta f$ between the received signal $S_R(t_i)$ and the remodulated signal $S_{RM}(t_i)$ by estimating successive slopes of the phase difference curve of FIG. 21.

In FIG. 19, frequency difference estimator 4755 supplies an output digital signal representing the estimated frequency difference $\Delta f$ to the input of a digital to analog converter (DAC) 4760. DAC 4760 then provides an analog voltage representative of the estimated frequency difference $\Delta f$ to the input of a voltage-controlled crystal oscillator (VCXO) 4765. This analog voltage representative of frequency difference $\Delta f$ from DAC 4760 controls the capacitance of a voltage-controllable capacitive element in the VCXO 4765 that varies, corrects and stabilizes the frequency output by VCXO 4765 relative to the cellular network CN time base. Alternatively, in some embodiments, the DAC 4760 is omitted, and a digital output from frequency difference estimator 4755 representative of frequency difference $\Delta f$ controls a digitally selected capacitance(s) in VCXO 4765 to achieve a similar variation and correction.

VCXO 4765 output is used as an example of a way to supply the internal clock, or Reference clock, (e.g., 13 MHz) herein. VCXO 4765 supplies an output feeding back to RF section 4715 as a local oscillator signal for heterodyning by RF section 4715. In this way, a frequency-lock loop is established and the receiver achieves network synchronism or synch with the cellular network. With the receiver 4700 in frequency-lock, DSP 4725 satisfactorily supplies times of arrival TOA, shown as output $t_A$, which are used to support timing Tcellular as described elsewhere herein.

In FIG. 19, an example of maintaining the GPS time within CE during a normal receive (RX) situation (such as RX level above −104 dBm), has TOA tracking to generate a time correction for instance of up to +/−3 symbol periods (about 11 us (microseconds)) in Idle mode (receive only paging information every second or so), and +/−1 symbol period (3.69 us) in Communication mode (receives one burst every frame of 4.62 ms). To enhance accuracy, CTPU (cellular time processor unit) 2420 is made quarter symbol (QS) accurate, for example.

Further in FIG. 19, channel sounding is performed to obtain the impulse response h(t) of the communication channel 4790 between and inclusive of the base station BS 2050 antenna 4705 and the receiver ADC 4720. Time domain function h(t) corresponds to and represents path delay information and implicitly represents phase information descriptive of that communications channel 4790 because the Fourier transform of time domain function h(t) yields and is the transfer function H(j$\omega$) in the frequency domain. ($\omega$ is the angular frequency in radians per second, and j is the imaginary number square root of minus one.)

Accordingly, channel sounding is supported by a DAC 4770 fed by digitized form of h(t) and supplying an analog form of h(t) to a first input to a multiplier 4775. A second input to the multiplier 4775 is fed by the frequency difference $\Delta f$. In this way frequency compensation by phase rotation is provided. The product of multiplication by multiplier 4775 is fed to a transmit (TX) modulator 4780 and to an RF power amplifier (PA) transmitting via a switchplexer (1350 of FIG. 2, not shown in FIG. 19) to the shared antenna 4710. Base station BS 2050 responds back to the channel sounding signal from antenna 4710 by supplying a return pulse from antenna 4705. DSP 4725 suitably processes the information from ADC 4720 based on the channel sounding to determine the delay and impulse response h(t) of the communication channel 4790.

In FIGS. 19 and 21, CE recovers a frequency error detected over time and generates a compensation signal called Counter Correction to correct the elapsed time in SCT time counter 4758. This frequency and time error has a modest significance to the system because if there is velocity (Doppler frequency error) of CE relative to base station, a phase error might accumulate corresponding perhaps to 1000 meters in the short run. Dividing by the speed of light yields 1000 meters/ 3×10^8 msec=3 microseconds of time error. For example, this type of Counter Correction is useful in accounting for a user using GPS at home or at a hotel or vicinity and then commuting to work or to a trip appointment (the commuting causing a change in path delay due to accumulated Doppler frequency error) and then subsequently powering up GPS and using a GPS application at the new location.

More generally, this Doppler frequency error is an error $\Delta f$ in frequency f given by a Doppler formula $\Delta f/f = -v_r/c$. The vector velocity v of the CE in FIG. 4 has a radial velocity component $v_r$ outward along a conceptual line joining the mobile platform including CE and the applicable cellular network base station BS 2050. This radial velocity component $v_r$ is divided by speed of light c to yield the Doppler error (e.g. in unitless parts per million ppm). The radial component $v_r$ of the motion of CE is integrated over time, and results in a change $\Delta x_r$ in radial distance $x_r$ to the base station (geometry may vary in some areas such as urban canyon due to signal reflections but the approach is robust). The change $\Delta x_r$ represents a change in the effective length of the signal path and produces a change in signal path delay from base station to CE, as indicated by changes in timing advance, delay represented by impulse response h(t), or other method. A consequent time error is produced in CE, given that the cellular engine time base is locked to the cellular network CN. The Time error is equal to the change $-\Delta x_r$ divided by speed of light c, according to the formula Time error=$-\Delta x_r/c$. Using the Doppler formula, 1/f is the period of time of one cycle of the CE time base and error $\Delta f$ is integrated over time to yield the number of periods of Time error which is proportional to phase error.

Channel sounding under control of DSP 4725 is suitably used in some embodiments to detect the actual signal path delay and changes in that delay are delivered to block 4757 and used for Doppler-related Counter Correction. The Counter Correction from block 4757 is suitably provided as a function of phase error at block 4745, minus Doppler-related Time error. Thus, the Doppler-related Counter Correction component is number of counter units corresponding to a time correction $\Delta x_r/c$. Each of two time error components or terms, based on measured phase error $\delta\phi$ and Doppler-related time error $-\Delta x_r/c$, can be either positive or negative.

Suppose that the mobile platform including CE is moving toward the applicable base station 2050 in FIG. 4 and the VCXO 4765 is correctly running at nominal frequency. In FIG. 19, the cellular network time base appears to speed up due to Doppler effect and a phase error arises at block 4745. However, a net zero Counter Correction should be made to the Time Counter 4758 so long as VCXO 4765 is running at the nominal frequency. VCXO 4765 is indeed made to speed up by the frequency-lock loop due to Doppler effect, which is all right for frequency lock purposes. But this speed-up means that VCXO 4765 thereby clocks Time Counter 4758 a little too fast for timekeeping purposes. VCXO 4765 is running faster at this point and thus introduces a positive Time error in Time Counter 4758. Concurrently, suppose the phase error output from block 4745 falls to zero as VCXO 4765 catches up to the Doppler-increased network frequency. Block 4757 performs a subtraction of zero (re phase error output) minus a positive Doppler component and as a result outputs a negative Counter Correction that corrects and cancels the positive Doppler-related Time error at Time Counter 4758.

Just before handover from one cell base station 2050A to another base station 2050B in FIG. 4, the cellular engine CE performs a final path delay measurement relative to base station 2050A by channel sounding. A final Counter Correction is generated for operations in Cell A based on the difference of current path delay just prior to handover minus the next-previous value of path delay in Cell A. The on-clock is running continually. Just after handover from cell base station 2050A to base station 2050B, the CE performs an initial path delay measurement relative to base station 2050B by channel sounding. A initial value of path delay is generated and stored for operations in Cell B without immediately generating a Counter Correction. Subsequent channel sounding while in Cell B then finds the difference of current path delay minus the initial value (or next-previous value) of path delay in Cell B to deliver one (or subsequent) Counter Correction value(s).

Notice that at handover, the CE may be moving away from the cell base station 2050A and toward base station 2050B. Accordingly, the last Counter Correction relating to Cell A will likely be opposite in sign compared to the first Counter Correction relating to Cell B when that first Counter Correction is made in due course. In this way, some embodiments provide Doppler-related corrections in systems that involve handover processes, and path delay changes implicitly involve calculus integration of the Doppler effect. Some further embodiments may provide a further correction component or secondary correction component recognizing that the transition of on-clock frequency upon handover may not be instantaneous from a lower Doppler-affected frequency to a higher Doppler-affected frequency. The swiftness of on-clock frequency change depends on a loop delay parameter of the frequency-lock loop circuit in FIG. 19 (or 15). Less-than instantaneous change in on-clock frequency adapting to Cell B by the frequency lock loop is likely to somewhat reduce the magnitude of the first Counter Correction involving first change of path delay determined by the difference of initial path delay measurement in Cell B and next-subsequent path delay measurement in Cell B. After handover, motion in an urban canyon environment can produce sudden changes in signal path delay. Less-than-instantaneous change in clock frequency by the frequency lock loop adapting to possibly-sudden changes in signal path delay due to urban canyon geometry is also suitably corrected by the DSP providing such a secondary correction component. Use of on-clock as a time base facilitates time keeping regardless of the environmental geometry.

Overall, the Doppler-related time error is likely to average out to zero in the long run, as recognized in the description of FIG. 15. Doppler error as detected in FIG. 19 can be detected and applied through the Counter Correction to adjust for this error even in the short run by combination of FIG. 19 with FIGS. 15 and 17 using TOA signal TA to provide the RSIs in FIG. 15. The Counter Correction in FIG. 19 is used to adjust the counter 4552 of FIG. 18, for instance.

In FIG. 19, the cellular network CN frequency is tracked by processing the received modulated signal and calculating the difference relative to internal frequency from VCXO 4765. Modulated signal in this context means the representation of the digital datastream or synchronisation sequence on the radio link connection—for example, modulation by any of binary phase shift keying BPSK, QPSK quadrature phase shift keying, GMSK Gaussian minimum shift keying, or otherwise. The processing suitably includes, for instance, steps in FIG. 19 of a) Demodulate the bit stream for a burst.
b) Remodulate the signal using remodulator 4730.
c) Compare the phase of the remodulated signal to the received signal across the sampled burst.
d) Generate the time deviation or time error adjustment based on the relationship between successively-detected changes of phase error and the internal clock frequency (e.g., 13 MHz) and correct the VCXO frequency.

For time error detection purposes, a time error component as a function of phase error, putting aside the hereinabove-described further Doppler-related time error component, is:

$$\Delta t_i = (\delta \phi_i / \delta t) \delta t / (2\pi f) = \delta \phi_i / (2\pi f) \qquad (15)$$

In other words, if the summer 4745 is generating a positive amount $\delta \phi_i$ of additional phase error, that means that the CE internal clock is running too fast, incrementing the counter SCT too rapidly. The time error $\Delta t_i$ is positive because CE thinks the time is later than network time. When the time error is positive, the time correction is made negative to compensate.

In FIG. 19 and FIG. 21, the latest detected change $\delta \phi_i$ in the phase error $\phi$ is divided by the angular frequency $2\pi f$ (two-pi times, e.g., 13 MHz) of the CE internal clock to find the time error $\Delta t_i$. Put another way, the time error is the period (1/f) of one cycle of the internal oscillator VCXO 4765 times the phase error divided by two-pi. Note that the phase error divided by two-pi is the number of cycles of error.

The Counter Correction $\Delta$SCT to time counter 4758 is based on the time error $\Delta t_i$, which is on the order of microsecond(s). $\Delta t$ estimator 4757 of FIG. 19 generates the Counter Correction based on the relationship of Equation (15) and includes any conversion factor used to convert from an adjustment in seconds scaled to an adjustment in counter units. For instance, when the counter units are 0.9225 microseconds per counter unit in the intra-frame counter IFN, the adjustment is given by Equation (16). In FIG. 19, $\Delta t$ estimator 4757 and an arithmetic circuit such as summer 4759 form a time correction circuit operable for a time correction proportional to the phase difference $\delta \phi_i$ output of summer 4745 and the period of the internal oscillator VCXO 4765.

For time counter SCT correction purposes using QS counts of 0.9225 microseconds as discussed herein, a Counter Correction example computation is expressed by:

$$\Delta SCT = -\delta \phi_i / (2\pi f \times 9.225 \times 10^{-7}) \qquad (16)$$

In words, the Counter Correction amount $\Delta$SCT is delivered as output from $\Delta t$ Estimator 4757 of FIG. 19 which has a negative multiplier to make the counter correction opposite in sign to the time error of Equation (15). The latest amount of change $\delta \phi_i$ in the phase error is reversed in sign and scaled to counter units. For instance, in FIG. 21, $\delta \phi_1, \delta \phi_2, \delta \phi_3, \delta \phi_7$ each have a positive sign, while $\delta \phi_4, \delta \phi_5, \delta \phi_6$, each have a negative sign. Each of these signs is reversed to form the sign of each Counter Correction for the respective $\delta \phi_i$. In some embodiments, other correction components as described elsewhere herein, such as a component for Doppler-related signal path delay changes and secondary correction component are also occasionally combined with the component based on change $\delta \phi_i$ to generate the Counter Correction.

To perform the adjustment the time calculator of FIG. 19 has an adder 4759. Adder 4759 has a first input supplied by low order bits of the Time Counter SCT, and a second input for counter adjustment. The time counter correction amount $\Delta$SCT is fed to the second input of Adder 4759, which computes the adjusted counter value for counter SCT. The output of adder 4759 is fed back to and loaded into the counter SCT. Counter SCT continues to run off the internal CE time based on frequency-locked VCXO 4765 (or other internal oscillator of sufficiently equal frequency to VCXO 4765 for Counter SCT purposes).

If the correction process via Adder 4759 has a known process loop circuit delay TD that is significant relative the CE time unit that runs Counter SCT, then that delay value TD is added in adder 4759 as well to compensate for a de facto negative adjustment to Counter SCT that is inherent to the adder process loop, if the loop has enough process loop delay to matter.

The internal frequency clocks are suitably statically configured or corrected to be synchronous to network frequency or a dynamic process of frequency compensation is implemented. A dynamic process approach starts from the recognition that the calculus derivative (rate of change) of phase error $d\phi/dt = (2 \times pi \times frequency\_deviation)$. This is a formula for calculating the frequency difference between the network clock to internal frequency f (e.g., nominally 13 MHz).

In the process and structure of FIG. 19, and from a latest instance of phase difference $\delta\phi_i$ from the summer 4745, frequency difference estimator 4755 determines an estimated frequency error or frequency difference $\Delta f_i$ (on the order of Hertz or tens of Hertz) at instance i as follows:

$$2\pi\Delta f_i = \delta\phi_i/\delta t \qquad (17)$$

In Equation (17) frequency difference $\Delta f_i$ has an uppercase delta symbol to indicate an actual frequency error indicated by frequency difference estimator 4755. The factor two-pi converts frequency in Hertz (cycles per second) to angular frequency (radians per second). The sampling period $\delta t$ is suitably selected to be on the order of one second of time in duration.

For compensation or correction purposes, the CE reference clock source suitably is made to have a voltage input that allows the clock frequency to be controlled. VCXO 4765 in FIG. 19 provides such a voltage-controlled clock source. In the cellular network CN, the cellular radio base station BS 2050 frequency is phase locked to a reference source or time base (not shown) for the network. In the cellular engine CE and FIG. 19, the received cellular radio frequency source is compared in phase to the re-modulated output of a remodulator 4730. A detected change of VCXO frequency relative to the network reference is used to change, correct and stabilize the VCXO 4765 output frequency. VCXO has a frequency-to-control voltage relationship between the voltage control input and the controlled clock frequency output from the VCXO 4765. A detected frequency error $\Delta f_i$ is corrected by applying a corresponding control voltage to the voltage control input of the internal clock (e.g., VCXO 4765), until the estimated frequency deviation converges towards zero around the negative feedback loop 4765, 4715, . . . 4745, 4755.

The VCXO 4765 is driven in such a way as to correct its frequency by a frequency correction amount $\delta f_i$ given by Equation (18). A lower-case delta is used in the symbolism to indicate a frequency correction caused at the output of VCXO 4765. Notice that the frequency correction $\delta f_i$ is opposite in sign to the frequency error $\Delta f_i$ to achieve a corrective outcome. The frequency correction magnitude is related by a gain constant g to the magnitude of frequency error $\delta f_i$ as follows:

$$\delta f_i = -g\Delta f_i \qquad (18)$$

Substituting Equation (17) into Equation (18) shows the relation of the frequency correction $\delta f_i$ to the rate of change of the phase error $\phi$ of FIG. 21:

$$\delta f_i = -(g/2\pi)\delta\phi_i/\delta t \qquad (19)$$

Notice that unlike the time correction Equation (16), the frequency error $\Delta f_i$ itself is significant and not second-order for frequency correction purposes in Equations (18) and (19). The gain constant g is suitably in the range between zero and two and generally closer to unity than to either end of that range. In this way, the negative feedback loop gain is arranged to correct the frequency in a way that seeks and converges on zero frequency error $\Delta f_i$. Establishing the gain constant closer to unity as just-noted, helps to speed up the rate of convergence or settling rate of the negative feedback loop.

If frequency error tends to increase in one direction mostly, such as because of thermal heating in cell handset 1010 in use, then a gain constant near to or exceeding unity is useful so that the frequency lock loop pro-actively corrects ahead of the incoming frequency error information by overshooting it somewhat. If frequency error is unpredictable in direction, then a gain constant near to or less than unity is useful so that the frequency lock loop conservatively almost-corrects the frequency error. Still other versions intelligently look at the history of the error and dynamically adjust the gain constant g to be higher than unity if the recent history of the frequency error is generally unidirectional, and to be lower than unity if the recent history of the frequency error is generally bi-directional or otherwise unpredictable.

In some embodiments, a frequency compensation process multiplies the transmit and receive signal samples with a counter rotating vector represented by the complex expression (20).

$$\cos(2 \times pi \times frequency\_deviation) + j \times \sin(2 \times pi \times frequency\_deviation) \qquad (20)$$

where j represents the imaginary axis of the counter rotating vector. In this way, the frequency deviation in the counter rotating vector subtracts from and cancels the frequency deviation of VCXO 4765 relative to network time base.

The transmit signal frequency of TX modulator 4780 is also corrected by multiplier 4775 for transmission of outgoing voice and data provided to DAC 4770. The down-converted receive signal frequency from RF 4715 is corrected as described herein in connection with VCXO 4765.

In FIG. 19, the blocks 4755 and 4757 for $\Delta f$ and $\Delta t$ estimation respectively in some embodiments are combined as a single block with two outputs (or even the same output) for $\Delta f_i$ and $\Delta t_i$. A first form of combination of blocks 4755 and 4757 is recognized by combining process Equations (15) and (17) and eliminating the phase error change $\delta\phi_i$ between them:

$$2\pi\Delta f_i \delta t = \delta\phi_i = 2\pi f \Delta t_i \qquad (21)$$

Accordingly, if in an embodiment frequency error $\Delta f_i$ is generated by $\Delta f$ estimator block 4755 according to process Equation (18), then a further step, DSP output, or circuit associated with block 4755 then uses frequency error $\Delta f_i$ to generate and deliver time error $\Delta t_i$ in place of block 4757 to block 4759 according to process Equation (22):

$$\Delta t_i = \Delta f_i \delta t/f \text{ or} \qquad (22)$$

$$\Delta SCT = -\Delta f_i \delta t/(f \times 9.225 \times 10^{-7}) \qquad (23)$$

Conversely, if in another embodiment time error $\Delta t_i$ is generated by $\Delta t$ estimator block 4757 according to process Equation (15), then a further step, DSP output, or circuit associated with block 4757 then uses frequency error $\Delta t_i$ to generate frequency error $\Delta f_i$ in place of $\Delta f$ estimator block 4755 according to process Equation (24):

$$\Delta f_i = \Delta t_i f/\delta t \qquad (24)$$

Using a process based on Equation (18) together with Equation (24), frequency correction $\delta f_i$ is opposite in sign to the frequency error $\Delta f_i$ and multiplied by gain constant g to achieve a corrective outcome to feed to DAC 4760 according to Equation (25):

$$\delta f_i = -g\Delta t_i f/\delta t \qquad (25)$$

Since $\Delta SCT$ is output from block 4757, some embodiments feed the DAC 4760 from block 4757 by applying a structure and process that executes Equation (26):

$$\delta f_i = g\Delta SCT((f \times 9.225 \times 10^{-7})/\delta t) \qquad (26)$$

Notice that the parenthesized quantity in Equation (26) approximates unity, so the Counter Correction ΔSCT can be applied to DAC 4760 with relatively little adjustment.

Figure 22:
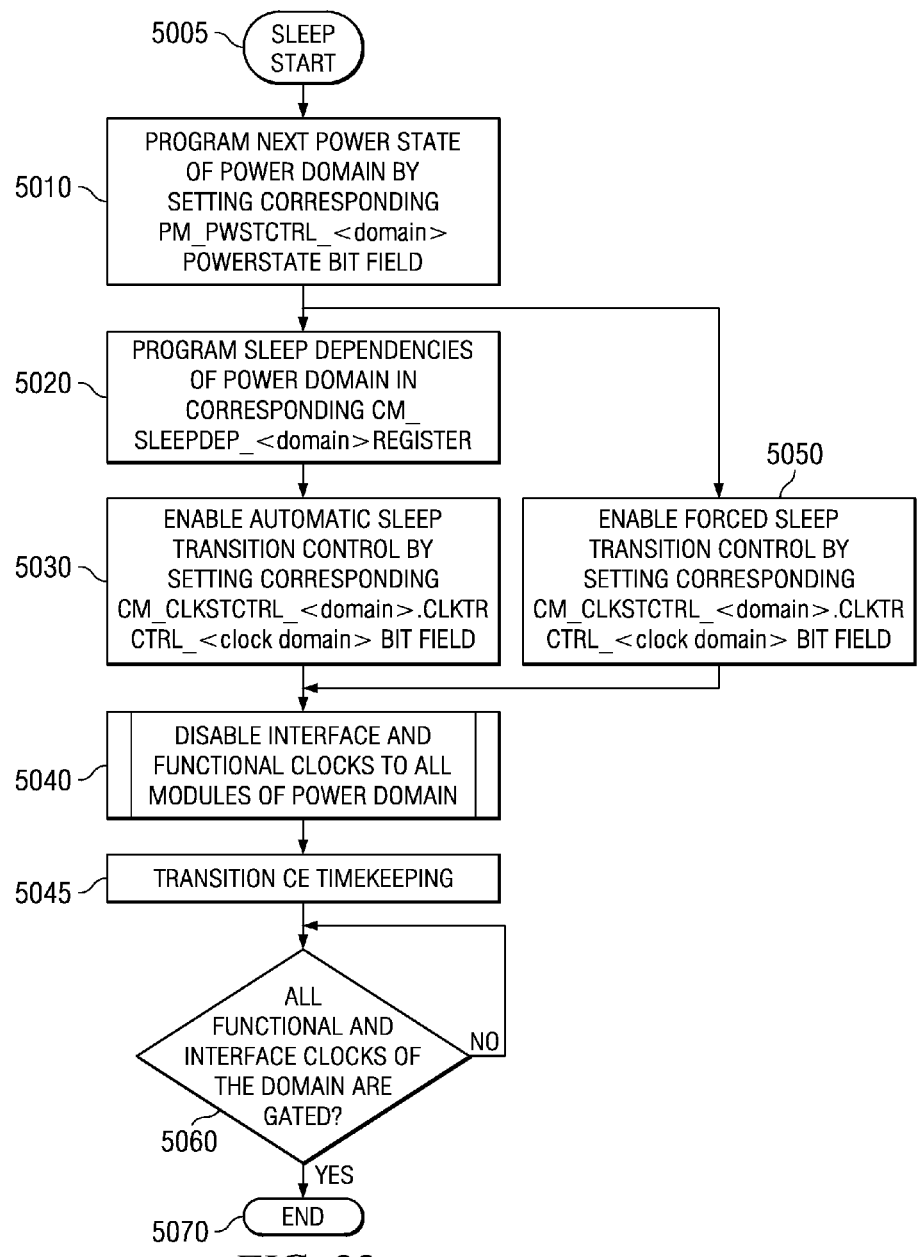
FIG. 22 is a flow diagram of an inventive timekeeping process while initiating a sleep mode for one or more power domains.
Figure 23:
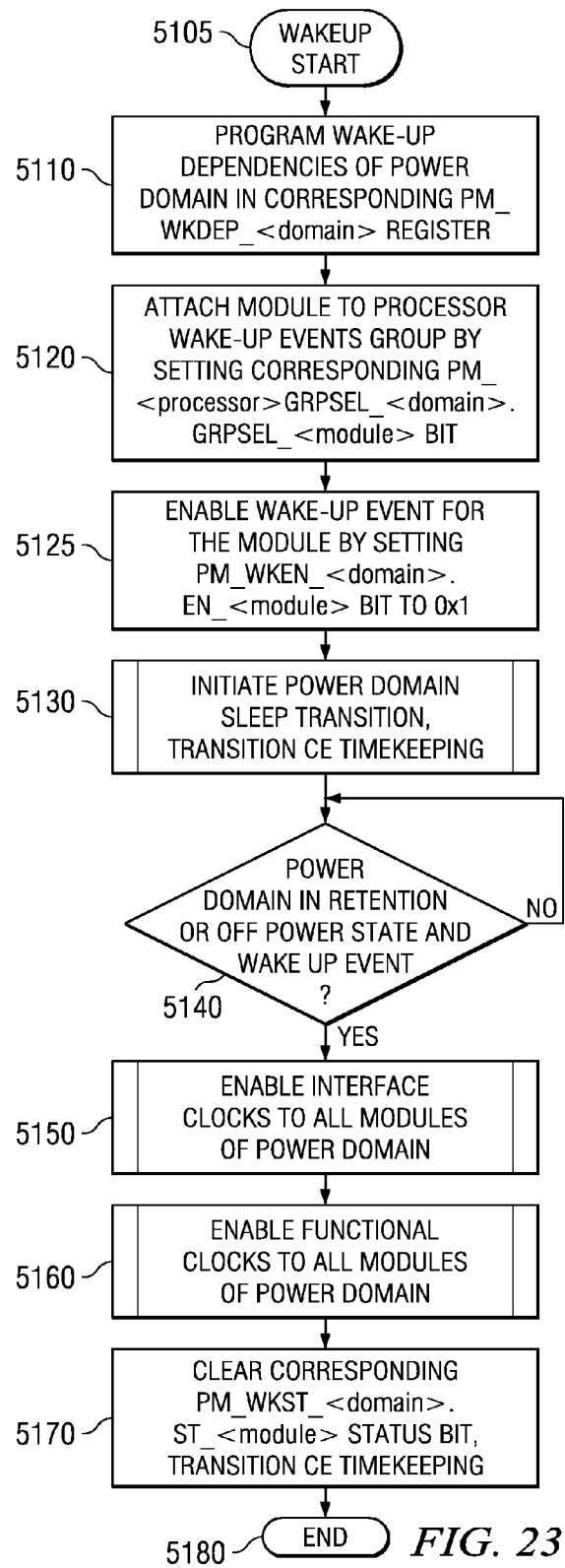
FIG. 23 is a flow diagram of an inventive timekeeping process while initiating a wakeup for one or more power domains.

FIGS. 22 and 23 depict operations for sleep and wakeup which are taken into account in the timekeeping procedures of FIGS. 8 and 9.

In FIG. 22, operations to start a SLEEP mode commence at a Start flow point 5005 with an applicable power domain in an ON power state. Next, a step 5010 programs the next power state of the power domain by setting a PM (Power Management) Power State bit field in the Control Registers 3925 of FIG. 11 wherein the bit field corresponds to the particular power domain. Also step 5010 determines whether a Forced Sleep transition or Automatic Sleep transition is called for in the Control Registers 6710.

If Automatic Sleep transition, then operations proceed to a step 5020 that programs sleep dependencies of the power domain in a SleepDep bit field to control the Clock Manager CM 3920 in Control Registers 3925 wherein the bit field corresponds to the particular power domain. A further step 5030 enables a process of automatic sleep transition control by setting a particular value representative of automatic sleep control in a CM Clock State Control bit field in the Control Registers 3925 wherein that bit field corresponds to the particular power domain, whereupon a step 5040 is reached.

If Forced Sleep transition at step 5010, then operations at step 5010 go instead to a step 5050 to enable Forced Sleep transition control by setting a particular value representative of Forced Sleep control in a CM Clock State Control bit field in the Control Registers 3925 wherein that bit field corresponds to the particular power domain, whereupon the step 5040 is reached.

At step 5040, suppose CE timekeeping on-clock is a clock in the power domain to be put in sleep mode, and real time clock RTC is about to be used as sleep clock. Before turning off the CE timekeeping on-clock, the CE timekeeping on-clock is used at time $t_{5040}$ of step 5040 to measure the relative duration $X_{RTC1}$ of a period of RTC Tsleepclock in Tonclock time units by executing a counting process for a period of the RTC clocked by the still operative on-clock. This process suitably uses a circuit involving a counter like Time Sampler Counter 4541 of FIG. 17 except that RTC edges are coupled to the reset input instead of RSI, and the result is fed to a register analogous to 4542 to retain $X_{RTC1}$ according to process Equation (27.1):

$$X_{RTC1} = T\text{sleepclock}(t_{5040})/T\text{onclock}(t_{5040}) \quad (27.1)$$

The step 5040 then disables interface and functional clocks FCLK including on-clock coupled to any modules of the applicable power domain.

In FIG. 22, a step 5045 then transitions cellular engine CE timekeeping in step 2656 (or 2756) of FIG. 8 or 9 to take account of the Sleep start wherein the process involving the product of the sleep clock number $n_3$ times sleep clock period Tsleepclock is used. The transition to stop and retain on-clock counter 2428, and simultaneously start the sleep clock counter 2426 suitably is cleanly made on a sleep clock edge. Step 5045 is operative when sleep clock (e.g., RTC) is desired as the clock that is operating or available as an input to the timekeeping process, such as when multi-MHz reference clock 2162 is off or unpowered. Sleep Counter NS 2426 of FIG. 7 is clocked with real time clock RTC to count cycles of RTC.

Then a decision step 5060 determines whether all functional and interface clocks of the domain are gated. If not, then some of the clock gates are conductive and sleep transition operations continue until all such clocks are gated. When all such clocks are gated, then the power domain is in a Retention or OFF power state, whence an End flow point 5070 is reached.

In FIG. 23, operations to start a WAKE UP mode commence at a Start flow point 5105 with an applicable power domain in an OFF power state. Next, a step 5110 programs wakeup dependencies of the power domain in a WkDep bit field to control the PRCM of FIG. 11 in the Control Registers 3925 wherein the bit field corresponds to the particular power domain. Another step 5120 attaches the module to a processor wakeup events group by setting a corresponding processor-specific and module-specific GrpSel bit in the Control Registers 3925. A further step 5125 enables a wakeup event for the module by setting or activating a domain specific and module-specific wakeup enable WkEn bit in the Control Registers 3925.

In FIG. 23, then a step 5130 initiates a power domain Sleep transition to the Wake state. Step 5130 then transitions cellular engine CE timekeeping of step 2656 (or 2756) of FIG. 8 or 9 to turn off contribution from the sleep clock to the timekeeping process of counter NS wherein the sleep clock number $n_3$ and the sleep clock period Tsleepclock are no longer used and instead to use the on-clock wherein the product of on-clock count number $n_2$ and the on-clock period Tonclock are used in the process.

Next a decision step 5140 determines whether it is true that the power domain is in a Retention or OFF power state, and also true that a Wakeup event has occurred. If No, then wakeup operations continue until the power domain is powered up.

Operations proceed in a step 5150 to enable interface clocks to all modules of the power domain, and then in a step 5160 to enable functional clocks FCLK to all modules of the power domain. At step 5160, suppose CE timekeeping on-clock is a clock in the power domain that is being awakened, and real time clock RTC has been counted by counter NS as sleep clock. After turning on the CE timekeeping on-clock in step 5160, the CE timekeeping on-clock is used at time $t_{5160}$ of step 5160 to measure the relative duration $X_{RTC2}$ of a period of RTC Tsleepclock in Tonclock time units by executing a counting process for a period of the RTC clocked by the still operative on-clock. This process suitably also uses a circuit as used in step 5040 involving a counter like Time Sampler Counter 4541 of FIG. 17 except that RTC edges are coupled to the reset input instead of RSI, and the result is fed to a second register analogous to 4542 to retain $X_{RTC2}$ according to process Equation (27.2):

$$X_{RTC2} = T\text{sleepclock}(t_{5160})/T\text{onclock}(t_{5160}) \quad (27.2)$$

Then a step 5170 clears a wake state WkSt domain-specific and module-specific status bit in the Control Registers 3925. An average value $X_{RTC}$ to express Tsleepclock measured in Tonclock units is generated and stored for use in step 2656 (2756) of FIG. 8 or 9, and the average value is given by process Equation (28):

$$X_{RTC} = (X_{RTC1} + X_{RTC2})/2 \quad (28)$$

Note also that the length of Tonclock between RSIs measured in Tcellular true-time units (at nominal frequency of on-clock) is the ratio Tcellular/RCP0 given by process Equation (29):

$$T\text{onclock} = T\text{cellular}/RCP0 \quad (29)$$

and varies somewhat as represented by measured RCP variation in FIG. 17. The length of Tsleepclock in units of Tcellular between RSIs is given by the expression (30)

$$T\text{sleepclock} = X_{RTC} T\text{cellular}/RCP0 \quad (30)$$

Depending on the time measuring accuracy desired, a few registers or memory locations hold the measured intervals and numerical counter values for step 2656 (2756). More registers or memory locations can be provided to take account of variations in RCP and RTC, instead of using one value RCP0 and $X_{RTC}$ in process equations. In some embodiments, such time-related registers and time number counters are provided in the Wakeup domain or wherever respective retention and counter control during a sleep mode can be conveniently provided for them. Such changes in RCP and RTC can occur over a long period of time possibly involving numerous sleep/wakeup/sleep transitions and thermally-based or otherwise frequency variations in RTC 2164 and on-clock 2162.

Thus, relatively-accurate subsequent global time as a sum of products and ratios of time intervals and counter values representing numbers n of clock beats according to a relation $$t_{CT} = t_0 + [n_1 + (n_2/RCP0) + n_3(X_{RTC}/RCP0)]T_{cellular} \quad (31)$$

where $t_0$ is the first global time value, $t_{CT}$ is the relatively-accurate subsequent global time from time projection, $T_{cellular}$ is the time interval between the time of arrival signals, RCP0 is number of first clock counts in the time interval $T_{cellular}$, $X_{RTC}$ is number of first clock counts between cycles of said second clock, $n_1$ is a number of received instances of the time interval $T_{cellular}$, $n_2$ is the number of first clock counts distinct from periods counted with $n_1$, and $n_3$ is the number of second clock periods distinct from periods counted with $n_1$ and $n_2$.

The process equation (31) is literally descriptive when the values of $X_{RTC}$ and RCP0 are constant. When these values vary, then some embodiments use time generator 2450 to operate according to a process equation (32) involving progressive summations.

$$t_{CT} = t_0 + T_{cellular}\left[\sum_{i=1}^{n1} 1 + \sum_{j=1}^{n2}(1/RCP(T_h(j)))\right] + \sum_{m=1}^{n3}(T_{Sleep\_Clock}(T_h(m))) \quad (32)$$

where the indices i, j, m represent RSIs, on-clock cycles, and sleep clock cycles respectively.

The thermal model can have varying degrees of refinement. One example of a thermal model considers the crystal oscillator, resistance-capacitance oscillator, or other clock oscillator from a thermal viewpoint. Each clock oscillator is viewed as thermally part of a heat capacitance C of the handset having a handset temperature $T_h$. Handset temperature $T_h$ is a function of time and thus a function of index j or m in the summations of process equation (32). The internals of the handset are coupled by a thermal resistance R to an ambient having a temperature $T_o$. Temperature $T_o$ is likewise a function of time and thus of each index i, j, or m in the summations.

When on-clock 2162 is running in an awake mode, the number of on-clock cycles RCP in FIG. 17 varies as a joint function of the slowly changing handset temperature $T_h$ and of the slowly changing ambient temperature $T_o$. Values of RCP are periodically supplied to the time generator 2450 in some embodiments from the RCP counter 4541 of FIG. 17.

The time generator 2450 is suitably programmed to generate or approximate the summation of 1/RCP, the middle summation of process equation (32).

When cellular engine CE is running in a sleep mode, the period $T_{Sleep\_Clock}$ of the sleep clock (e.g. real-time clock RTC 2164) slowly changes as the handset temperature $T_h$ declines from a thermally hotter awake temperature toward a thermally cooler ambient temperature. The dynamics of the predicted handset temperature $T_h$ over sleep clock cycles m depend on the thermal model used. When ambient temperature is constant over the period of a given sleep interval, the thermal model hereinabove yields an exponential-based variation of the predicted handset temperature. The exponential-based variation has with a time constant equal to the product RC of thermal resistance R and handset thermal capacitance C. That product is suitably pre-stored in flash memory as a parameter $k_2$ of the thermal model. The ambient temperature $T_o$ is suitably updated on earlier boot or previous wakeup, when the handset temperature $T_h$ detected by the thermal sensor at that time is likely to approximate the ambient temperature $T_o$. The thermal sensor in some embodiments is operated at intervals interspersed during sleep mode to detect any significant change in ambient temperature if the sleep interval is quite long. Periodically the real-time clock RTC during sleep mode calls the thermal sensor to measure ambient temperature, such as every few minutes during sleep mode.

The time constant parameter $k_2 = RC$ is experimentally determined and has order of magnitude on the order of ten seconds or hundred seconds of time. The sleep clock period $T_{Sleep\_Clock}$ varies as a function of handset temperature $T_h$, such as by a linear function with a temperature coefficient $k_1$ that is likewise determined by experiment and stored as a parameter.

Combining the exponential-based temperature dynamics with a linear relationship of sleep clock period to temperature leads to a relationship (33):

$$T_{Sleep\_Clock}(m) = (X_{RTC}/RCP1)T_{cellular}[1+k_1(T_{h1}-T_o)\\(1-\exp(-m/(32\ KHzRC)))] \quad (33)$$

where $(X_{RTC}/RCP1)]T_{cellular}$ is measured $T_{Sleep\_Clock}$ period just before awake-to-sleep transition FIG. 22.

exp( ) is exponential function m is index number of sleep clock cycles 0, 1, 2. etc. during the duration of this sleep state $k_1$ is linear temperature coefficient parameter of the model, temperature coefficient can be positive or negative depending on type of oscillator.

32 KHz RC is $k_2$ parameter, product of RTC freq. with thermal time constant of model.

$T_{h1}$ is handset temperature measured by sensor just before FIG. 22 go-to-sleep.

$T_o$ is ambient temperature.

Time generator 2450 in some embodiments can be provided on wakeup with the number of just-elapsed sleep clock cycles $m_3$, given that sleep clock index m is incremented for $m_3$ such sleep clock cycles in a just-ended sleep mode interval. This number $m_3$ of such sleep clock cycles is included among the entire number $n_3$ of sleep clock cycles in all sleep mode intervals covered by equation (32). In some embodiments, time generator 2450 performs a brute force cycle-by-cycle summation over $T_{Sleep\_Clock}(m)$ according to the third summation of process Equation (32). Some other embodiments closely approximate this quantitative portion of the third summation according to a process expression (34)

$$\sum_{m=1}^{m3} (T_{Sleep\_Clock}(T_h(m))) = (X_{RTC}/RCP1)T_{cellular} \quad (34)$$

$$[m_3 + k_1(T_{h1} - T_o)][m_3 - 32\,\text{KHz}\,RC(1 - \exp(-m_3/32\,KHzRC))]]$$

Process expression (34) is used as a quantitative portion substituted into time projection process equation (32) to yield a piecewise time projection process (35) for use by time generator 2450 and includes a thermal model result for sleep clock.

$$t_{CT} = t_0 + T_{cellular} \quad (35)$$

$$\left[ n_1 + \sum_{j=1}^{n2} (1/RCP(j)) + \sum_{allsleeps} (X_{RTC}/RCP1)[m_3 + k_1(T_{h1} - T_o) \right.$$

$$[m_3 - 32\,\text{KHz}\,RC(1 - \exp(-m_3/32\,KHzRC))]]]$$

Inspection of the sleep clock summation shows that the amount $T_{cellular}X_{RTC}/RCP1$ of RTC clock period is counted as that amount was just before sleep occurred, provided that $m_3$ is small. By contrast, when $m_3$ becomes very large ($\gg k_2$=32 KHz RC), the chip is cooling to ambient and the RTC period amount that is counted tends toward the thermally-corrected period in expression (36):

$$T_{cellular}(X_{RTC}/RCP1)[1+k_1(T_{h1}-T_o)] \quad (36)$$

Notice that the counting of sleep index m occurs during each instance of a sleep mode. However, it is fine to defer until an awake state the generation of the time $t_{CT}$ itself using process equation (35). In FIG. 23, at step 5170, the power domain is now in an ON power state. In the ON power state, sleep NS counter 2426 is in retention and on-clock NC counter 2428 is counting (until cellular network coverage resumes and FN counter 2422 takes over). Upon reaching the ON power state, an End flow point 5180 is reached in the process portion of FIG. 23.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), and 11) multiple-core using any one or more of the foregoing.

Design, Verification and Fabrication

Figure 24:
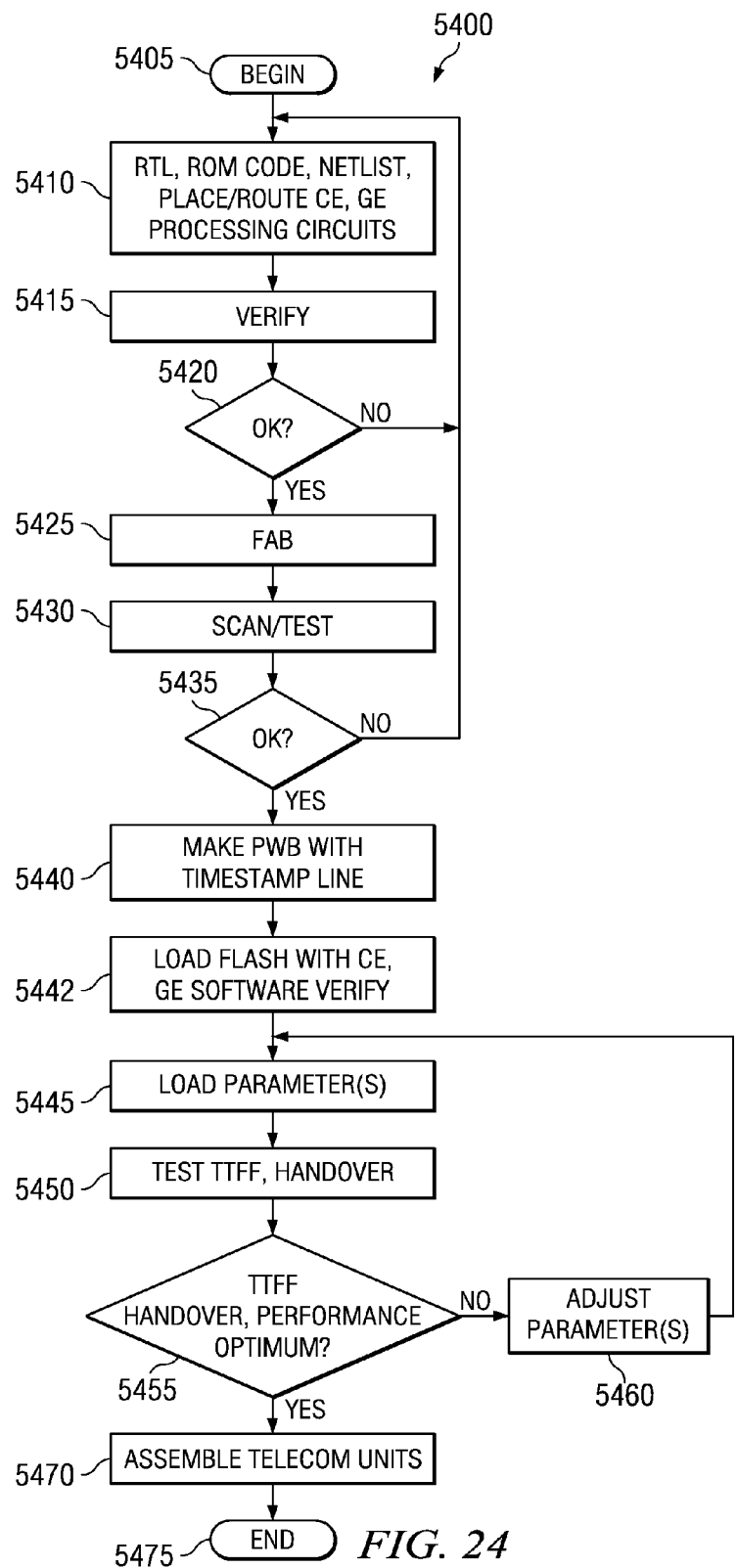
FIG. 24 is a flow diagram of an inventive process of manufacturing various embodiments of the invention.

In FIG. 24, various embodiments of integrated circuit systems and processes as described herein are manufactured according to a suitable process of manufacturing 5400 as illustrated in the flow of FIG. 24. The process begins at step 5405 and a step 5410 prepares RTL (register transfer language) and netlist for a particular design including, or respectively including, a cellular engine CE and a GPS engine GE on one or more integrated circuits. The Figures of drawing show some examples of structures, and the detailed description describes those examples and various other alternatives.

In a step 5415, the design of the CE and the GE are verified in simulation electronically on the RTL and netlist. Place and route operations are performed to establish the physical layout of each integrated circuit, and the layout is verified. In this way, the contents and timing of the memory, of the receivers and processor hardware and of the GPS decoder are verified. The operations are verified pertaining to the desired sequences and parallelism of operations of CE and GE as shown in the Figures of drawing herein for an applicable embodiment. Then a verification evaluation step 5420 determines whether the verification results are currently satisfactory. If not, operations loop back to step 5410.

If verification evaluation 5420 is satisfactory, the verified design of each CE and GE core and integrated circuit is fabricated in a wafer fab and packaged to produce each resulting integrated circuit(s) at step 5425 manufactured according to the verified design(s). Then a step 5430 verifies the operations directly on first-silicon and production samples such as by using scan chain and tracing methodology on the circuits to confirm that actual operation is in accordance with the expected operation of the verified design(s). An evaluation decision step 5435 determines whether the chips are satisfactory, and if not satisfactory, the operations loop back as early in the process as needed such as step 5415 or 5410 to get satisfactory integrated circuits.

In FIG. 24, when the integrated circuits are satisfactory in step 5435, a telecommunications unit based on teachings herein is manufactured. This part of the process first prepares in a step 5440 a particular design and printed wiring board (PWB) of a telecommunication product having an interface including a Timestamp line connecting CE and GE. A telecommunications modem as in FIG. 2 is coupled to a microprocessor of the CE. Software is loaded into flash memory for CE and GE and verified. Operational parameters are loaded in a step 5445 to flash memory 1025 and configure the CE and GE. Operational parameters include $n_1$, $n_2$, $n_3$, etc. for timekeeping; quality control range percentages and expected RCP0 in FIG. 17; and characteristics of cellular network CN such as modulation type; and constants for FIG. 19 $\Delta f$, $\Delta t$ estimators 4755 and 4757. Temperature variation modeling software and parameters for a counter correction process thereof are also loaded into flash memory or other non-volatile memory. A user interface such as including keypad, map display, microphone and speaker of FIG. 2, is coupled to the microprocessor in the CE.

The particular design of the printed wiring board PWB of FIG. 3 with CE and GE is tested in a step 5450 by electronic simulation and prototyped and tested in actual application.

The process equation coefficients, time delay, loop gain and other configuration and operational parameter(s) are suitably embedded in the system in step 5445 according to the teachings herein, and are tested in step 5450 for length of time to position fix TTF, system operational efficiency measurement, application execution time, amount of power dissipation and other pertinent metrics.

A decision step 5455 may determine that further increased efficiency is called for. Then revision or adjustment of the software and/or parameter(s) is performed in a step 5460 for reduced time to fix TTF, higher system operational efficiency, faster application execution, lower power dissipation and other pertinent metrics. Then operations loop back from step 5460 to reload the software at step 5442, reload the parameter(s) at step 5445 and do further testing at step 5450. When the testing is satisfactory at step 5455, operations proceed to step 5470.

In a manufacturing step 5470, a signed certificate with the embedded software and configuration and operational parameters for the CE/GE positioning system is loaded into the Flash non-volatile memory 1025 (1435) of FIG. 2. The processor 1100 (1400) is provided and responds to the non-volatile memory 1025 (1435) to configure and execute CE operations and communicate with GE 1190 (1495) over the Timestamp line. The components are assembled on the printed wiring board PWB or otherwise manufactured to accommodate a desired form factor of the design to produce resulting improved positioning system units such as in telecommunications products according to the tested and adjusted and verified design of each telecommunications product. Operations are completed at END 5475.

Aspects (See Notes Paragraph at End of this Aspects Section.)

1A. The wireless circuit claimed in claim 1 wherein said oscillator circuitry is adjustable in frequency in response to the incoming signal to provide a frequency correction.

1B. The wireless circuit claimed in claim 1 further comprising a power management circuit, and wherein said oscillator circuitry includes an on-clock oscillator and a sleep clock oscillator coupled to said power management circuit.

1C. The wireless circuit claimed in claim 1 wherein said oscillator circuitry includes an on-clock oscillator and a sleep clock oscillator coupled to respectively contribute to the set of counter circuitries so that said on-clock oscillator contributes in an awake mode, and said sleep clock oscillator contributes in a sleep mode.

1D. The wireless circuit claimed in claim 1 wherein said oscillator circuitry includes an on-clock oscillator and a sleep clock oscillator, and said set of counter circuitries includes a counter responsive to both said on-clock oscillator and a sleep clock oscillator and operable to count a number of on-clock cycles in a sleep clock cycle.

1E. The wireless circuit claimed in claim 1D wherein said time generator is responsive to both the time components from the set of counter circuitries and a count from said counter related to number of on-clock cycles in a sleep clock cycle, to generate the approximate absolute time.

1F. The wireless circuit claimed in claim 1 wherein said oscillator circuitry includes an on-clock oscillator and a sleep clock oscillator, and said set of counter circuitries includes a further counter responsive to both said on-clock oscillator and said sleep clock oscillator and operable to count a first number of on-clock cycles in a sleep clock cycle prior to a transition from an awake mode to a sleep mode, and said further counter operable to count a second number of on-clock cycles in a sleep clock cycle subsequent to a transition from a sleep mode to an awake mode.

1G. The wireless circuit claimed in claim 1 wherein said oscillator circuitry includes an on-clock oscillator, and said set of counter circuitries includes a counter for counting a number related to number of on-clock cycles between RSIs.

1H. The wireless circuit claimed in claim 1G wherein said time generator is responsive to the time components from the set of counter circuitries and a count from said counter related to number of on-clock cycles between RSIs, to generate the approximate absolute time.

1J. The wireless circuit claimed in claim 1 wherein said time generator is operable to form a ratio responsive to said set of counter circuitries, to contribute to the approximate absolute time.

1K. The wireless circuit claimed in claim 1 wherein said time generator is operable to perform an interpolation responsive to said set of counter circuitries, to contribute to the approximate absolute time.

1L. The wireless circuit claimed in claim 1 wherein said time generator is operable to perform a thermal correction responsive to said set of counter circuitries, to contribute to the approximate absolute time.

2A. The electronic circuit claimed in claim 2 wherein said first circuit of said cellular engine is further operable to correct the internal clock to the RSIs after handover.

3A. The electronic circuit claimed in claim 3 for use in a network having handover from one part of the network to another part, the electronic circuit further comprising a timekeeping circuit fed by said oscillator circuitry and said timekeeping circuit operable independent of RSIs to count an internal time at least through a handover interval.

3B. The electronic circuit claimed in claim 3 wherein said processor is operable to initialize a counter in said time counter circuit and said counter then counts clocks between RSIs (receiver synchronization instances) whereupon a next RSI initializes the running count in said counter again.

3C. The electronic circuit claimed in claim 3B wherein said time counter circuitry further includes a register circuit fed by said counter and coupled for actuation by said processor to hold an initial RSI position count upon occurrence of that next RSI from said processor;

3D. The electronic circuit claimed in claim 3C wherein said adjustment circuit further includes an arithmetic circuit fed with the initial RSI position count from said register circuit and further fed with a subsequent running count from said counter, said arithmetic circuit operable to generate a difference between the initial RSI position count and the subsequent running count.

3E. The electronic circuit claimed in claim 3D wherein said adjustment circuit further includes an accumulator fed with said difference from said arithmetic circuit.

3F. The electronic circuit claimed in claim 3E wherein said accumulator is coupled to said processor for actuation of said accumulator when an RSI occurs, said accumulator operable to accumulate both positive and negative values of said difference.

3G. The electronic circuit claimed in claim 3E wherein said oscillator circuitry is coupled to said accumulator for frequency correction.

3H. The electronic circuit claimed in claim 3A further comprising a satellite positioning receiver coupled to said timekeeping circuit.

3J. The electronic circuit claimed in claim 3 for use with an incoming signal having modulation and further comprising a radio frequency (RF) section coupled to said oscillator circuitry and operable to heterodyne the incoming signal to baseband to recover the modulation, said processor responsive to the modulation.

4A. The electronic circuit claimed in claim 4 further comprising a modulation control coupled to said remodulator and operable to selectively configure said remodulator to a same modulation type as the modulation type of the modulation of the incoming signal.

4B. The electronic circuit claimed in claim 4 wherein said frequency lock loop includes an oscillator and further includes a frequency difference estimator operable to measure a slope of the phase difference output versus time to determine a frequency error, said oscillator responsive to said frequency difference estimator.

4C. The electronic circuit claimed in claim 4 further comprising a satellite positioning receiver coupled to said time counter circuitry.

4D. The electronic circuit claimed in claim 4 further comprising a channel sounding generator coupled to said processor and further operable for transmitting an outgoing impulse on which the channel impulse response is based.

4E. The electronic circuit claimed in claim 4 wherein said time counter circuitry includes a time correction circuit having an input coupled to said frequency lock loop.

4F. The electronic circuit claimed in claim 4 wherein said frequency lock loop includes a frequency correction circuit having an input coupled to said time counter circuitry.

4G. The electronic circuit claimed in claim 4 wherein said time counter circuitry includes a time counter and an arithmetic circuit coupled to the phase difference output and to said time counter and said arithmetic circuit operable to apply a correction to said time counter related to the phase difference output.

5A. The wireless positioning system as claimed in claim 5 wherein said cellular engine includes a circuit for supplying a frequency error output pertaining to the on-clock relative to the cellular network signal.

5B. The wireless positioning system as claimed in claim 5 wherein said cellular engine is further operable to track time slot positions on the cellular network signal.

5C. The wireless positioning system as claimed in claim 5 wherein the cellular engine is further operable to message network-assisted positioning data to said positioning engine.

5D. The wireless positioning system as claimed in claim 5 wherein said cellular engine is operable to poll the positioning engine for the positioning time.

5E. The wireless positioning system as claimed in claim 5 wherein said positioning engine is operable to send a strobe enable signal to said cellular engine.

5F. The wireless positioning system as claimed in claim 5 wherein said cellular engine is responsive to a receiver synchronization instance (RSI) of the cellular network signal to send the first strobe signal to the positioning engine.

5G. The wireless positioning system as claimed in claim 5 wherein said positioning engine is operable to interrupt said cellular engine and supply the positioning time for the first strobe edge.

5H. The wireless positioning system as claimed in claim 5 wherein the cellular network signal has hyperframes and hyperframe rollover wherein said cellular engine is operable to maintain the time when a hyperframe rollover occurs.

5J. The wireless positioning system as claimed in claim 5 wherein said cellular engine is coupled by a control line to said positioning engine and said cellular engine is further operable to send a control signal on said control line to actuate the suspension of operation of said positioning engine.

5K. The wireless positioning system as claimed in claim 5 wherein said positioning engine is further operable to use the fix to generate a positioning time later than said second strobe edge and to correct that positioning time using the later positioning time back to said second strobe edge.

5L. The wireless positioning system as claimed in claim 5 wherein said cellular engine is further operable to update the maintained time as a sum of products of time intervals and changes in counter values representing numbers n of clock beats according to a relationship $$\Delta t_{CT} = \Delta n_1 \times T_{cellular} + \Delta n_2 \times T_{on\_clock} + \Delta n_3 \times T_{sleep\_Clock}$$

where
$\Delta t_{CT}$ is a time update to maintained time
$\Delta n_1$ is a change in integer frame number of a frame length $T_{cellular}$
$\Delta n_2$ is a change in number of on-clock periods distinct from time counted with $n_1$, and
$\Delta n_3$ is a change in number of sleep clock periods distinct from time counted with $n_1$ and $n_2$.

6A. The method claimed in claim 6 further comprising counting by a time counter beginning upon occurrence of the next strobe, and said generating a satellite time value by GE corresponding to the next strobe includes generating a current satellite positioning time value by GE some time after that next strobe, and correcting the current satellite positioning time value back to that next strobe using a current value from the counting by the time counter.

6B. The method claimed in claim 6A further comprising continuing counting by the time counter, and generating in GE a value of later time as a sum of the satellite positioning time as corrected back to that next strobe and the counting by the time counter to the later time.

6C. The method claimed in claim 6 wherein the time interval between the first strobe and the next strobe is provided by sending a value of the cellular engine time interval from CE to GE pertaining to the next strobe.

6D. The method claimed in claim 6 wherein the correcting step is provided by generating in CE a value of estimated absolute time pertaining to the next strobe and sending the value of estimated absolute time from CE to GE.

6E. The method claimed in claim 6 further comprising obtaining a position fix by GE facilitated by the internal time as corrected for use by GE.

7A. The method claimed in claim 7 further comprising obtaining a position fix by GE facilitated by the internal time thus corrected for use by GE.

7B. The method claimed in claim 7 further comprising applying a power management process to GE resulting in the losing followed by regaining of the satellite reception.

7C. The method claimed in claim 7 wherein the time interval between the first strobe and the next strobe is provided by sending a value of the cellular engine time interval from CE to GE pertaining to the next strobe.

7D. The method claimed in claim 7 wherein the correcting step is provided by generating in CE a value of estimated absolute time pertaining to the next strobe and sending the value of estimated absolute time from CE to GE.

7E. The method claimed in claim 7 further comprising repeating the method, whereby each repetition includes two strobes.

8A. The electronic circuit claimed in claim 8 for use with a network that is subject to handover between base stations or handover between channels, wherein said processing circuitry is operable to project the relatively-accurate subsequent global time including a time of arrival offset due to the handover by including the time of arrival offset in the number $n_2$ of clock counts of the generate operation.

8B. The electronic circuit claimed in claim 8 wherein the electronic circuit is subject to Doppler effect when moving, and wherein said processing circuitry is operable to project the relatively-accurate subsequent global time encompassing time of arrival changes due to the Doppler effect.

8C. The electronic circuit claimed in claim 8 for use with a network that supplies timing-advance information, wherein said processing circuitry is operable to project the relatively-accurate subsequent global time utilizing the timing-advance information.

8D. The electronic circuit claimed in claim 8 wherein said first clock includes a crystal subject to crystal drift and said processing circuitry is operable to project the relatively-accurate subsequent global time including a correction for the crystal drift.

8E. The electronic circuit claimed in claim 8 wherein said position determination unit includes a satellite receiver and decoder coupled by a time stamp line to said processing circuitry.

8F. The electronic circuit claimed in claim 8 wherein said processing circuitry is operable to project the relatively-accurate subsequent global time as a sum of products and ratios of time intervals and counter values representing numbers n of clock beats according to a relation $$t_{CT} = t_0 + [n_1 + (n_2/RCP0) + n_3(X_{RTC}/RCP0)]T_{cellular}$$

where
t₀ is the first global time value,
$t_{CT}$ is the relatively-accurate subsequent global time from time projection,
$T_{cellular}$ is the time interval between the time of arrival signals,
RCPO is number of first clock counts in the time interval $T_{cellular}$,
$X_{RTC}$ is number of first clock counts between cycles of said second clock,
$n_1$ is a number of received instances of the time interval $T_{cellular}$,
$n_2$ is the number of first clock counts distinct from periods counted with $n_1$, and
$n_3$ is the number of second clock periods distinct from periods counted with $n_1$ and $n_2$.

8G. The electronic circuit claimed in claim 8 wherein said signals have frames and intra-frame intervals that span plural periods of the first clock, and said processing circuitry is operable to project the relatively-accurate subsequent global time by also keeping a separate count $n_4$ of an intra-frame number IFN of the intra-frame intervals and according to a relation $$t_{CT}=t_0+(n_1-1)\times T_{cellular}+n_4\times T_{ifn}+n_2\times T_{on\_clock}+n_3\times T_{sleep\_Clock}$$

where
$t_0$ is the first global time value,
$t_{CT}$ is the relatively-accurate subsequent global time from time projection,
$T_{cellular}$ is the time interval between the time of arrival signals,
$T_{on\_clock}$ is the time period of the first clock,
$T_{sleep\_Clock}$ is the time period of the second clock,
$T_{ifn}$ is the time interval of each intra-frame interval,
$n_1-1$ is a number of receiver synchronization instances (RSIs) spaced by $T_{cellular}$,
$n_2$ is the number of first clock counts distinct from periods counted with $n_1$, and
$n_3$ is the number of second clock periods distinct from periods counted with $n_1$ and $n_2$.

8H. The electronic circuit claimed in claim 8 wherein said processing circuitry is operable to transition from count $n_3$ to count $n_2$ on a pulse boundary of said second clock.

8J. The electronic circuit claimed in claim 8 wherein said processing circuitry has counters and plural modes of operation wherein the counters are selectively operated.

8K. The electronic circuit claimed in claim 8J wherein a particular said mode of operation includes counters for $n_2$ and $n_3$ selected and counting depending on processing circuitry being awake or asleep respectively, and a counter for $n_1$ of receiver synchronization instances is in retention.

8L. The electronic circuit claimed in claim 8J wherein a particular said mode of operation includes counters for $n_3$ and $n_2$ in retention and a counter for a number $n_1$ of receiver synchronization instances is selected and counting.

9A. The process claimed in claim 9 wherein said operational parameters include quality control range parameters for quality control of timekeeping in the CE.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

A few preferred embodiments have been described in detail hereinabove. The scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, and other circuitry, and digital computer processors including microprocessors and microcomputers of any architecture, or combinations thereof. Internal and external couplings and connections can be ohmic, capacitive, direct or indirect via intervening circuits or otherwise as desirable. Implementation is contemplated in discrete components or fully integrated circuits in any materials family and combinations thereof. Various embodiments of the invention employ hardware, software or firmware. Structural diagrams herein are also representative of flow diagrams for operations of any embodiments whether of hardware, software, or firmware, and processes of manufacture thereof. Process diagrams are also representative of structural diagrams of possible embodiments.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in either the detailed description and the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. An electronic circuit for use with time of arrival signals from a network, the electronic circuit comprising:
   a position determination unit operable to generate a global time value and to convey a first global time from said position determination unit as an output;
   a first clock greater than 1 MHz, said first clock operable to be powered on and off;
   a second clock less than 1 MHz having cycles; and
   processing circuitry coupled to said first clock and to said second clock and to said position determination unit, said processing circuitry operable to:
      measure a time interval between the time of arrival signals relative to first clock counts and measure a time interval between cycles of said second clock relative to first clock counts;
      generate a number $n_2$ of clock counts of said first clock when said first clock is powered on and generate a number of clock counts $n_3$ of said second clock while said first clock is powered off; and
      project a relatively-accurate subsequent global time based on said first global time and using said measure and generate operations; and
      then return said relatively-accurate subsequent global time to said position determination unit to facilitate a subsequent position determination by said position determination unit; and
   wherein said processing circuitry is operable to project the relatively-accurate subsequent global time as a sum of products and ratios of time intervals and counter values representing numbers n of clock beats according to a relation $$t_{CT}=t_0+[n_1+(n_2/RCP0)+n_3(X_{RTC}/RCP0)]T_{cellular}$$

where
- $t_0$ is the first global time value,
- $t_{CT}$ is the relatively-accurate subsequent global time from time projection,
- $T_{cellular}$ is the time interval between the time of arrival signals,
- RCPO is number of first clock counts in the time interval $T_{cellular}$,
- $X_{RTC}$ is number of first clock counts between cycles of said second clock,
- $n_1$ is a number of received instances of the time interval $T_{cellular}$,
- $n_2$ is the number of first clock counts distinct from periods counted with $n_1$, and
  - $n_3$ is the number of second clock periods distinct from periods counted with $n_1$ and $n_2$.

2. The electronic circuit claimed in claim 1 for use with a network that is subject to handover between base stations or handover between channels, wherein said processing circuitry is operable to project the relatively-accurate subsequent global time including a time of arrival offset due to the handover by including the time of arrival offset in the number $n_2$ of clock counts of the generate operation.

3. The electronic circuit claimed in claim 1 wherein the electronic circuit is subject to Doppler effect when moving, and wherein said processing circuitry is operable to project the relatively-accurate subsequent global time encompassing time of arrival changes due to the Doppler effect.

4. The electronic circuit claimed in claim 1 for use with a network that supplies timing-advance information, wherein said processing circuitry is operable to project the relatively-accurate subsequent global time utilizing the timing-advance information.

5. The electronic circuit claimed in claim 1 wherein said first clock includes a crystal subject to crystal drift and said processing circuitry is operable to project the relatively-accurate subsequent global time including a correction for the crystal drift.

6. The electronic circuit claimed in claim 1 wherein said position determination unit includes a satellite receiver and decoder coupled by a time stamp line to said processing circuitry.

7. An electronic circuit for use with time of arrival signals from a network, the electronic circuit comprising:
- a position determination unit operable to generate a global time value and to convey a first global time from said position determination unit as an output;
- a first clock greater than 1 MHz, said first clock operable to be powered on and off;
- a second clock less than 1 MHz having cycles; and
- processing circuitry coupled to said first clock and to said second clock and to said position determination unit, said processing circuitry operable to:
  - measure a time interval between the time of arrival signals relative to first clock counts and measure a time interval between cycles of said second clock relative to first clock counts;
  - generate a number $n_2$ of clock counts of said first clock when said first clock is powered on and generate a number of clock counts $n_3$ of said second clock while said first clock is powered off; and
  - project a relatively-accurate subsequent global time based on said first global time and using said measure and generate operations; and
  - then return said relatively-accurate subsequent global time to said position determination unit to facilitate a subsequent position determination by said position determination unit; and
- wherein said signals have frames and intra-frame intervals that span plural periods of the first clock, and said processing circuitry is operable to project the relatively-accurate subsequent global time by also keeping a separate count $n_4$ of an intra-frame number IFN of the intra-frame intervals and according to a relation $$t_{CT} = t_0 + (n_1-1) \times T_{cellular} + n_4 \times T_{ifn} + n_2 \times T_{on\_clock} + n_3 \times T_{sleep\_Clock}$$

where
- $t_0$ is the first global time value,
- $t_{CT}$ is the relatively-accurate subsequent global time from time projection,
- $T_{cellular}$ is the time interval between the time of arrival signals,
- $T_{on\_clock}$ is the time period of the first clock,
- $T_{sleep\_Clock}$ is the time period of the second clock,
- $T_{ifn}$ is the time interval of each intra-frame interval,
- $n_1-1$ is a number of receiver synchronization instances (RSIs) spaced by $T_{cellular}$,
- $n_2$ is the number of first clock counts distinct from periods counted with $n_1$, and
  - $n_3$ is the number of second clock periods distinct from periods counted with $n_1$ and $n_2$.

8. The electronic circuit claimed in claim 1 wherein said processing circuitry is operable to transition from count $n_3$ to count $n_2$ on a pulse boundary of said second clock.

9. The electronic circuit claimed in claim 1 wherein said processing circuitry has counters and plural modes of operation wherein the counters are selectively operated.

10. The electronic circuit claimed in claim 9 wherein a particular said mode of operation includes counters for $n_2$ and $n_3$ selected and counting depending on processing circuitry being awake or asleep respectively, and a counter for $n_1$ of receiver synchronization instances is in retention.

11. The electronic circuit claimed in claim 9 wherein a particular said mode of operation includes counters for $n_3$ and $n_2$ in retention and a counter for a number $n_1$ of receiver synchronization instances is selected and counting.

12. The electronic circuit claimed in claim 7 for use with a network that is subject to handover between base stations or handover between channels, wherein said processing circuitry is operable to project the relatively-accurate subsequent global time including a time of arrival offset due to the handover by including the time of arrival offset in the number $n_2$ of clock counts of the generate operation.

13. The electronic circuit claimed in claim 7 wherein the electronic circuit is subject to Doppler effect when moving, and wherein said processing circuitry is operable to project the relatively-accurate subsequent global time encompassing time of arrival changes due to the Doppler effect.

14. The electronic circuit claimed in claim 7 for use with a network that supplies timing-advance information, wherein said processing circuitry is operable to project the relatively-accurate subsequent global time utilizing the timing-advance information.

15. The electronic circuit claimed in claim 7 wherein said first clock includes a crystal subject to crystal drift and said processing circuitry is operable to project the relatively-accurate subsequent global time including a correction for the crystal drift.

16. The electronic circuit claimed in claim 7 wherein said position determination unit includes a satellite receiver and decoder coupled by a time stamp line to said processing circuitry.

17. The electronic circuit claimed in claim 7 wherein said processing circuitry is operable to transition from count $n_3$ to count $n_2$ on a pulse boundary of said second clock.

18. The electronic circuit claimed in claim 7 wherein said processing circuitry has counters and plural modes of operation wherein the counters are selectively operated.

19. The electronic circuit claimed in claim 18 wherein a particular said mode of operation includes counters for $n_2$ and $n_3$ selected and counting depending on processing circuitry being awake or asleep respectively, and a counter for $n_1$ of receiver synchronization instances is in retention.

20. The electronic circuit claimed in claim 18 wherein a particular said mode of operation includes counters for $n_3$ and $n_2$ in retention and a counter for a number $n_1$ of receiver synchronization instances is selected and counting.

* * * * *